(12) United States Patent
Takahashi

(10) Patent No.: US 6,281,990 B1
(45) Date of Patent: Aug. 28, 2001

(54) BOOK PAGE DOCUMENT IMAGE READING APPARATUS

(75) Inventor: Hiroshi Takahashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/019,361

(22) Filed: Feb. 5, 1998

Related U.S. Application Data

(62) Division of application No. 08/565,296, filed on Nov. 27, 1995, now Pat. No. 5,798,841.

(30) Foreign Application Priority Data

Nov. 28, 1994 (JP) .................................................. 6-293549

(51) Int. Cl.⁷ .............................. H04N 1/04; G03B 27/32
(52) U.S. Cl. ............................ 358/474; 358/488; 355/25
(58) Field of Search .................................... 358/488, 474, 358/296, 498; 355/25, 81, 82, 83

(56) References Cited

U.S. PATENT DOCUMENTS

| | | | |
|---|---|---|---|
| 4,696,563 | * 9/1987 | Shibusawa | 355/8 |
| 4,754,303 | * 6/1988 | Ito | 355/14 R |
| 5,006,895 | * 4/1991 | Hashimoto et al. | 355/243 |
| 5,010,371 | * 4/1991 | Matsuo et al. | 355/313 |
| 5,061,962 | * 10/1991 | Takahashi | 355/233 |
| 5,115,257 | * 5/1992 | Takahashi | 346/108 |
| 5,260,805 | * 11/1993 | Barrett | 358/449 |
| 5,325,213 | * 6/1994 | Takahashi | 358/474 |
| 5,390,033 | * 2/1995 | Bannai et al. | 358/498 |
| 5,471,277 | * 11/1995 | Fujioka et al. | 355/25 |
| 5,583,607 | * 12/1996 | Fujioka et al. | 355/25 |
| 5,583,662 | * 12/1996 | Takahashi et al. | 358/474 |
| 5,610,720 | * 3/1997 | Fujioka et al. | 358/296 |
| 5,625,466 | * 4/1997 | Nakajima | 358/449 |

* cited by examiner

Primary Examiner—Jerome Grant, II
(74) Attorney, Agent, or Firm—Oblon, Spivak, McClleland, Maier & Neustadt, P.C.

(57) ABSTRACT

The book page document image reading apparatus according to the present invention comprises a reading means for reading an image of a spread book page document placed on with the binding section being aligned to the reference position, an image size changing means for changing a size of a read image read by the reading means, a storage means for storing therein image data to image size changing, and a means for differentiating a range for storage of the image data having been subjected in the storage means when a book page document is read with the same size from a range for storage of image data having been subjected to image size changing in the storage means when a book page document is read with a changed size.

36 Claims, 50 Drawing Sheets

FIG.21A DOCUMENT BASE LOWER LIMIT SENSOR (LEFT)

FIG.21B SCANNER MOTOR RUNNING IN REGULAR DIRECTION DOWN RUNNING IN REVERSE DIRECTION

FIG.21C DOCUMENT BASE LIFT MOTOR (LEFT) RUNNING IN REGULAR DIRECTION DOWN RUNNING IN REVERSE DIRECTION

FIG.21D DOCUMENT BASE LIFT MOTOR (RIGHT) RUNNING IN REGULAR DIRECTION DOWN RUNNING IN REVERSE DIRECTION

FIG.21E DOCUMENT BASE LOWER LIMIT SENSOR (RIGHT)

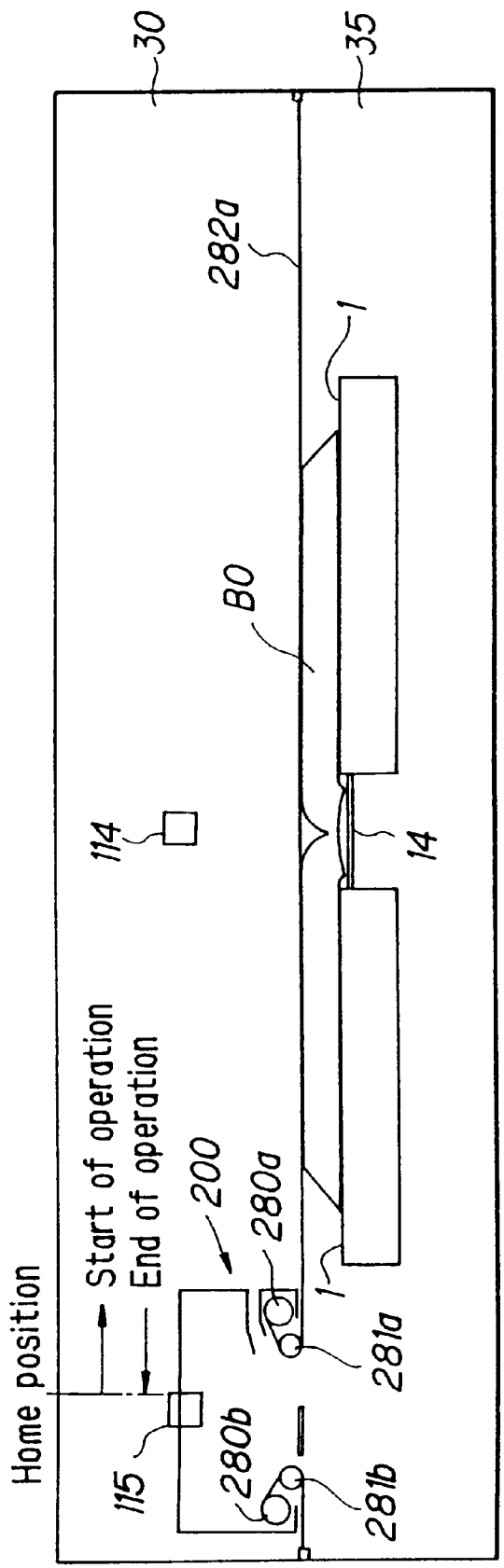

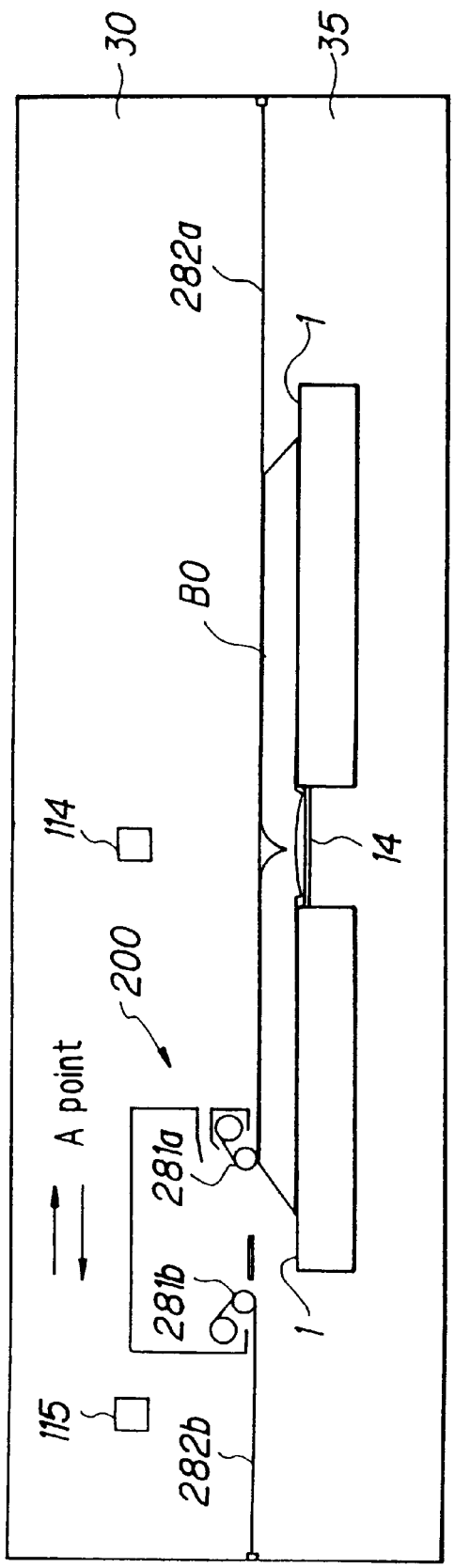

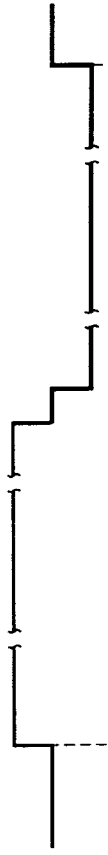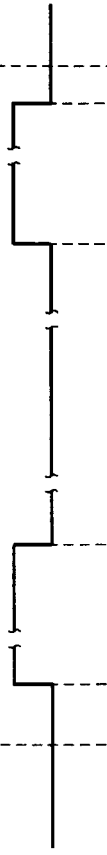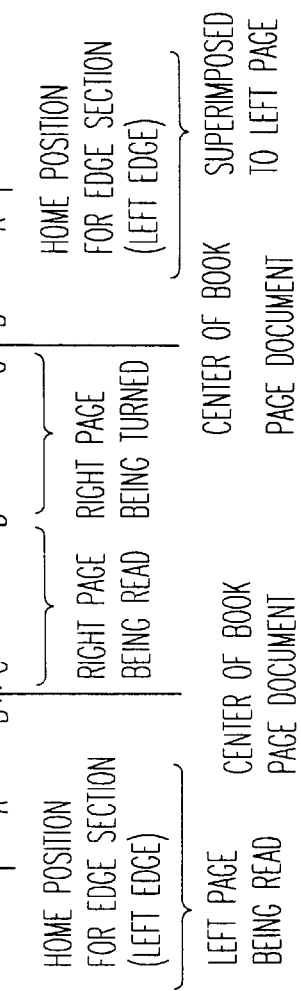
FIG. 27A SCANNER MOTOR
FIG. 27B DOCUMENT BASE LIFT MOTOR (LEFT)
FIG. 27C DOCUMENT BASE LIFT MOTOR (RIGHT)

Reading through contact glass    ○

Place a document on the contact glass and press this button to start copying

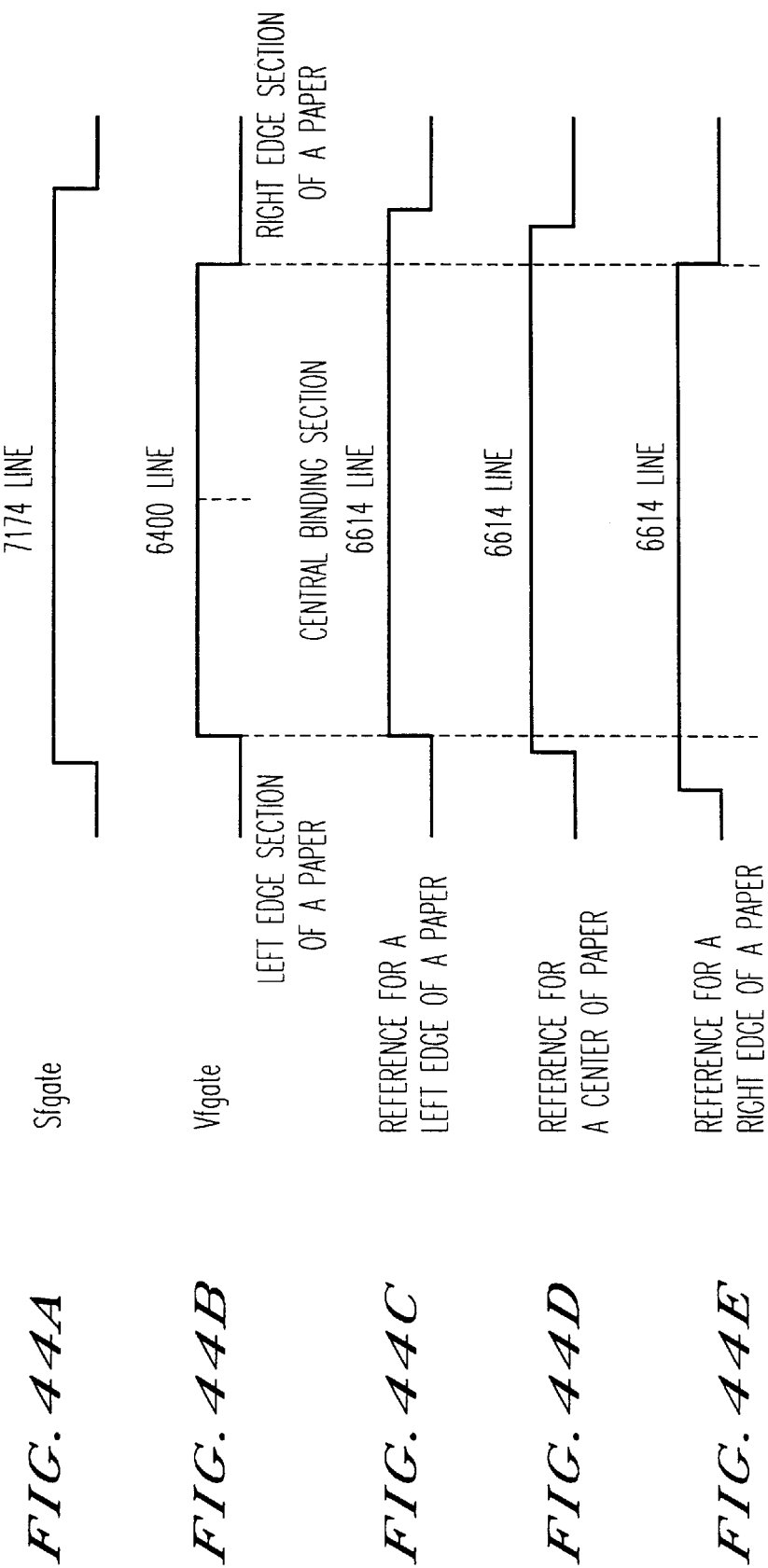

*FIG. 45A* SFGATE — 7174 LINE

*FIG. 45B* VFGATE — 6400 LINE

CENTRAL BINDING SECTION

LEFT EDGE SECTION OF A PAPER

RIGHT EDGE SECTION OF A PAPER

A. LEFT PAGE

*FIG. 45C* REFERENCE FOR A LEFT EDGE OF A PAPER — 3307 LINE

*FIG. 45D* REFERENCE FOR A CENTER OF A PAPER — 3307 LINE

*FIG. 45E* REFERENCE FOR A RIGHT EDGE OF A PAPER — 3307 LINE

B. RIGHT PAGE

*FIG. 45F* REFERENCE FOR A LEFT EDGE OF A PAPER — 3307 LINE

*FIG. 45G* REFERENCE FOR A CENTER OF A PAPER — 3307 LINE

*FIG. 45H* REFERENCE FOR A RIGHT EDGE OF A PAPER — 3307 LINE

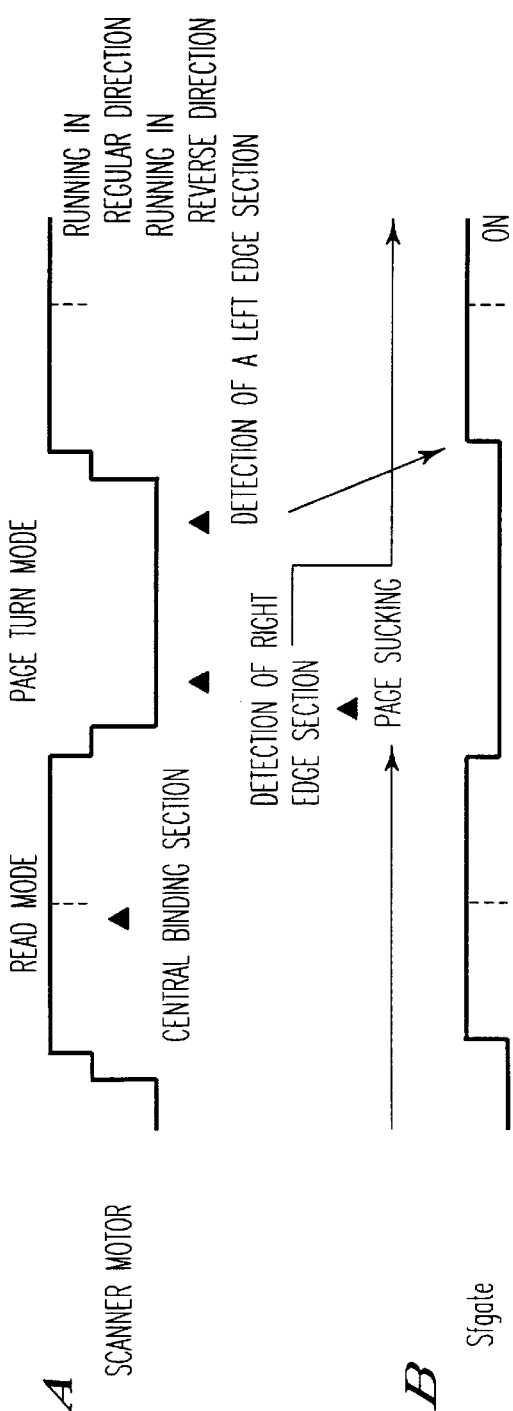
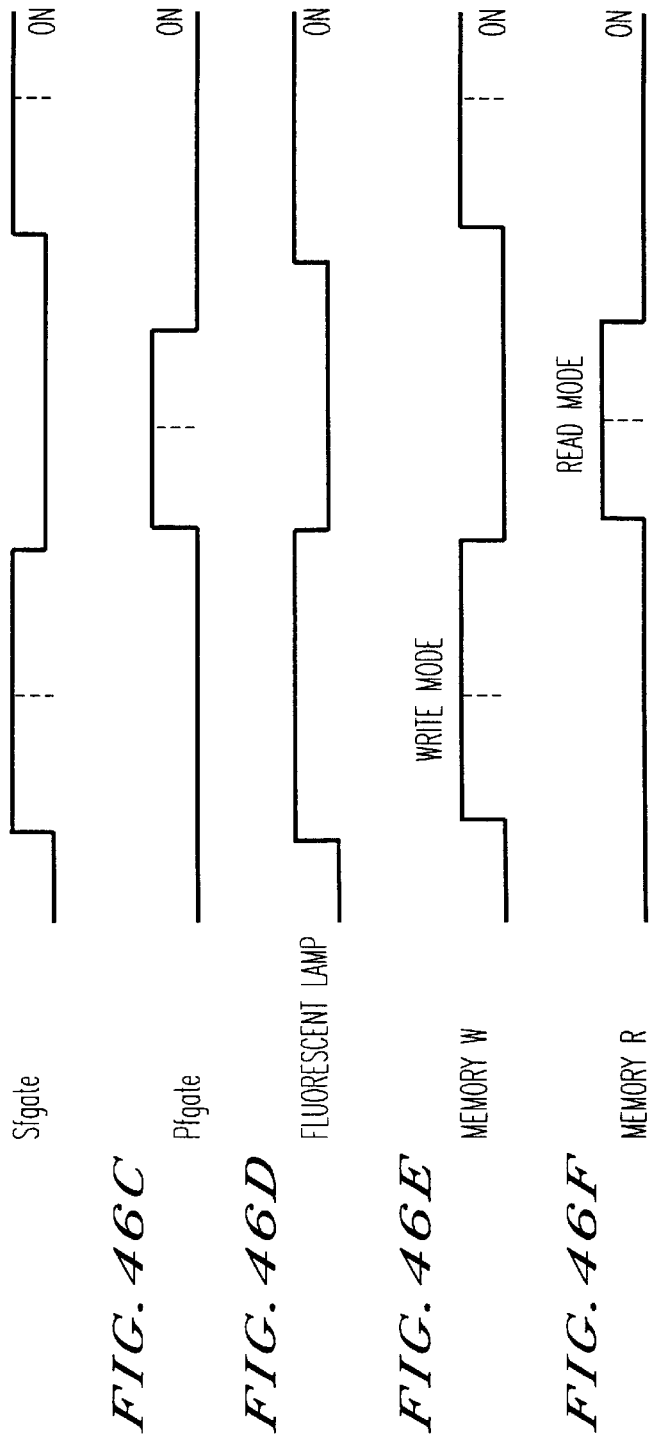

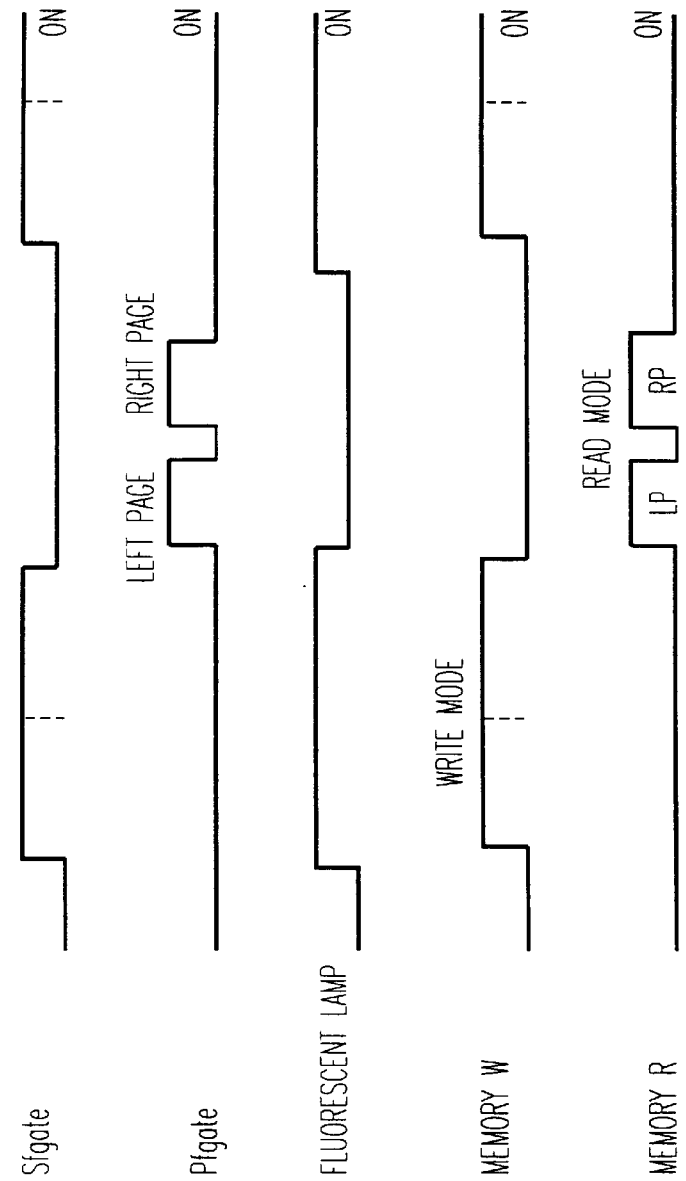

FIG.48A

| Bound Mono | | | 1 0 0 % |
|---|---|---|---|
| Right | P. 1 5 — 4 8 | P. | 2 4 |

FIG.48B

| Bound Mono | | 1 0 0 % |
|---|---|---|
| | P. 1 — 4 0 | |

FIG.48C

| Sheet | 1 0 0 % |
|---|---|

FIG.48D

| Memory range for expansion over |
|---|

FIG. 51
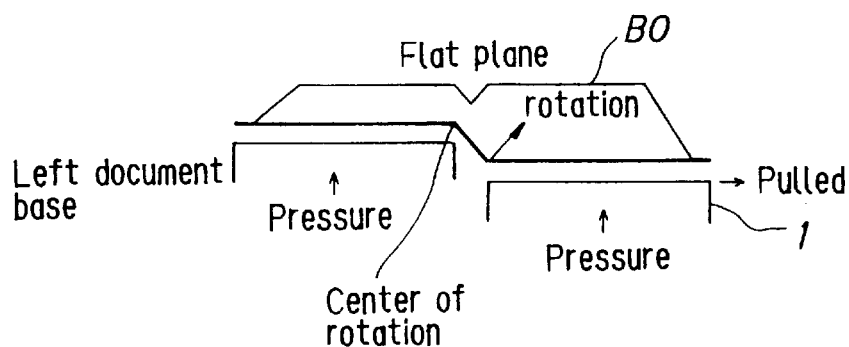
FIG. 52
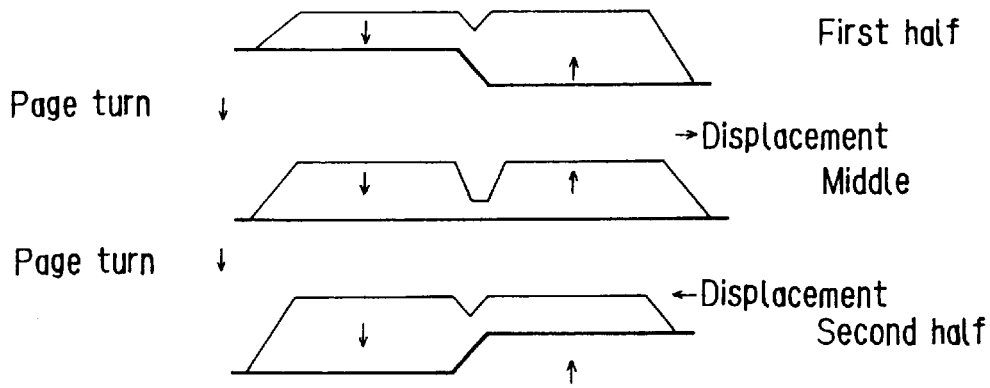
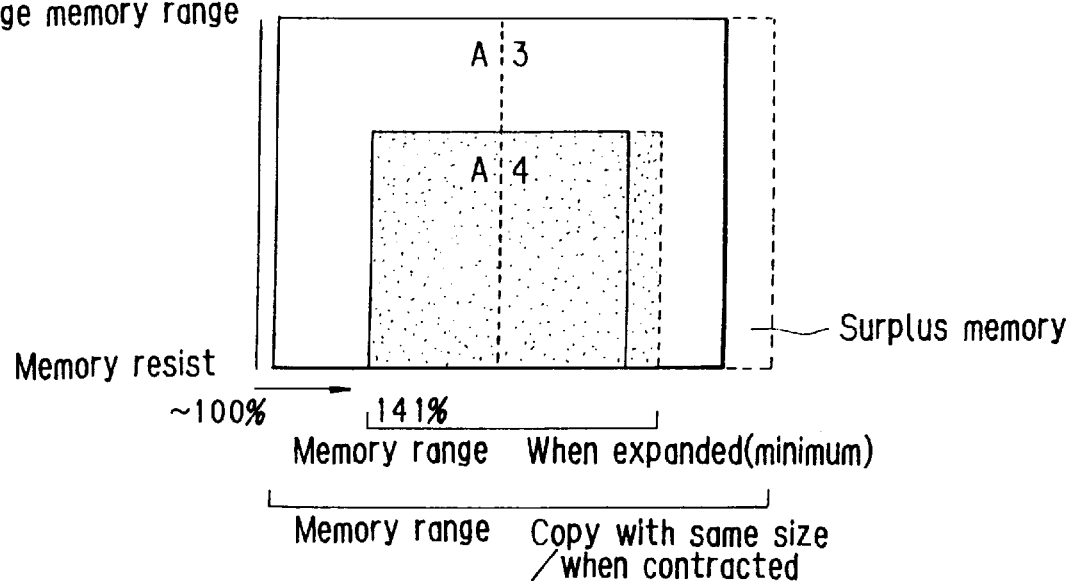

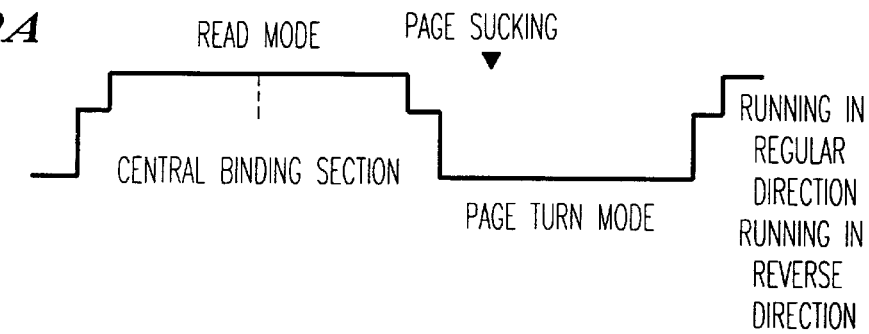
FIG.60A SCANNER MOTOR
FIG.60B Sfgate
FIG.60C Pfgate
FIG.60D FLUORESCENT LAMP
FIG.60E MEMORY W
FIG.60F MEMORY R
FIG.60G MOTOR FOR LEFT DOCUMENT BASE
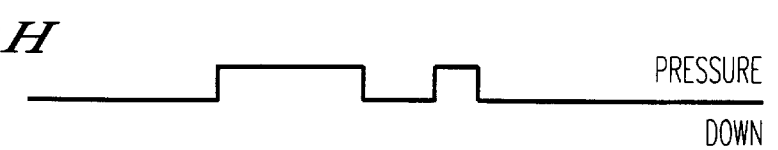
FIG.60H MOTOR FOR RIGHT DOCUMENT BASE

BOOK PAGE DOCUMENT IMAGE READING APPARATUS

This application is a Div. of Ser. No. 08/565,296 filed Nov. 27, 1995 now U.S. Pat. No. 5,798,841.

FIELD OF THE INVENTION

The present invention relates to a book page document image reading apparatus.

BACKGROUND OF THE INVENTION

In the conventional type of digital copying machine, a document is scanned and read, and the read image data is stored in a storage means, and a storage start position for the read data in this storage means is regarded as a fixed position corresponding to an upper stream side for reading and scanning. Also Japanese Patent Laid-Open Publication No. 268434/1993 discloses a duplex copying apparatus in which a storage device for storing either one of the right and left pages in a spread document is provided and a an image of a page in the next or previous spread page stored in the storage device and an image of a page related as a top or a rear page to the stored page image are copied on both top and rear surfaces of a sheet of recording paper simultaneously. In this duplex copying apparatus, an image storage area in storage device changes, but a position of a document is fixed, and to store images of document having different sizes at a standard position for each size of document, setting a spread document at an accurate page position is required. For this reason, it is essentially required to provide an input means for inputting a document size and decide an image storage range in a storage device according to a document size or to decide an image storage range in a storage device according to a document size by automatically determining a position of the document.

There is no book page image document reading apparatus based on the conventional technology which can read an image of a book page, a corner or an edge section of which is not aligned to the respective reference position when placed on a document base and changes a size of the image thereof. There is a copying machine which can automatically detect a size of a document and select a form for copying the document thereon.

In a book page document image reading apparatus for reading an image of a book page, in a case where a document of spread book pages is placed on a document base aligning the central binding position to the reference point and an image of a spread of book pages is read from an edge section of one of the pages and then the read image data is stored in an image memory, a range of an image data storage range in an image memory when an image is read with a multiplied size is limited due to a limited capacity of the image memory, and sometimes, a portion of an image to be read is lacked because image data for edge sections of an image to be read is lost in the read image data. When a portion of an image to be read is lacked, sometimes the output data is rather unpleasant to see when the image data is outputted from the image memory to a printer or the like and the image is formed.

As a document size is automatically detected in a case of the copying machine as described above, it is conceivable that it is also possible in a case of a book page document image reading apparatus to automatically detect a size of a book page document and decide an image data storage range in an image memory according to the detected book page document size. However in this case, a precision in book page document size detection is low and affected by each book page document, and sometimes it is difficult to detect a size of a book page image because a book page document may include graphics or due to a gap at an edge section of the book page document. Also when automatically and continuously copying a plurality sheets of book page document, different from a case where a sheet document is copied, generally it never occurs that a portion of a book page image is copied, and for this reason it is extremely difficult to detect a size of a book page document. Furthermore, a size of a book page document is generally not a fixed one, so that it is difficult to determine the size.

Also in the book page document image reading apparatus for reading an image of a book page document, if a book page document is placed on a document base with the central binding section being aligned to the reference position, an image of the spread book page document is read from one page edge section, and the read image data is stored in the image memory, an image data storage range in the image memory is limited due to a capacity of the image memory, and sometimes image data for an edge section of the read image is lacked from the read image data.

Namely, in the image memory a position for starting storage of read image is a fixed position corresponding to the upstream side in the reading/scanning direction. However, a position of a page of a spread book page document displaces in association with page turning, so that a position where the read image data is stored in the image memory changes and sometimes the read image data can not be stored within a prespecified image data storage range, and for this reason sometimes a portion of the read image is lacked. In a case where a portion of read image data is lacked, when the image data is outputted to a printer for forming the image on a form, the form may become unpleasant to see.

As a size of a document is automatically detected in the copying machine as described above, it can be considered that a document size may automatically be detected and an image data storage size in the image memory may automatically be decided according to the detected book page document size. However, this case, precision in detection of the book page document size is low and the precision is affected by a type of the book page document in such a case as that where, for instance, the book page document includes graphic pages and a step is generated between edge sections of each page, and in that case it is difficult to detect a size of a book page document accurately. Also in a case where a plurality of pages of a book page document a re automatically copied, different from a case where a sheet document is copied, it seldom occurs that only a portion of a page image of the book page document is copied, so that detection of the book page document size is quite difficult. Furthermore, a percentage of book page document having irregular size is substantially high, which also makes it difficult to accurately determine a size of a book page document.

SUMMARY OF THE INVENTION

It is an object of the present invention to provide a book page document im age reading apparatus which can solve the problems as described above and can prevent lacking a portion of an image to be read when read with an enlarged size or generation of unpleasant images to see. Also it is another object of the present invention to improve the problems described above and to provide a book page document image reading apparatus for insuring a range for storage of image data in a storage means regardless of displacement of a position of pages in a spread of book pages.

In the present invention, a reading means reads an image of a spread of book pages placed aligning a central binding section thereof to the reference position from an edge section of one of the pages, and an image size changing means changes a size of an image read by the reading means. The read image data after size change is stored in a storage means, and a range for storing image data in this storage means when a book page document is read with the same size is different from a range for storing image data in the storage means when a book page document is read with a changed image size.

In the present invention, a reading means reads an image of a spread of book pages placed aligning a central binding section thereof to the reference position from an edge section of one of the pages, and an image size changing means changes a size of an image read by the reading means. The read image data after size change is stored in a storage means, and a position where storage of the image data after size change is started in this storage means is decided according to an image size change factor when a book page document is read.

In the prevent invention, the reading means read an image of a spread of book pages, and an image size changing means changes a size of an image read by the reading means. The image data after size change is stored in a storage means, and a warning means generates an warning when a range for storage of image data after size change in the storage means is out of a prespecified range, or when a range for reading image data from the storage means is out of a prespecified range.

In the present invention, the reading means reads an image of a spread of book pages, the read image data is stored in the storage means, and if the image data is read out from the storage means and the outputted address is out of a prespecified range, blank data is outputted.

In the present invention, the reading means reads an image of a spread of book pages, and the image size changing means changes a size of the image read by the reading means. The image data after size change is stored in the storage means, and an output means outputs the image data read from the storage means. A page turning means turns pages of a spread of book pages, and a range for storage of the image data in the storage means when the image size is changed is computed by a computing means. A page size of the book page document is detected by a page size detecting means, and a comparing means compares the page size detected by the page size detecting means to a range for storage of image data computed by the computing means when the image size is changed.

In the present invention, the reading means reads an image in a spread of book pages from an edge section in one page of the spread documents, and the page turning means turns pages of the book page document from an edge section in the other page of the book documents. The read image data is stored in the storage means, and suppress of an image data storage range is located in an edge section of the page turning side.

In the present invention, the reading means reads an image in a spread of book pages, the page turning means turns pages of a book page document. The storage means has a storage capacity which corresponds a size of 2 or more pages in a case of maximum allowable page size of a book page document, and at the same time to a size of 2 maximum allowable page of a book page document plus a size for a maximum thickness of a book or less and stores the read image data therein.

In the present invention, the reading means reads an image in a spread of book pages from an edge section in one page of the book documents, and the page turning means turns pages from an edge in the other page of the book documents. The read image data is stored in the storage means, and a position of an edge section in a spread of book pages is detected by the page edge section detecting means when page is turned. After the position of a page edge section in a spread of book pages has been detected, a start point of storage for image data in a spread pages in the storage means is decided by a detecting signal from the page edge section detecting means.

Other objects and features of this invention will become understood from the following description with reference to the accompanying drawings.

BRIEF DESCRIPTION OF THE DRAWINGS

FIG. 21 is a timing chart showing an operation of the device above for saving the document base;

FIG. 22 is a schematic view showing a state where scanning by the scan unit starts and a state where scanning by the scan unit ends;

FIG. 23 is a schematic view showing a state where scanning of a book page document by the scan unit starts;

FIG. 27 is a timing chart showing operations of the scan unit;

FIG. 44 is a timing chart for explanation of an image area in the spread mode in the apparatus;

FIG. 45 is a timing chart for explanation of an image area in the independent page mode in the apparatus;

FIG. 46 is a timing chart showing a timing of copying operation in the book page document mode in the apparatus;

FIG. 47 is a timing chart showing a timing of copying operation in the book page document mode in the apparatus;

FIGS. 48A to 48D are views showing an example of display in a guidance display section in the apparatus;

FIG. 51 is a view for explanation of a book page document support in the apparatus;

FIG. 52 is a view for explanation of displacement due to page turning for a book page document in the apparatus and an image data storage area in an image memory;

FIG. 60 is a timing chart showing timing chart for a copying operation in the book page document mode in the apparatus;

DESCRIPTION OF THE PREFERRED EMBODIMENTS

Figure 1:
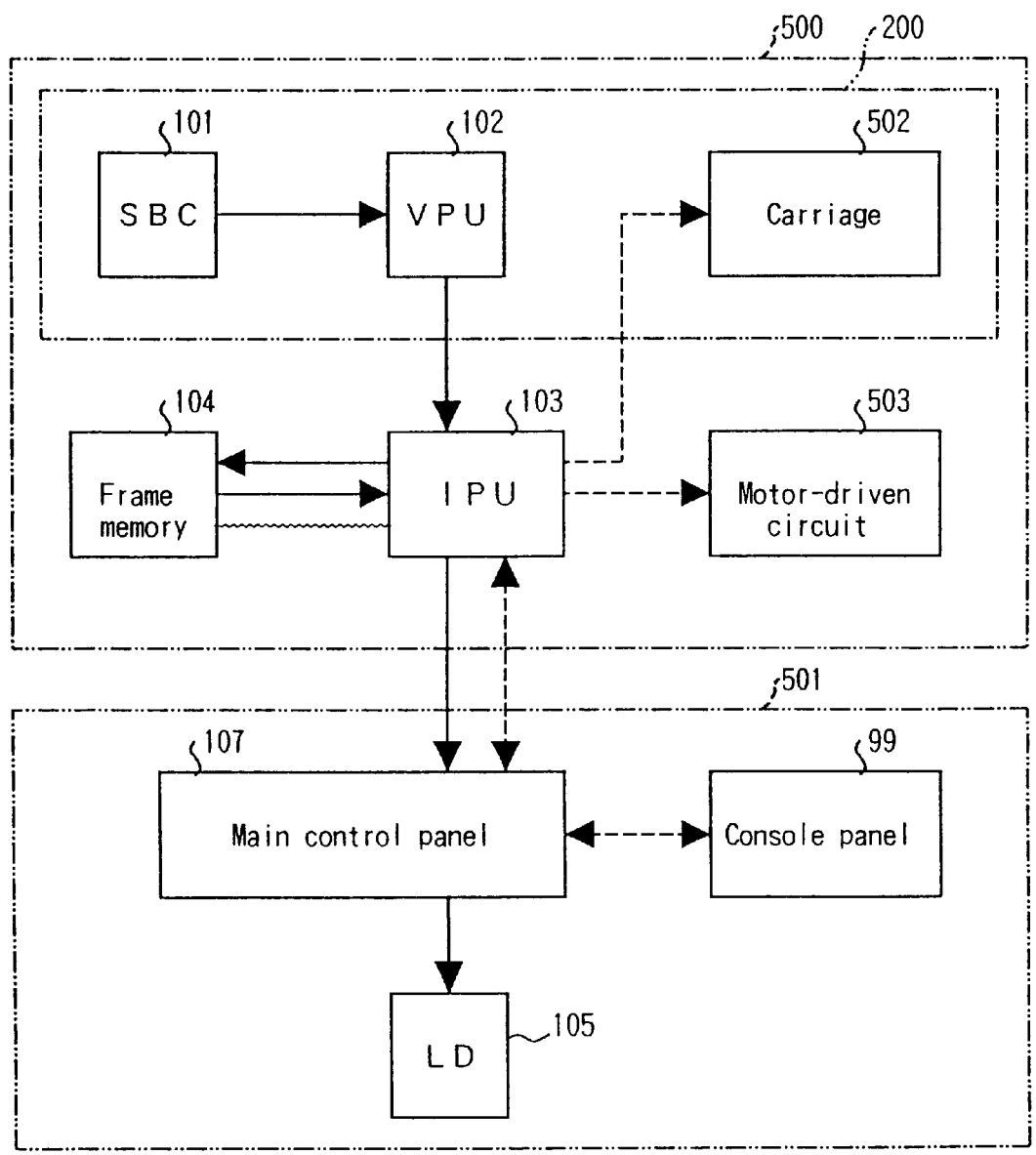
FIG. 1 is a block diagram showing circuit configuration in an example of a book page document image forming apparatus in which the present invention is applied.

FIG. 1 shows an example of a book page document image forming apparatus according to the present invention. The book page document image forming apparatus is an apparatus which outputs an image read by a book page document/sheet document image reading apparatus (TPS: Turn the Page Scanner) by a printer based on an electrophotographic system, and comprises a scanner section 500 to read a document and a printer 501 to form an image, and the scanner section 500 has a scan unit 200 for reading a document by scanning and at the same time turning a page thereof. The scan unit 200 comprises an image read plate (SBU) 101 having CCD for reading a document image, a VPU (Video Processing Unit) 102 for executing a process of a signal for an analog image from this image read plate 101 to A/D conversion, and a carriage 502 for relaying a signal line of load system in the scan unit 200 such as a fluorescent lamp for lighting a document as well as an inverter power thereof, a heater, a thermistor, a fan, and a solenoid and a wiring of a power line. This carriage 502 and VPU 102 each are connected to an IPU (Image processing Unit) 103 with an independent flexible cable respectively.

The IPU 103, which is detachable from connector, provides a frame memory 104 comprising DRAM module for storing a signal for a scanned image, and a microcomputer in the IPU 103 provides a control to load such as a stepping motor for scanning the scan unit 200 and a DC motor for driving the image base via a motor driving circuit 503 and at the same time drives a sensor.

The printer 501 has a main control panel 107 comprising a main control section for controlling a copying mode and fetching a key signal as well as controlling a display for an operating section 99 and a sequence control section for controlling a timing of copying, and each microcomputer in the main control section and IPU 103, a sequence control section, and operating section 99 transmits and receives commands to each other with serial communications. The main control panel 107 provides a control to inputting of sensors relating to forming of an image in the printer 501, a motor, a solenoid, and a clutch, and provides a sequence control to image forming.

Figure 2:
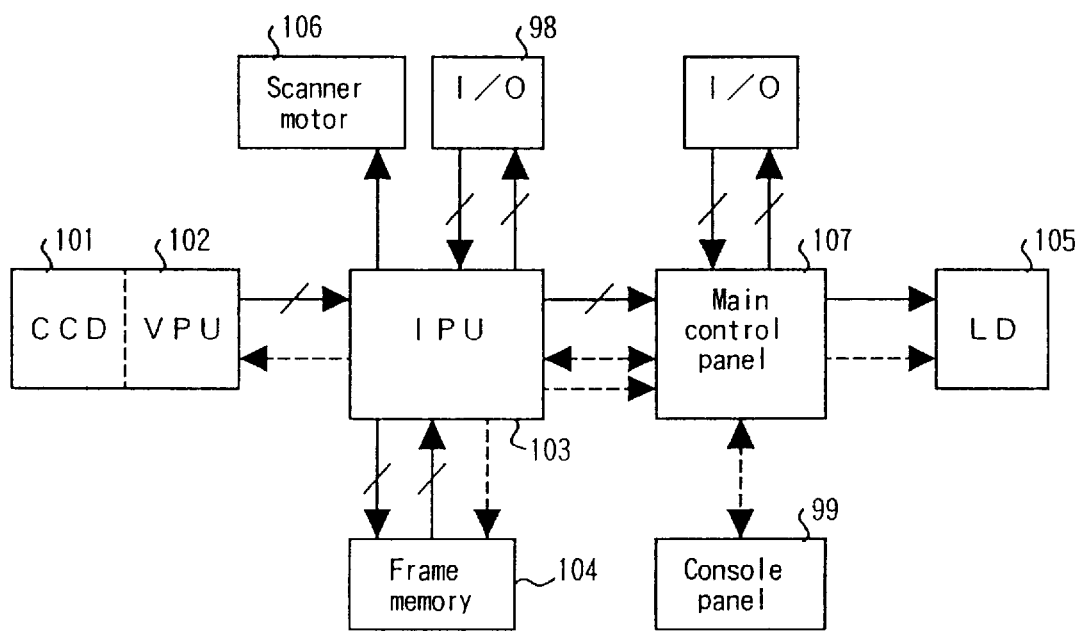
FIG. 2 is a block diagram showing data processing flow blocks in this apparatus.

FIG. 2 shows blocks for a data processing flow of the apparatus. This apparatus is largely divided into an image scanning section in the TPS, an image data processing section, and an image forming section. The image read plate 101 provided at a right edge section of the scan unit in the TPS has a CCD. The VPU 102 supplies a drive signal to the CCD according to a reference signal from the IPU 103, executes steps in a range from correction of an analog output signal from the image read plate (scanning sensor) 101 to digital conversion, and then obtains scanned image data having 8 bits each dot.

The VPU 102 outputs the scanned image data with 8 bits for each dot to the IPU 103 at a speed of approx. 7.5 MHz by synchronizing the image data to a clock and a gate signal in a direction of main scanning, and the IPU 103 executes processing for zooming of the image data from the VPU 102 or processing for high-quality image of an electrophotography. The IPU 103 subjects the image data to a grey-level processing including therein γ-correction thereof in the final step of the image data, converts the image data to video data with 4 bits each dot suitable for writing, and stores the image data after processed in the frame memory 104.

In the apparatus, there is a difference between a scanning speed and a speed for forming an image in the printer 501 such as a scanning speed of a book page document: 90 mm/sec, a scanning speed of a sheet document: 90 mm/sec, a speed for forming an image: 180 mm/sec, and the frame memory 104 having a memory capacity equivalent to one page of size A3 is used for the speed buffer. Also TPS scans a book page document by contacting the document, so that image data is read out repeatedly a plurality number of times when being copied repeatedly, which makes the frame memory 104 effective to protect an image when being repeatedly copied. Furthermore, in the apparatus, when pages are continuously copied which means images in a spread page of the book page document are to be printed each independently, the images each in a right page and a left page can be divided to each of the pages to be outputted by using the frame memory 104 at one scanning, so that the TPS does not require a synchronized scanning to write an image in a laser printer 501 constituting the image forming section or another scanning thereto.

Furthermore, the frame memory 104 composed of 4 bits for each dot is provided in the back stage than the IPU 103 according to a responding capability to a speed of IPU 103 and the image data after the image processing by the IPU 103 is stored in the frame memory 104, so that a capacity of the frame memory 104 to the scanned image data with 8 bits each dot is made to a half capacity thereof. Input of image data from the IPU 103 to the frame memory 104 is executed by inputting image data equivalent to the quantity of 2 dots in parallel, and sequentially executed at a speed of approx. 3.8 MHz. On the other hand, the image data from the frame memory 104 is also outputted by a quantity equivalent to 2 dots of the image data in parallel, the outputted image data synchronizes to a clock and a gate signal in a direction of main scanning and a direction of auxiliary scanning transmitted from the IPU 103 at a speed of approx. 7.5 MHz, and is sequentially outputted to the main control plate 107.

The main control panel 107 sets image data outputted from the frame memory 104 at high velocity in accordance with a speed for image forming in the laser printer 501 to serial image data having a speed of approx. 15 MHz, speeds the serial image data in the main scanning direction in a FIFO (First In First Out) memory, and synchronizes the image data to a clock for writing with approx. 18 MHz. In this image data with 4 bits each dot, the pulse width thereof is modulated in a modulating section to become emitting time data, and is transmitted to the laser (LD) controller by synchronizing to the write clock as PWM data. The LD controller makes the LD 105 of the laser printer 501 based on the electrophotographic system emit light via the LD driver according to the PWM data, and scans a photoconductive body by exposing to form an image.

The IPU 103 provides a control to scanning for the scan unit 200 in the TPS, drives a scanner motor 106 comprising the stepping motor for scanning the scan unit 200 when a sheet document image is scanned and when a book page document is scanned and scans the scan unit 200 at a constant speed of a scanning speed: 90 mm/sec, and scans the scan unit 200 at a linear speed of a range from 1.41 times to 0.71 times each corresponding to the range when an image is zoomed including a zoom range from 71% to 141%.

The scanner motor 106 scans the scan unit 200 at a speed of 120 mm/sec when the scan unit 200 is returned to the scanning start position and when a book page document is turned over. Also the IPU 103 has a SCSI interface 98 for transferring scanned image data to other system devices such as a printer or a work station, and the main control panel 107 fetches a signal from the operating section and outputs a signal to the operating section 99.

Figure 3:
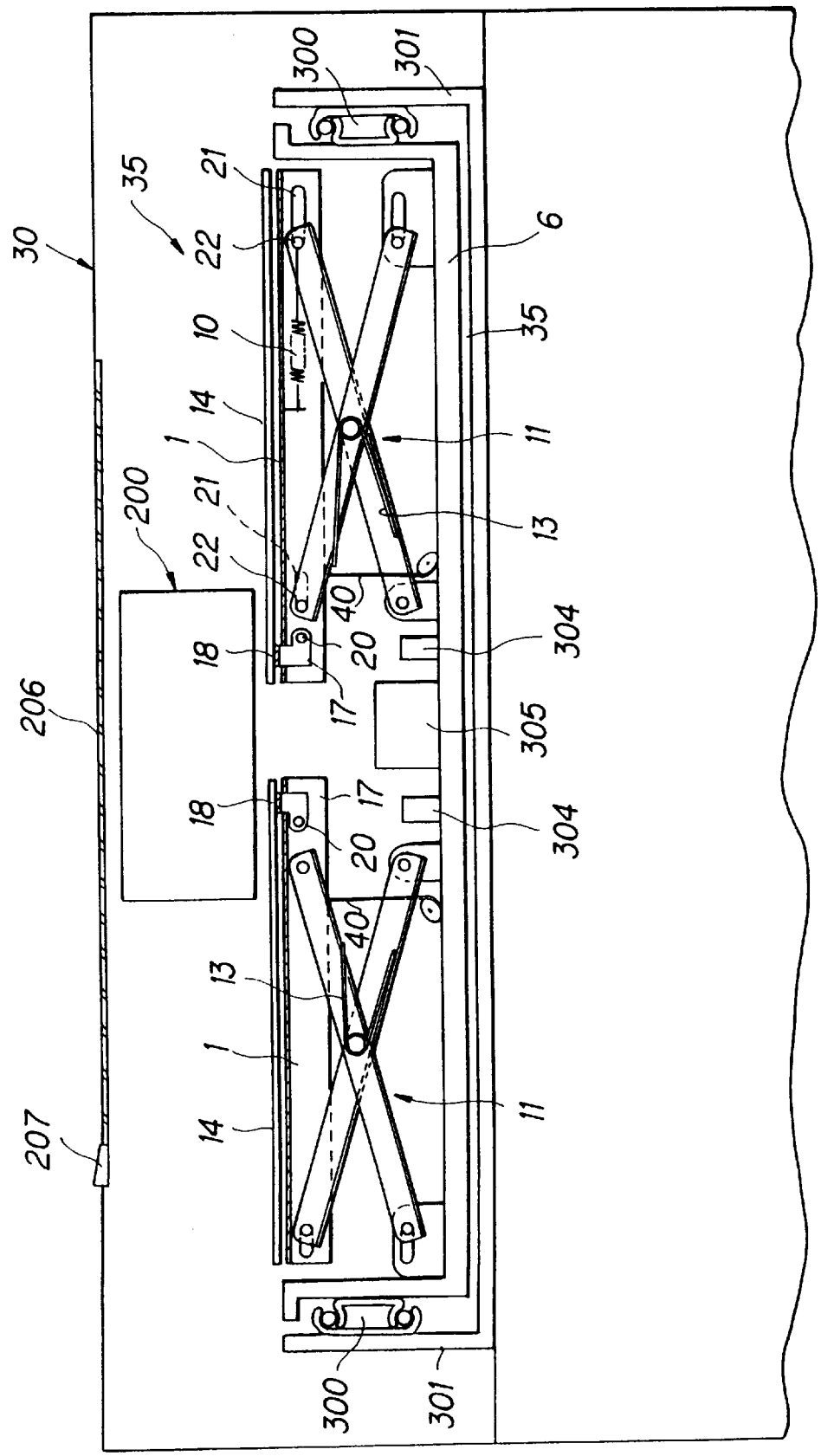
FIG. 3 is a cross-sectional view showing an image reading section in the apparatus.

FIG. 3 shows a general configuration of the TPS. This TPS has a base 206 for placing thereon a document comprising a contact glass in the upper section of the device body and a scale 27 provided therein, and any document such as a sheet document is placed on this contact glass 206, then the document is covered with a platen not shown herein. A document on the contact glass 206 is scanned with the scan unit 200. The upper half section of the device body in the TPS is a scanner unit 30, and the scan unit 200 scans a document by running in right/left directions as shown in FIG. 3 inside the scanner unit 30.

Figure 4:
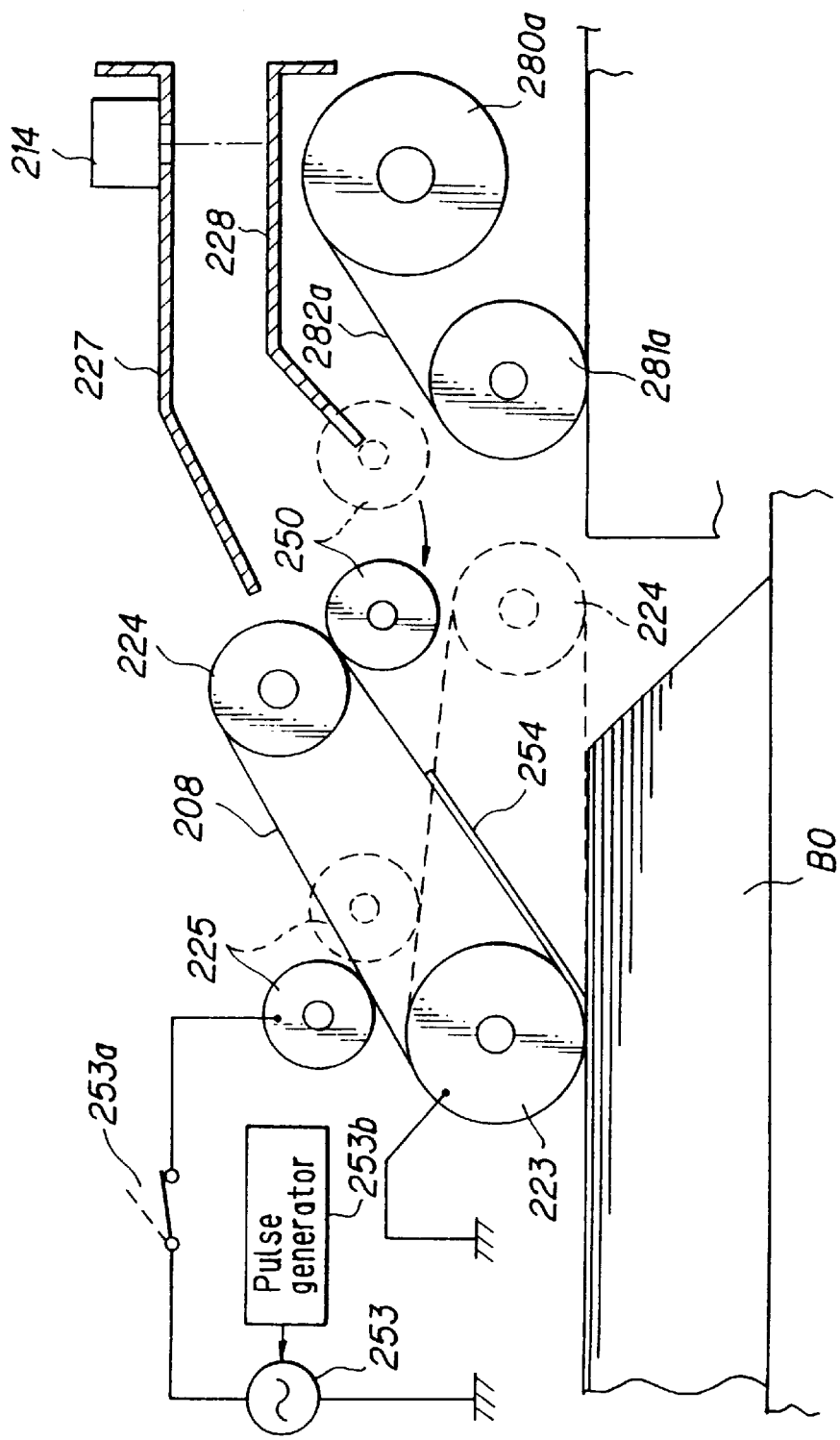
FIG. 4 is a cross-sectional view showing a page turning section in the apparatus.

FIG. 4 shows a page turn section of the scanning section 200 in the present device. A turning belt 208 in the device, of which materials comprise PET, PC, and PVC, comprises a resin film having a double-structure-based surface layer comprising a high-resistance film with a surface resistance of $10^{14}$ Ω or more and a rear surface layer comprising a low-resistance with a surface resistance of $10^8$ Ω or less. Also a turning belt driving roller 223 comprises a metal roller covered with conductive rubber on the surface thereof and is grounded, and for this reason accurate driving of a turning belt 208 and ground are realized. The turning belt 208 is stretched by the turning belt driving roller 223 and a turning roller 224, and is rotated and driven with the turning belt driving roller 223.

Furthermore, an electrifying roller 225 comprises a roller covered with conductive rubber on the metal roller or the surface of the metal roller, and high voltage of ±2 to 4k V is loaded from a AC current 253 to this electrifying roller 225 via a switch for switching 253a at a specified timing. The AC current 253 is controlled by a pulse from a pulse generator 253b. The scan unit 200 runs to turn ON the switch 253a for switching at the timing described later while the turning belt 208 is driven, and when an AC high voltage which is a value range from ±2 to 4k V suitable to a frequency of the pulse generator 253b is loaded to the electrifying roller 225 through the high voltage power 253, an alternating electric field is generated on the surface of the turning belt 208 with the electrifying roller 225, and with effects of this alternating electric field, a attracting force for attracting the top page 254 of a book page document BO is generated on the surface of the turning belt 208. The high voltage power 253 is provided in the scan unit 200.

Figure 5:
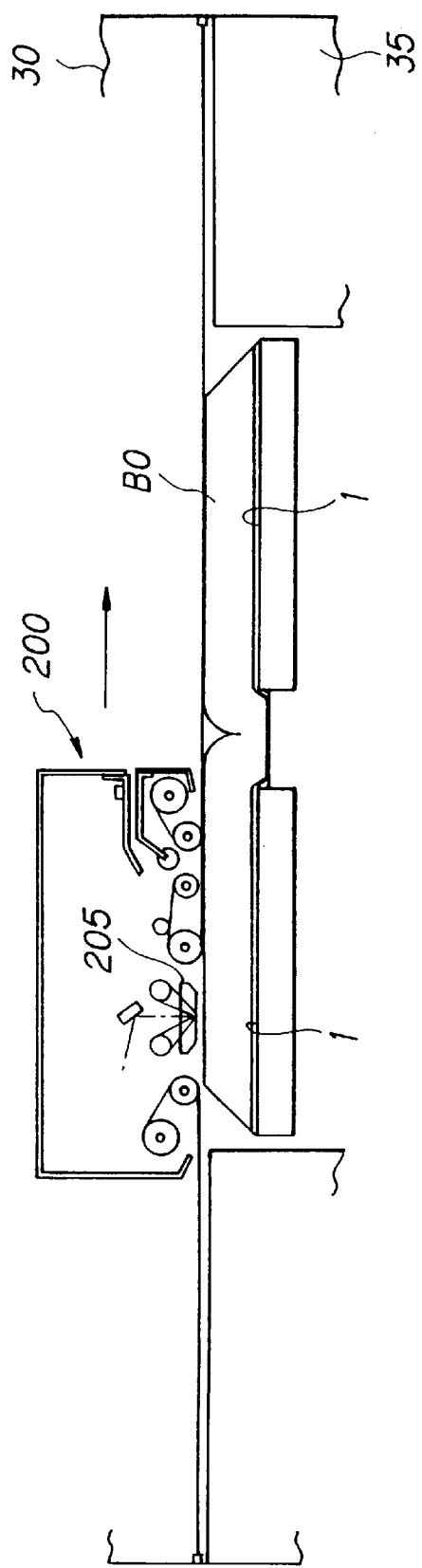
FIG. 5 is a schematic view showing a state in which a scan unit in the apparatus is scanning a book page document.

When a document is started to scan, the scan unit 200 at the home position thereof which is a left edge section of the scanner unit 30 is started to run in the rightward in FIG. 5. In this step, the turning belt 208 and the page feed roller 250 are transferred to a position indicated with a solid line in FIG. 4 by a solenoid not shown herein. Then, when the position for scanning a document in the lower side of the platen glass 205 in the scan unit 200 has traveled onto the left page of the book page document BO, as shown in FIG. 5, the scan unit 200 starts scanning operation of the book page document and the scanning operation goes on along the document surface from the left page to the right page of the book page document BO. Herein, a start position of scanning by the scan unit 200 is variable according to a size of a book page document BO.

As described above the scan unit 200 scans a document surface from the left page to the right page of a book page document BO. The turning belt 208 and the page feed roller 250 are held at the position indicated with the solid line in FIG. 4 during the scanning operation by the scan unit 200 as shown in FIG. 5. Then when the scan unit 200 finishes to scan until the edge of the right page in the spread page of the book page document, the direction for scanning a document of the scan unit 200 is reversed as shown in FIG. 6.

Figure 6:
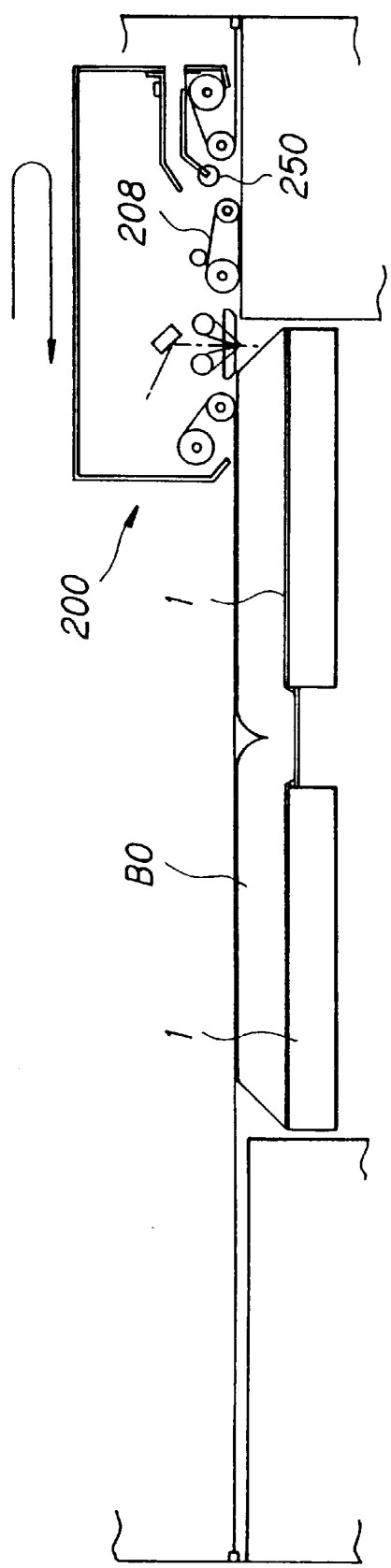
FIG. 6 is a schematic view showing a state where a direction of scanning by the scan unit in the apparatus is reversed.

In this step, as shown in FIG. 6, the turning belt 208 and the page feed roller 250 are transferred to the position indicated with the broken line by the solenoid not shown herein. Also the switch 253a for switching is turned ON substantially simultaneously with the step described above, an AC high voltage of specified frequency is loaded to the electrifying roller 225 with the pulse generator 253b and the high voltage power 253 via the switch 253a for switching thereof, and a charged pattern is formed on the surface of the turning belt 208.

Figure 7:
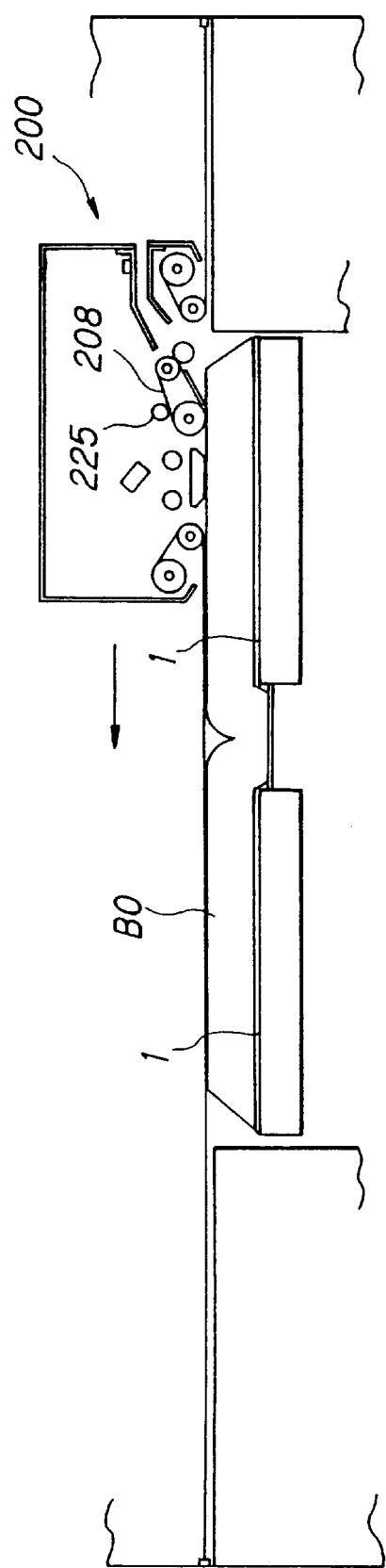
FIG. 7 is a schematic view showing a state where a page is being turned and scanned by the scan unit in the apparatus.

When pages of a book page document are started to be turned over, the turning belt 208 and the page feed roller 250 are present at the position indicated by the broken line in FIG. 4, and the electrifying pattern section formed on the surface of the turning belt 208 before the page is turned is superimposed on the top page 254 of the book page document BO. And, when the edge of the top page 254 thereof has passed over the central position in the lower side of the turning belt 208, as shown in FIG. 7, the turning belt 208 and the page feed roller 250 are transferred to the position indicated by the solid line in FIG. 4 with the effects of a solenoid not shown herein. With this configuration, the only top page 254 thereof is attracted up onto the surface of the turning belt 208 by the attracting force due to a non-uniform electric field of the charged pattern formed on the surface of the turning belt 208, and the edge section of this top page 254 is held up with the turning belt 208.

Figure 8:
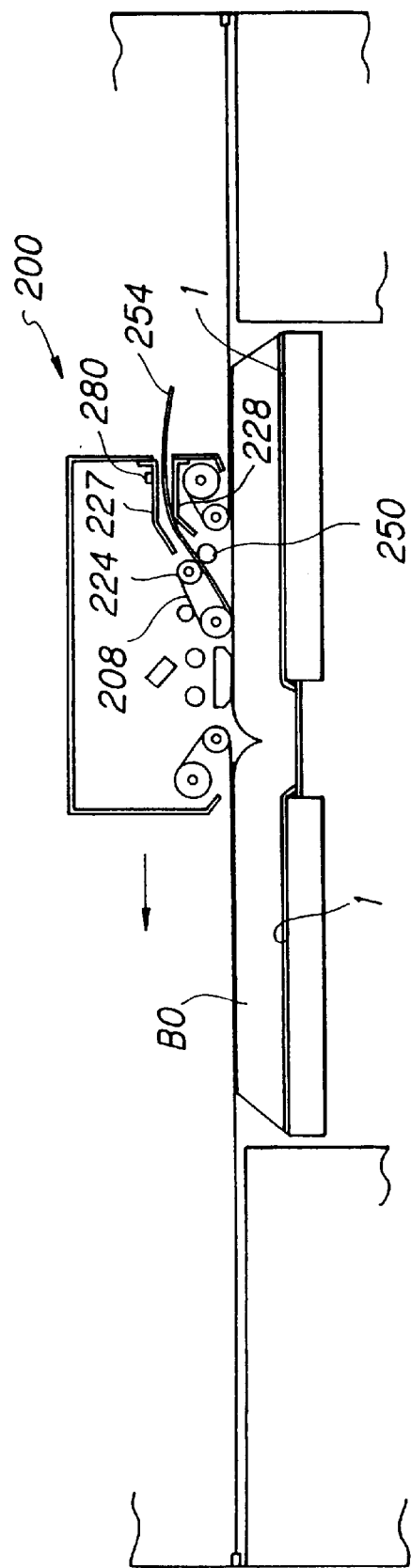
FIG. 8 is a schematic view showing a state where the scan unit in the apparatus is scanning other book page document.

When the top page 254 of the book page document BO has been pulled up, the scan unit 200, as shown in FIG. 7, travels again to the home position for the edge section, and the top page 254 of the book page document BO is held, as shown in FIG. 8, by the turning roller 224 and the page feed roller 250 to be transferred without fail. This top page 254 thereof passes through between a pair of upper and lower page guides 227 and 228 each provided in the right side of the scan unit 200, and the edge side of the document is fed out to the right outside of the scan unit 200. In this step, a page sensor 214 attached to the upper side of this scan unit 200 detects a page of the document to be fed out to the right outside of the scan unit 200, and it is detected that the page of the document is correctly turned over therein.

Figure 9:
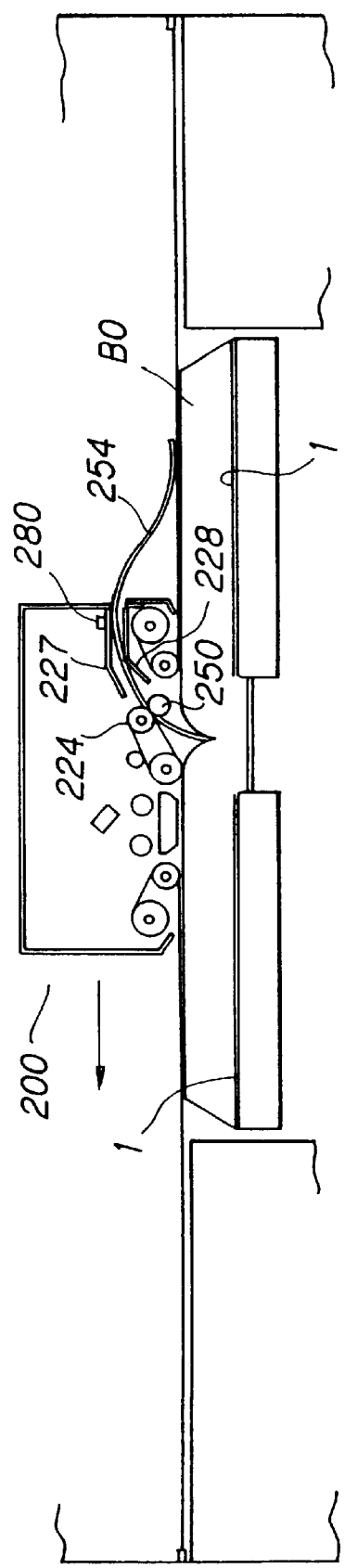
FIG. 9 is a schematic view showing a state where a page is being turned and scanned by the scan unit in the apparatus.
Figure 10:
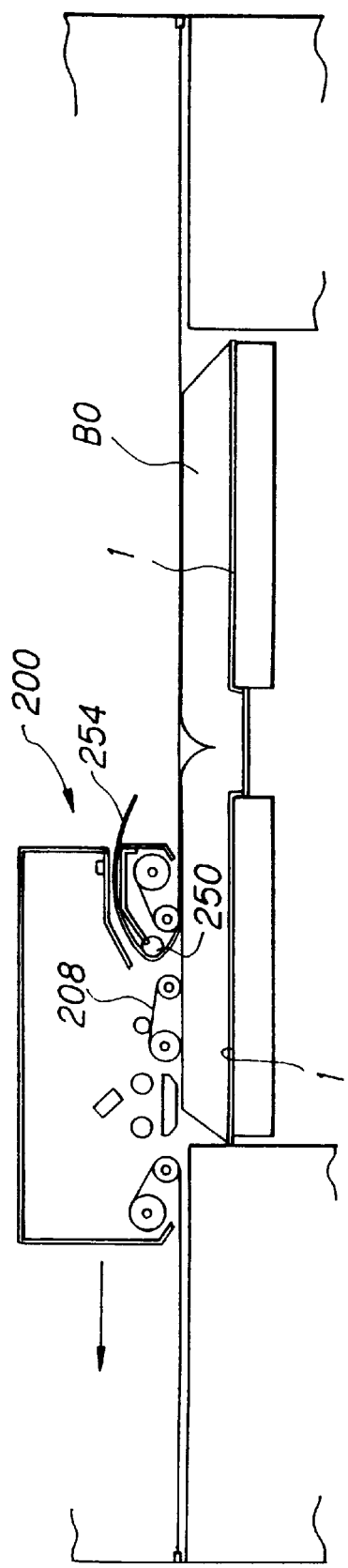
FIG. 10 is a schematic view showing a state where other page is being turned and scanned by the scan unit in the apparatus.

Then as shown in FIG. 9, at a point of time when the top page 254 of the book page document BO is pulled up to the binding section of the book page document, the turning belt 208 and the page feed roller 250 are returned to the original position (indicated with the broken line in FIG. 4). In this state, the scan unit 200 further travels to the edge section home position, and as shown in FIG. 10, while the pulled up document page is being returned through between the pair of page guides 227 and 228 by being pulled to the binding section of the book page document, the pulled up document page is superimposed on the left page of the book page document and is discharged from the scan unit 200.

When the document page entirely picked up has been superimposed on the left page of the book page document BO, image reading and page turning to spread of book pages for one time operated by the scan unit 200 is completed. Herein, in a case where image reading and page turning to the book page document are repeatedly operated, or any one of the image reading and page turning is repeatedly operated, travelling direction of the scan unit 200 is reversed and reciprocal movements of the scan unit 200 is repeated at the shortest way to the document surface of the book page document simultaneously when the picked up document page has entirely been superimposed on the left page as described above. It should be noted that there is also a case where the scan unit 200 operates only to read the book page document, or operates only to turn pages. It should be noted that the scan unit 200 may sometime operate only image reading or only page turning to the book page document BO.

Turning over the document page electrostatically attracted to the turning belt 208 is executed by the facts that the turning belt 208 is moved up to the upper side by the solenoid and that the edge section of the page attracted to the turning belt 28 is held up to the side of scan unit 200. In this operation, it is detected by the page sensor 214 whether a page of the book page document BO has been picked up or not. In a case where a page is not detected by the page sensor 214 at a prespecified timing when page turning, the page turning operation is executed again.

Figure 11:
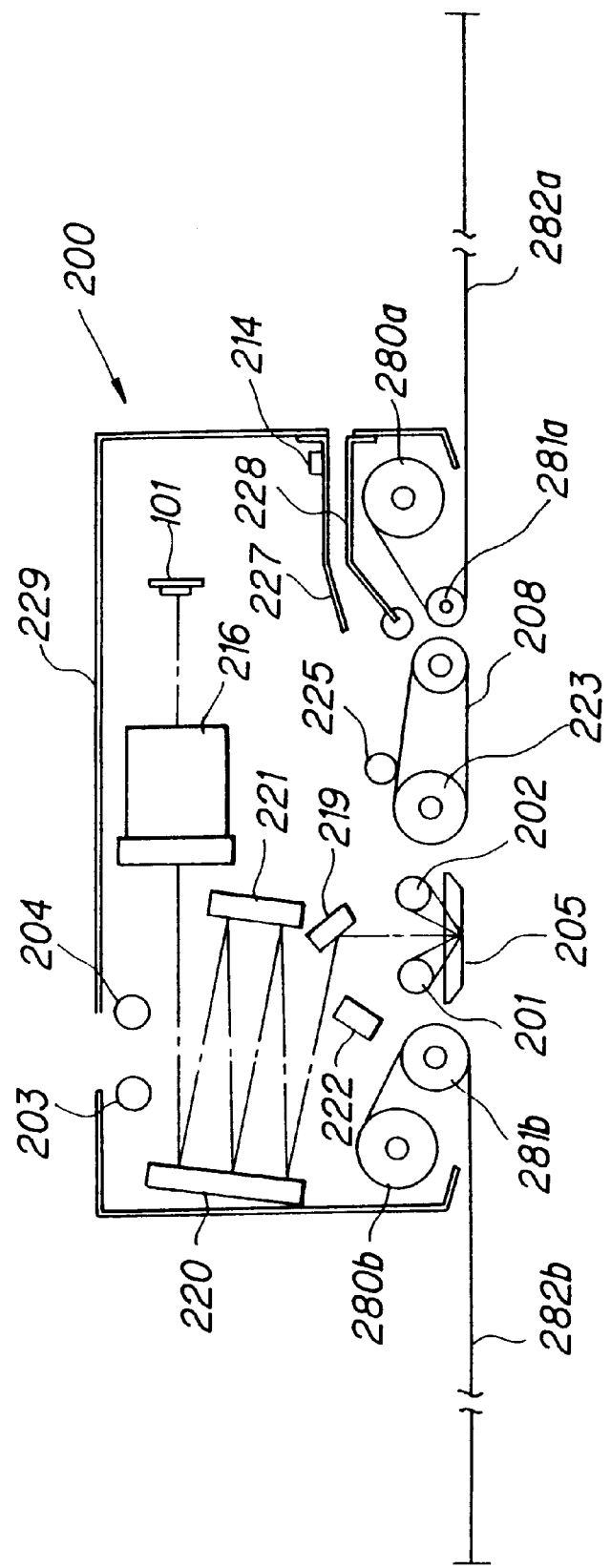
FIG. 11 is a cross-section view showing outline of the scan unit.

As shown in FIG. 11, a mirror 222 is driven by a solenoid for switching the mirror, and a lower read light path which has a specially designed function for the book page document and an upper read light path which has general function for a sheet document are switched to each other depending on movements to the light path by the mirror 222 according to turning ON/OFF of the mirror switching solenoid. As a light source for lighting a document, each two fluorescent lamps 201, 202, 203, 204 provided in each of the upper and lower read sections in the scan unit 200 are used respectively.

When a document on the contact glass 229 is to be read, the mirror 222 moves into the light path, the document on the contact glass 229 is lit up by the fluorescent lamps 203 and 204, the reflected light thereof is focused through the mirrors 222, 220, 221, and a lens 216 onto the CCD on the image read plate 101, and is photoelectrically transferred. Also when a book page document is to be read, the mirror 222 moves back from the light path to light the book page document on the document base 1 through the platen glass 205, and the reflected light is photoelectrically transferred by being focused through the mirrors 219, 220, 221, and the lens 216 on the CCD on the image read plate.

Figure 12:
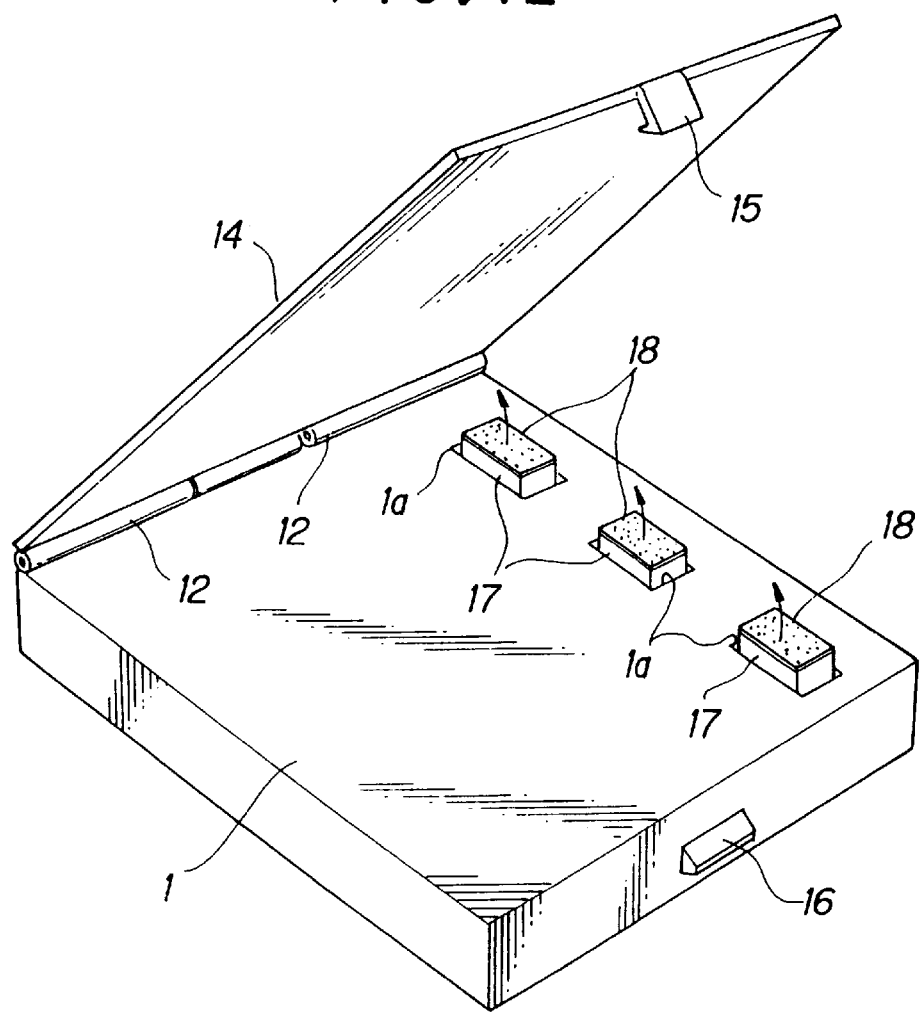
FIG. 12 is a perspective view showing a document base in the apparatus.

By the way, in a document base unit 35 according to the present apparatus as shown in FIG. 3, the document bases 1 are provided on the right side and left side from the center of the device body respectively, and both of them are up-and-down movably supported by linkage mechanism 11. Each document base 1 is pressured to the upward direction respectively by springs 13 attached to the linkage mechanism 11. Also as shown in FIG. 12, a document pressure plate 14 is supported rotatably to the document bases 1 through hinges 12 in the inner side of the document bases 1. A stopper claw 15 is provided at the edge section of this document pressure plate 14 so that this stopper claw 15 is engaged with a stopper 16 provided in the front side of the document base 1 when the document pressure-loading 14 is inverted on the document base 1 in FIG. 12. As described above, in the document base unit 35 of the present apparatus, a stopper mechanism of the document pressure plate 14 is provided in the front side of the document base unit 35, so that the document pressure-loading 14 is easily operated.

On the other hand, a plurality number of holes 1a are provided on the upper surface of the document base 1, a portion of stators 17 is projected from these holes 1a. Rubber plates 18 are mounted each on the upper surfaces of these stators 17 to securely pressure and fix thereto surfaces of the book page document BO. Each of the stators 17 is rotatably supported respectively by a rotary shaft 20 (Refer to FIG. 13) fixed to near the central section in the unit of the document base 1. Furthermore, each stator 17 is energized respectively in the direction as indicated by the arrow mark in FIG. 12 by a spring not shown herein.

Figure 13:
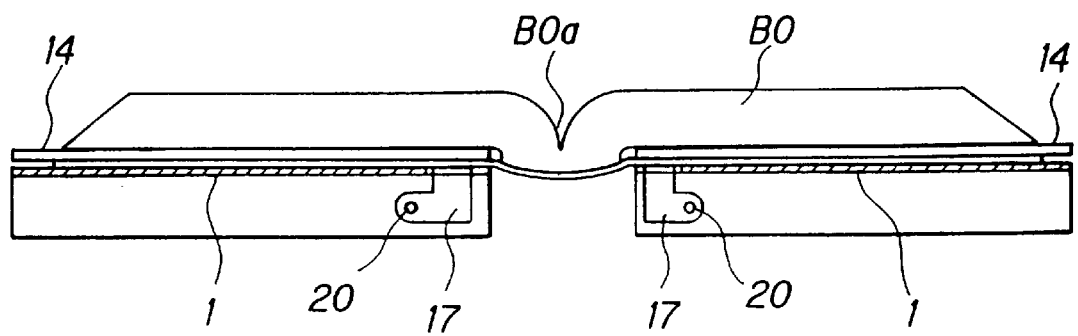
FIG. 13 is a cross-sectional view showing a portion of the apparatus where a book page document is placed.

With this configuration, as shown in FIG. 13, a book page document BO is securely secured onto the document bases 1 by binding the top cover page and the rear cover page of the book page document BO between the document pressure plate 14 and the document bases 1 and by engaging the stopper 15 of the document pressure plate 14 with the stopper 16. In this case, in the present apparatus, each stator 17 is provided near the central side from the unit of the document base 1, so that a book page document BO can more securely be secured onto the document base 1 by pressuring and holding a top cover page and a rear cover page each in a portion near the binding section BOa of the book page document BO with these stators 17 and the document pressure plate 14.

Herein, when the document pressure plate 14 is fixed to the document base 1 in a state where a book page document BO is not placed thereon, the document pressure plate 14 and the document base 1 are set so that a gap of several millimeters is formed between the document pressure plate 14 and the document base 1, and for this reason even a book page document with a thick cover page can be fixed thereto. Furthermore, in the present apparatus, as shown in FIG. 3, the document base 1 on the left side can only be moved in the vertical direction so that the book page document BO placed thereon is not displaced from its original position. On the other hand, the document base 1 on the right side is supported so that the document base 1 can be moved not only in the vertical direction but also in a direction from side to side with a slide groove 21 in FIG. 3. A tendency of this document base 1 on the right side to move in the leftward direction is energized by a spring 10, and the movement of the document base 1 is stopped by hitting of the slide shaft 22 installed in the linkage mechanism 11 against the edge section of the slide groove 21 provided on the side of the document base 1.

Next, a description is made for a document base pressurizing/fixing switching device and a document base saving device of the present apparatus.

A force increasing in association with a pressure loaded by the spring 13 is delivered to the document base 1 which is movable in the vertical direction by the linkage mechanism 11 (Refer to FIG. 3). With this configuration, in a state where the document base unit 35 is set in the present apparatus and this apparatus is in a mode for loading pressure to the document base, the document bases 1 always apply pressure to the upper direction due to its ascendent tendency so that document surfaces of spread book pages BO placed on the document bases 1 are pressed upward to the bottom section of the scan unit 200 in the scanner unit 30.

The pressure applied by a document surface of this book page document BO to press up is normally received by the scan unit 200, but in a state where the scan unit 200 moves to a position away from the book page document on the document base 1, the document base 1 as well as the book page document BO are disadvantageously engaged in the scanner unit 30 due to the ascendent tendency of the document base 1, which prevents a smooth movement of the scan unit 200. For this reason, it is required to prevent a document base 1 as well as a book page document BO from being unnecessarily engaged in the scanner unit 30 due to the ascendent tendency thereof by fixing the document base 1 in a state where the document base 1 comes up to an appropriate position. Also when a scanning light path in the scan unit 200 is switched by the mirror 222 and a document on the contact glass 206 provided in the upper section of the scanner unit 30 is to be read, the document base 1 is required to be set back under the document base unit 35 so that the bottom section of the scan unit 200 and the top surface of the document base 1 are not contacted with each other.

Figure 14:
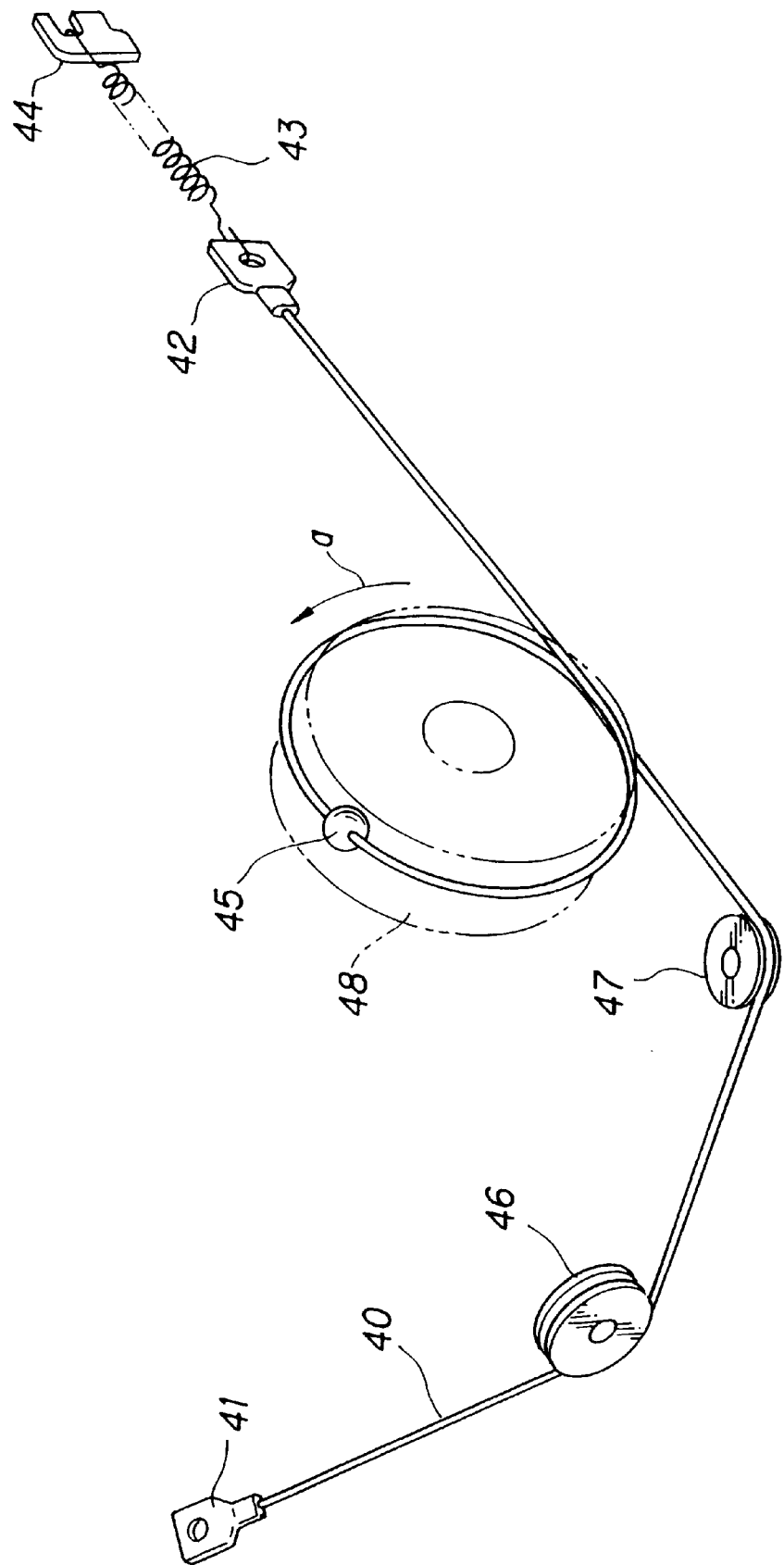
FIG. 14 is a perspective view showing a document base pressurizing/fixing switching device and a document base saving device in the apparatus.

The document base pressurizing-fixing switching device and the document base saving device are devices for satisfying these necessity, and FIG. 14 to FIG. 18 show configuration examples of configuration of such mechanism that one mechanism is shared by both of these devices. A control wire 40 in this mechanism, as shown in FIG. 14, has a hook 41 fixed to one edge thereof. Other hook 42 is fixed to the other edge of the control wire 40, and a stop ball 45 having spherical shape is fixed to around the central section of the control wire 40.

Figure 15:
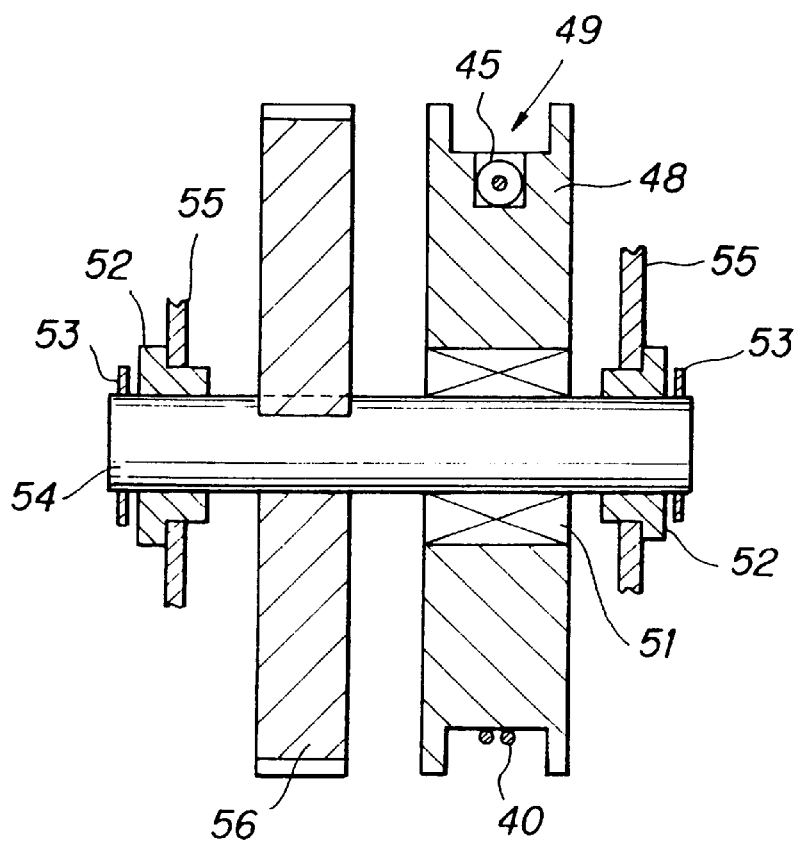
FIG. 15 is a cross-sectional view showing the document base pressurizing/fixing switching device and the document base saving device in the apparatus.
Figure 16:
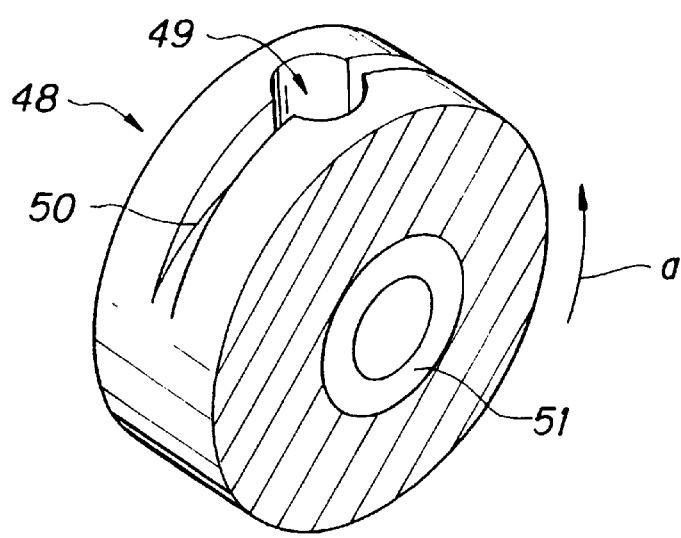
FIG. 16 is a perspective view showing a control pulley of the device above.

The hook 41 is fixed to an edge section outside the linkage mechanism 11 (the side moving up-and-down according to the ascent and descent of the document base 1). The control wire 40 extending from the hook 41 converts its direction via a pulley 46 and a pulley 47 to be wound around a control pulley 48. Herein, the stop ball 45 fixed to the central section of the control wire 40, as shown in FIG. 15 and FIG. 16, is put in a stop hole 49 provided in the control pulley 48 by being led along a groove 50 provided in the control pulley 48. With this configuration, the movement of the control wire 40 is surely converted to the rotary movement of the control pulley 48.

The control wire 40 extending by being wound around the control pulley 48 is always pulled by one edge of extending spring 43 hooking on the hook 42 of the other edge section thereof. The other edge of the extending spring 43 is hooked on a hook 44 fixed to a base 6 of the document base unit 35. The control pulley 48 is supported, as shown in FIG. 15, by a shaft 54 via a one-way clutch 51. The shaft 54 is supported by sliding bearings 52 each rotatably supported with a pair of side plates 55 to the side plates 55 each via sliding bearings 52 by being fixed by E rings 53 through both edge of the shaft.

With this configuration, the control pulley 48 can freely rotate in the direction indicated with the arrow a in FIG. 16 to the shaft 54, but can not rotate relatively to the shaft in the direction opposite to this arrow a due to effects of the one-way clutch 51, which means the control pulley rotates together with this shaft 54. For this reason, when the shaft 54 is fixed by a mechanism described later, the control pulley 48 becomes in a state where it can rotate only in the direction as indicated by the arrow mark a in FIG. 14, namely only in a rotary direction provided when the document base 1 is going down.

Next, a description is made for operations for descending/ fixing of the document base 1 with this document base pressurizing/fixing switching device.

In FIG. 14 to FIG. 16, when the shaft 54 is in the fixed state of being fixed, and if the document base 1 is pressed down according to an external force, for instance, a dead weight of the book page document BO or pressure due to page turn, the edge section in the hook 41 side of the control wire 40 fixed to the side of the document base 1 is loosened.

Simultaneously with this step, the control pulley 48 rotates in the direction as indicated by the arrow mark a during its motion to absorb the looseness in the hook 41 side of the control wire 40 by being pulled with the extending spring 43, and the control wire 40 moves to the side of hook 44 with initial tension maintained. In this step, as the control pulley 48 can not rotate in the direction opposite to the arrow a due to effects of the one-way clutch 51, even if a ascendent force of the document base 1 is more than a press-down-force to the document base 1, the control pulley 48 can not be rotated in the direction opposite to the arrow a due to the ascendent force thereof, and for this reason the control pulley 48 terminates to maintain the position thereof and is rotated in the direction as indicated by the arrow mark a. Also the movement of the control wire 40 is terminated in accordance with termination of the motion of the control pulley 48 described above, and for this reason the document base 1 descends to the position where the base is pressed down by some external force and stops.

Herein, the shaft 54 is fixed with the document base ascending/descending mechanism described below.

Figure 17:
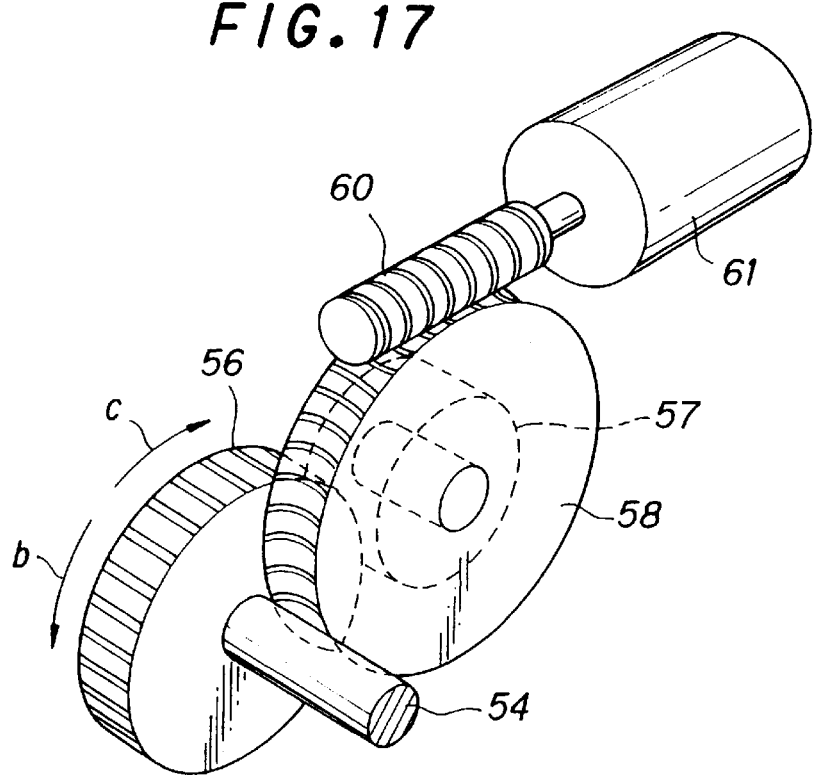
FIG. 17 is a perspective view showing a portion of the document base pressurizing/fixing switching device and a portion of the document base saving device.
Figure 18:
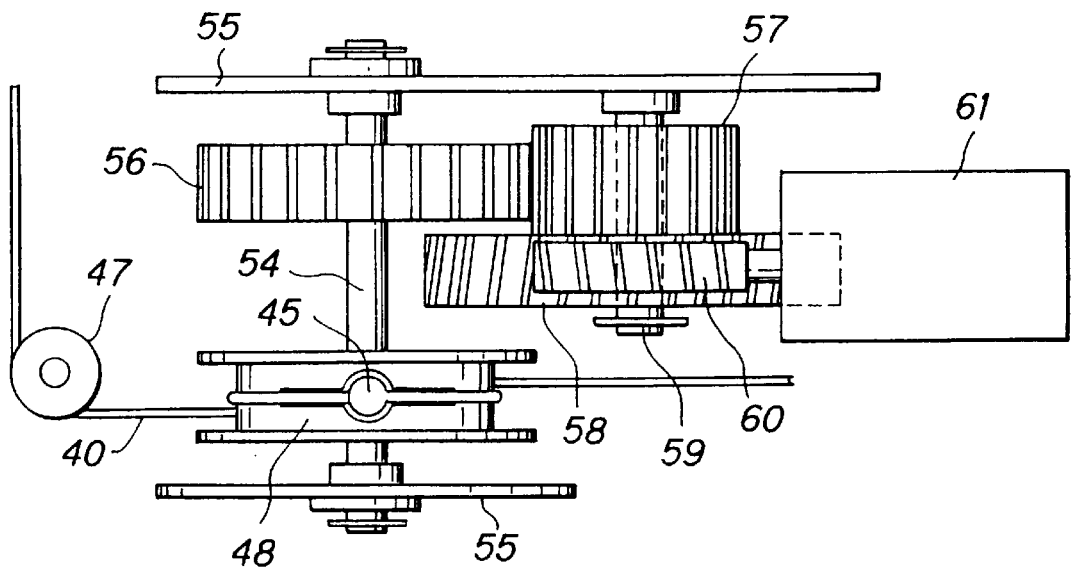
FIG. 18 is a side view showing other portions of the document base pressurizing/fixing switching device as well as of the document base saving device.

Namely, a gear 56 is fixed to the shaft 54 as shown in FIG. 17 so that the gear 56 rotates together with the shaft 54. Also, this gear 56 engages other gear 57 rotatably supported with a stud 59 fixed to the side plate 55 as shown in FIG. 18, and the rotation provided by the gear 56 is delivered to the gear 57.

Furthermore, the gear 57 is formed monolithically with a worm wheel 58, and a worm gear 60 fixed to an output shaft of a document base lift motor 61 engages this worm wheel 58. With this configuration, when the document base lift motor 61 is stopped, the worm wheel 58 can not rotate due to engagement between the worm gear 60 and the worm wheel 58, the shaft 54 coupled to the gear 57 through the gear 56 engaged with the gear 57 monolithically formed with the worm wheel 58 becomes in a fixed state.

Next, a description is made for operation for saving of the document base 1 under the document base unit 35. In FIG. 17 and FIG. 18, if the document base lift motor 61 is driven so that the gear 56 rotates in the direction as indicated by the arrow b, the control pulley 48 and the shaft 54 rotate together with each other due to the one-way clutch 51, the control pulley 48 rotates in the direction as indicated by the arrow mark a, and the control wire 40 moves to the side of hook 44.

Figure 19:
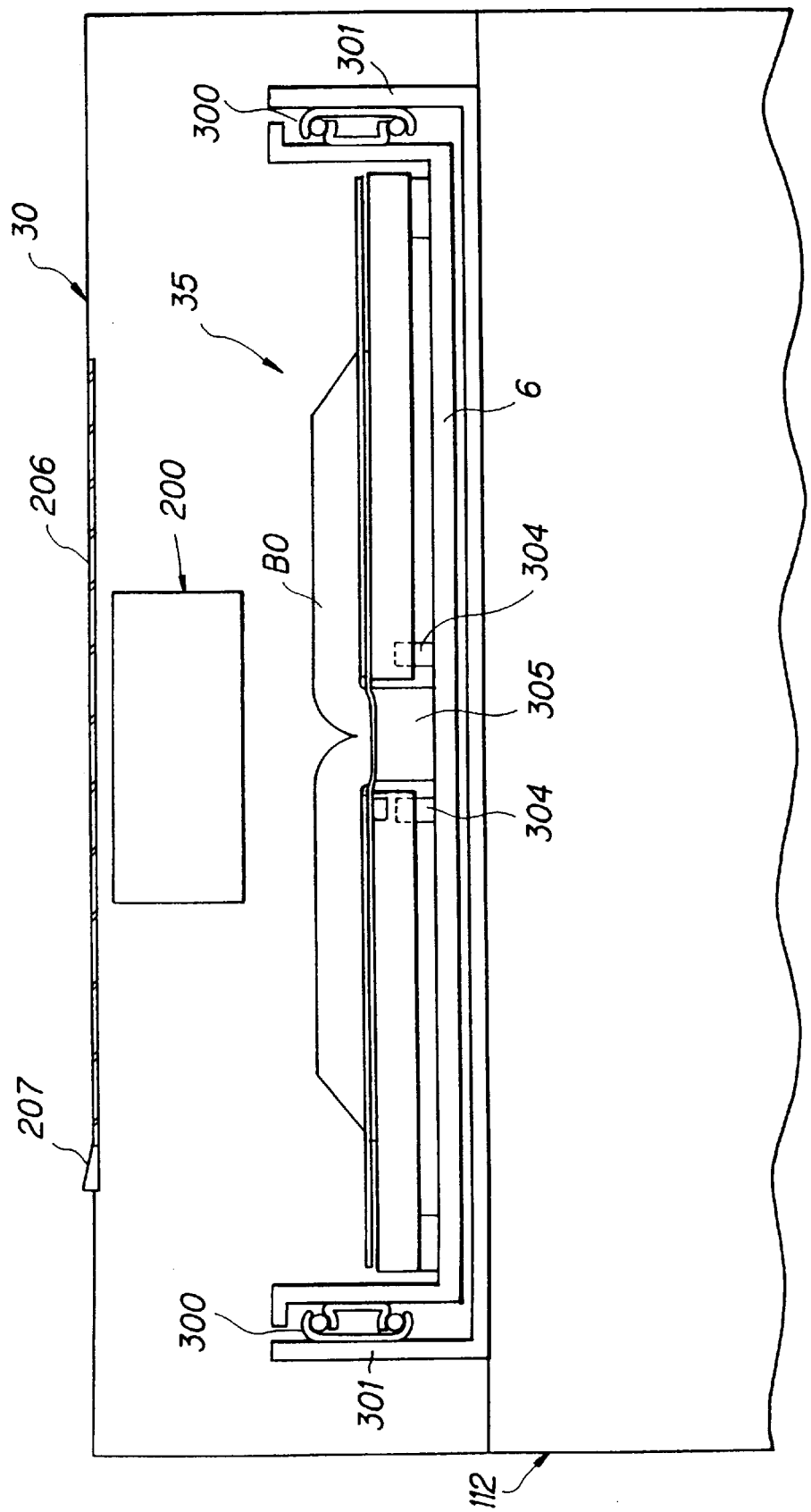
FIG. 19 is a cross-sectional view showing a state where the above device has saved the document base.
Figure 20:
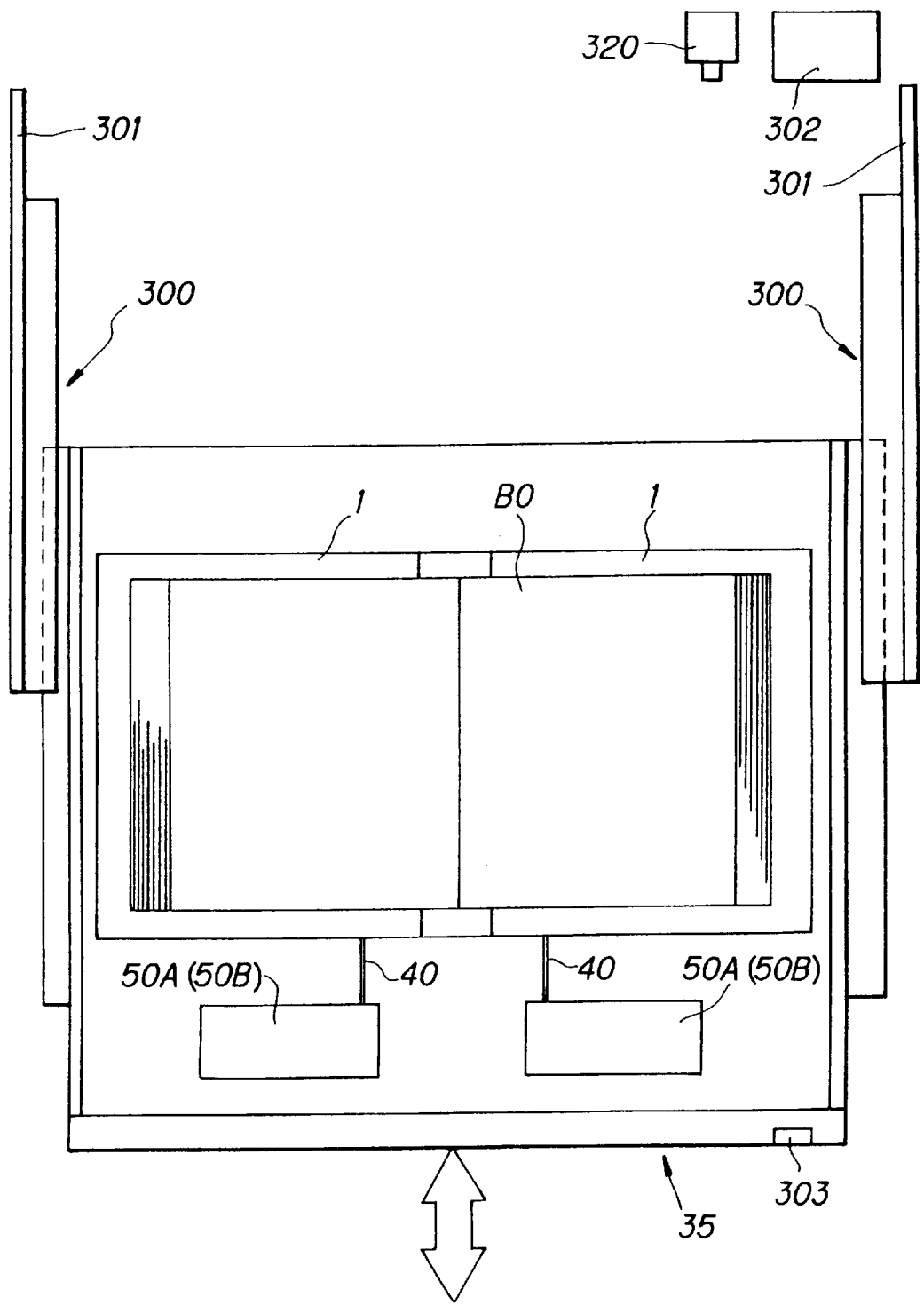
FIG. 20 is a flat view showing a state where the device above has saved the document base.
Figure 24:
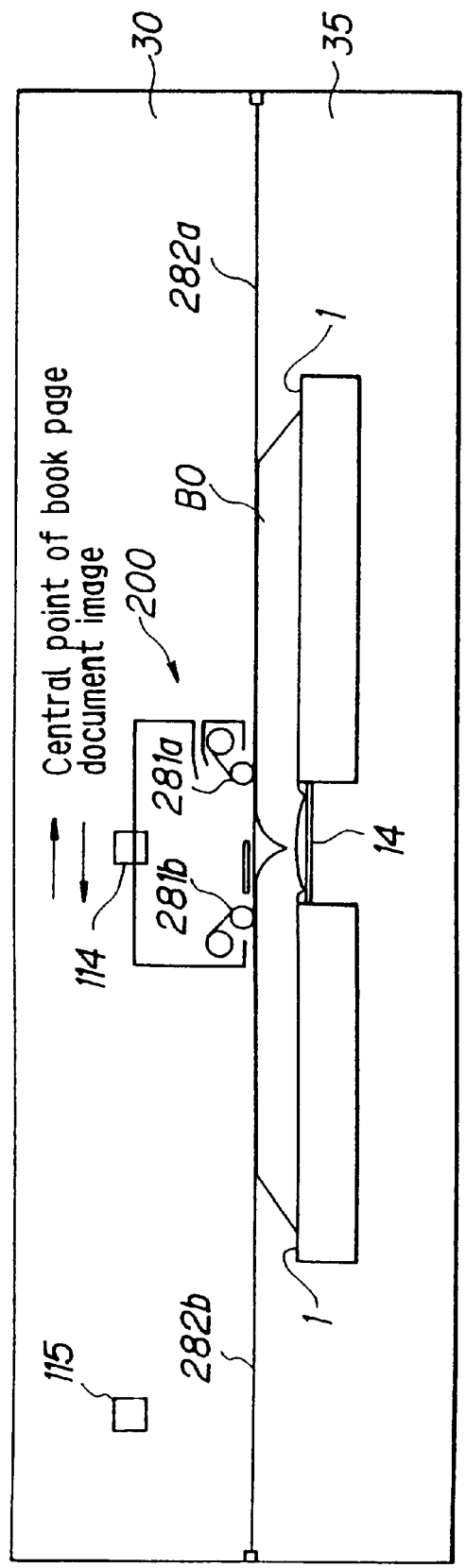
FIG. 24 is s schematic view showing a state where the scan unit is scanning a central portion of a book page document.

With the movement of this control wire 40, in FIG. 3 and FIG. 20, each of the document bases 1 provided on the right side and the left side descends, and stops at the position detected by right and left document base lower limit sensors 304 shown in FIG. 19, and is kept down at the lower position of the document base unit 35 where the top surface of each document base 1 (the document surface of the book page document BO in this apparatus) is away from the scan unit 200, namely at the position shown in FIG. 19.

This saving operation is executed when the apparatus body is turned ON, when the apparatus body stands by while not scanning, when the document on the contact glass 206 provided in the upper section of the scanner unit 30 is read, and when the document base unit 30 is pulled out.

Next, a description is made for operation of loading pressure to the upper side in the document base unit 35 by the document base 1. On the contrary to the case where saving operation is executed as described above, in FIG. 17 and FIG. 18, when the document base lift motor 61 is driven so that the gear 56 rotates in the direction as indicated by the arrow mark c, the shaft 54 rotates in the direction opposite to the direction of the arrow a in FIG. 14, and the control pulley 48 becomes in a state where it can rotate to the shaft 54 due to effects of the one-way clutch 51. Herein, in the present apparatus, the force of the torsion spring 13 pushing up the document base 1 to the upper side is set to force stronger than that pulling down the control wire 40 to the lower side.

For this reason, in a state where the control pulley 48 can rotate freely in the direction opposite to the direction of the arrow a as described above, the control wire 40 moves to the side of hook 41 due to the force of the torsion spring 13 as to tend to push up the document base 1 to the upper side. With the movement of this control wire 40, in FIG. 3, each of the right and left document bases 1 ascends, and the scan unit 200 receives pressure applied by the document surfaces of spread book pages document BO placed on the top surface of each document base 1.

As described above, when the document base lift motor 61 is kept driving in a state where the document surface on each document base 1 applies pressure to the scan unit 200 by ascending of each of the right and left document base 1, the shaft becomes in a state where it can rotate to the control pulley 48 due to effects of the one-way clutch 51, which allows to maintain the state where the scan unit 200 is pressed and contacted to the document surface maintained. This pressure operation is executed only when the scan unit 200 is present on the document base 1 as described later.

The document base pressurizing/fixing switching device 50A and the document base saving device 50B are, as shown in FIG. 3 and FIG. 20, provided for a pair of right and left document bases 1 by one set thereof respectively, and the right and left devices are independently controlled respectively in accordance with a position of the scan unit 200. Namely, the pair of right and left document base lift motors 61 which are driving power of the document base pressurizing/fixing switching device 50A and the document base saving device 50B each are controlled independently from each other.

FIG. 20 shows a saving operation of the document base 1 to the lower side when a mode is in the saving operation mode described above, and FIG. 21 shows the timing charts thereof.

In this saving operation mode, before starting movement of the scan unit 200 as shown in FIG. 21, the right and left document base lift motors 61 run in reverse direction, until each of the right/left document base lower limit sensors 304 detects each document base 1 respectively, and then the right/left document bases 1 are lowered to the lower side as shown in FIG. 19. Then the scanner motor 106 is driven, and the scan unit 200 moves in a specified direction to start scanning. If required herein, this scan is repeated several times. Then the scan unit 200 returns to the central home position when this Lo saving operation mode is completed, the right/left document base lift motors 61 run in regular direction a specified number of times, and the right/left document bases 1 each return to the original position.

On the other hand, when a document on the contact glass 206 is read, the scale 207 becomes a placing reference for placement of the document edge. This reference, different from the read start position of a book page document, is set so that the size thereof becomes the smallest one. With this configuration, a read start point of a document is always kept constant, which makes the control easier. When a mode is in the sheet document copy mode for reading a document on the contact glass 206, system control executes the operation for saving the document base lower, then the scan unit 200 moves from the central home position to the left side and comes up to the edge section home position (the position of the scan unit 200 shown in FIG. 22) to be detected by the edge section HP sensor to stop. Then read conditions are inputted by the operating section 99 and pressing down of a start switch is waited. Herein, when the start switch has been turned ON, the scanner motor 106 is driven and the scan unit 200 is scanned to the right side in FIG. 3, and then the document on the contact glass 206 is read by the scan unit 200.

Next, a description is made for a pressure/fixture operation mode of the document base 1.

When operation of the TPS is completed in the book page document read mode, the scan unit 200 returns to the home position shown in FIG. 3, so that the scan unit 200 is also positioned at the central home position when a book page document BO is set to the TPS. This configuration is made because a book page document is surely pressed down even if it is any type of book page document having any size when the document base 1 is raised and set after the document base unit 35 is slid and closed because the book page document is set at the central position of the TPS as the reference. When this operation is to be started, it is checked by the central HP sensor that the scan unit 200 is present at the central home position. Then the scan unit 200 moves from the central home position to the left side and comes up to the edge section home position to be detected by the edge section HP sensor to stop.

FIG. 22 to FIG. 26 are views each showing the movement of the scan unit 200 when the document base 1 is in the pressure/fixture mode, and FIG. 27 shows the timing charts thereof.

The edge section home position (Refer to FIG. 22) of the scan unit 200 is a start point for a read/turn operation as well as an end point for the operation. At the edge section home position, the scan unit 200 does not exist in the area of document base 1. In this state, the document base lift motors 61 in both sides are stopped, and the right and left document bases 1 are each in a fixed state.

In the pressure/fixture mode for the document base 1, at first, the scanner motor which is a driving motor for the scan unit 200 runs in the regular direction and the scan unit 200 moves in the rightward direction in FIG. 22. Then, when a document pressing roller 281a provided in the right side of the scan unit 200 reaches a left edge of the book page document Bo (A point; Refer to FIG. 23), the document base lift motor 61 in the left side runs in the regular direction, and the document base 1 in the left side becomes in a pressed state. With this step, the book page document BO is pressed up to the scan unit 200, and is optimally read thereby.

The document pressing roller 281a in the right side reaches a left edge section of the document base 1 in the right side (B point; Refer to FIG. 27) slightly before the scan unit 200 reaches the central point of the book page document (Refer to FIG. 24). In this step, the document base lift motor 61 in the right side runs in the regular direction, and the document base 1 in the right side becomes in a pressed state. Then the scan unit 200 passes through the central point of the book page document, and starts reading the right page of the book page document BO. After this step a document pressing roller 281b in the left side reaches the right edge of the document base 1 in the left side (C point; Refer to FIG. 27). In this step, the document base lift motor 61 in the left side is stopped, and the document base 1 in the left side becomes in a fixed state. With this operation, the book page document BO is secured and pressed down by a document pressing sheet 282b without engaging the scanner unit 30, and is kept into stand-by state until the scan unit 200 passes with the same height as described above maintained.

Figure 25:
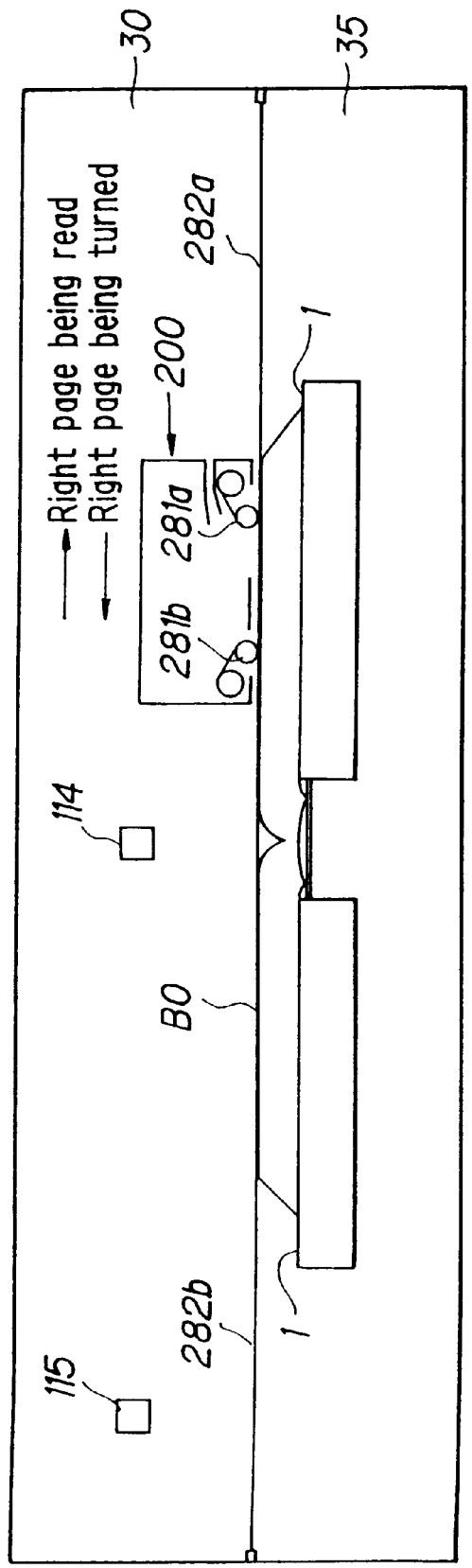
FIG. 25 is a schematic view showing a state where the scan unit is above a right page of a spread book page document.
Figure 26:
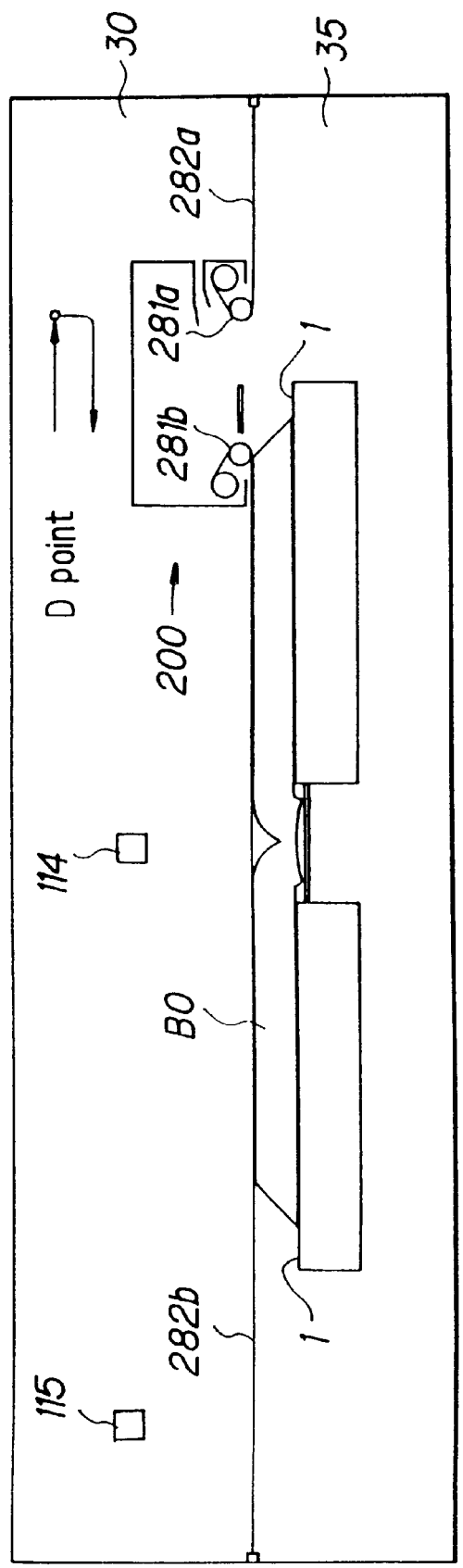
FIG. 26 is a schematic view showing a state where a direction of scanning by the scan unit is reversed.

FIG. 25 shows an operating state of the scan unit 200 during an operation for reading the right page of a book page document or turning the right page thereof. The scan unit 200 having finished reading the right page of the book page document is stopped in a state where the document pressing roller 281b in the left side has reached the right edge of the document base 1 in the right side (D point; Refer to FIG. 26), and the scanner motor 106 runs in the reverse direction, which makes the scan unit 200 move in the leftward direction. With this operation, the scan unit 200 proceeds with turning the right page thereof, and the document pressing roller 281b in the left edge reaches the right edge of the document base 1 in the left side (C point) slightly before the scan unit reaches the central point of the book page document (Refer to FIG. 24). In this step, the document base lift motor 61 in the left side runs in the regular direction, and the document base 1 in the left side becomes in a pressed state.

Then the scan unit 200 has passed through the central point of the book page document, and starts to superimpose the turned right page on the left page thereof, After this step, the document pressing roller 281a in the right side reaches the left edge of the document base 1 in the right side (B point). In this step, the document base lift motor 61 in the right side is stopped, and the document base 1 in the right side becomes in the fixed state. With this operation, the book page document BO is secured and pressed down by a document pressing sheet 282a without engaging the scanner unit 30, and is kept in the stand-by state until the scan unit 200 passes the same height as described above maintained.

Then, the scan unit 200 proceeds superimposing the turned pages on the left side pages, and after the pages have been superimposed, the document pressing roller 281a in the right side reaches the left edge of the document base 1 in the left side (A point; Refer to FIG. 23). In this step, the document base lift motor 61 in the left side is stopped, and the document base 1 in the left side becomes in the fixed state. With this operation, a book page document BO is secured and pressed down by the document pressing sheet 282b without engaging the scanner unit 30, and is kept in the stand-by state until the scan unit 200 passes the same height as described above maintained. Then, the scan unit 200 comes up to the edge home position (FIG. 21) to stop.

Next, a description is made for a mechanism for pulling forward a document base.

As shown in FIG. 3 and FIG. 20, slide rails 300 each are connected to the right and left sides of the document base unit 35 respectively slidably in a reciprocal directions of the apparatus body to rail brackets 301 in the scanner unit 30. When the document base unit 35 is accommodated (is set) in the scanner unit 30, an open/close lock device 302 as shown in FIG. 20 secures the document base unit 35 so that an operator can not pull out the document base unit 35 until a particular instruction is issued. This state is detected by an open/close lock sensor 320. The slide rails 300 has such extending capability that the document base 1 on the document base unit 35 can be pulled sufficiently frontward from the front surface of the apparatus body. An open/close switch 303 and a knob for pulling out a document base not shown herein are provided in the front face of the document base unit 35.

Next, a description is made for set operations of a book page document. When an operator is to set a book page document on the document base 1, the operator checks that a mode is the book page document mode with the operating section, then presses the open/close switch 303. Herein in a case where the mode is in the book page document mode, the book page document mode switch in the operating section not shown herein is pressed. If the document base 1 is not at a lower saved position in any one of the cases, a document base saving operation is executed. If the scan unit 200 is not present at the central home position, the scan unit 200 moves to the central home position.

When the scan unit 200 is present at the central home position, the open/close lock device 302 is unlocked, and the document base unit 35 is possible to be pulled out. In this operation, it is displayed on the operating section that the document base unit 35 is in the state where it can be pulled out. An operator holds the knob provided in the front face of the document base unit 35 and pulls out the document base unit 35 frontward of the apparatus body, then disengages the stopper claws 15 each provided on the right and left document pressing plates 14 from the stopper claws 16 each provided on the document bases, then pulls up the front side of the document pressing plate 14 to be opened (Refer to FIG. 12).

An operator aligns and sets a top cover and a rear cover of a book page document BO with a reference point in the front section on each of the document bases 1 respectively in this state described above, presses down each of the top cover and rear cover by pulling down the document pressing plate 14 so that each of the covers is held by each of the document pressing plates 14 and each of the document bases 1, and engages the stopper 15 of the document pressing plate 14 with the stopper 16 to secure (Refer to FIG. 13).

Then an operator opens a book page document to be read, presses around the binding section thereof by a hand, and pushes the document base unit 35 into the scanner unit 30 to be accommodated (therein). Then, when it is detected by the open/close lock sensor 320 that the document base unit 35 has been set in the scanner unit 30, the document base unit 35 is secured at a specified position of the apparatus body by the open/close lock device 302. After this operation, the document base 1 is raised by the document base lift motor 61, and a book page document BO is set to a specified read position.

Figure 28:
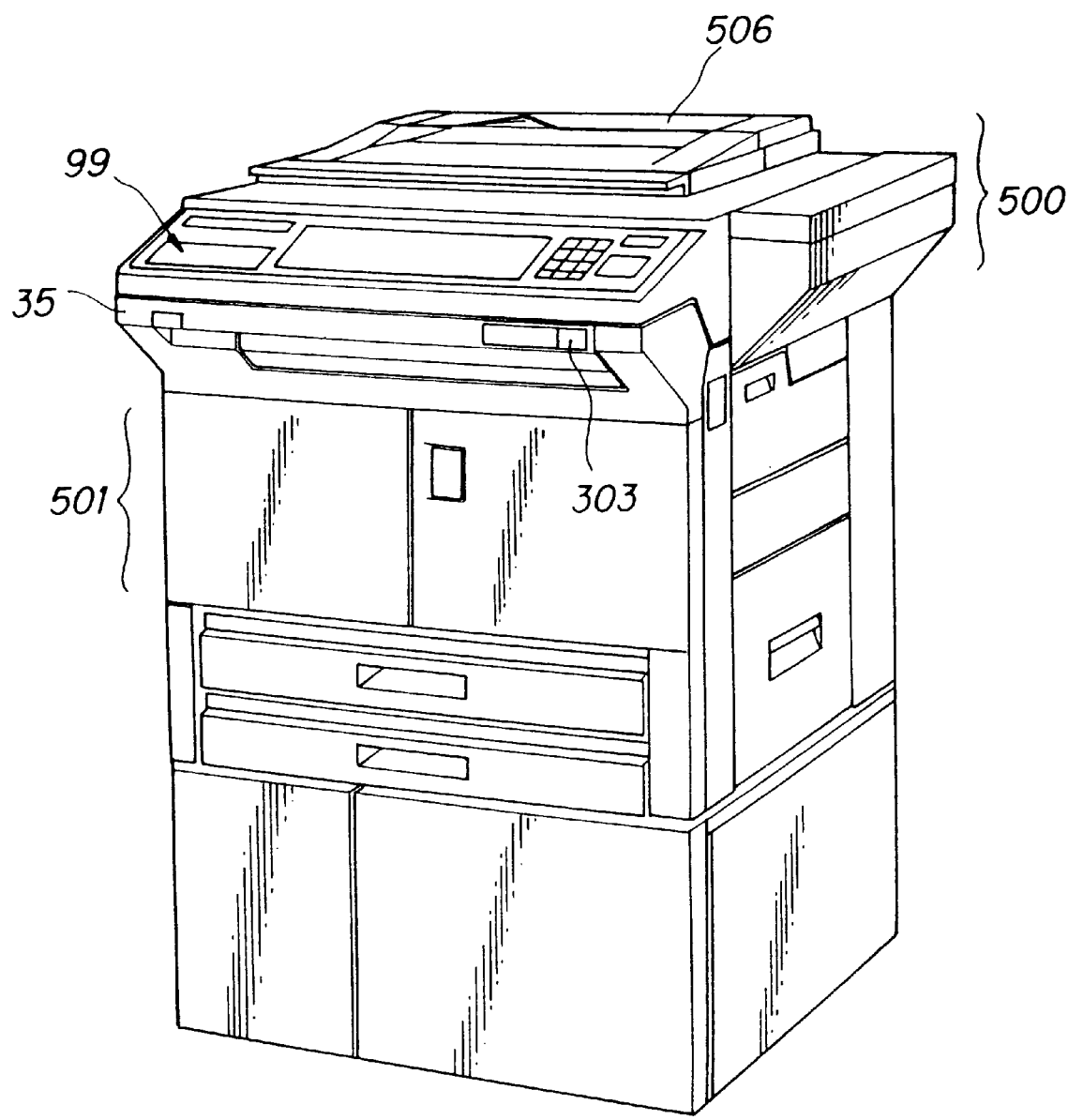
FIG. 28 is a perspective view showing a state where a document base in the apparatus has been set.
Figure 29:
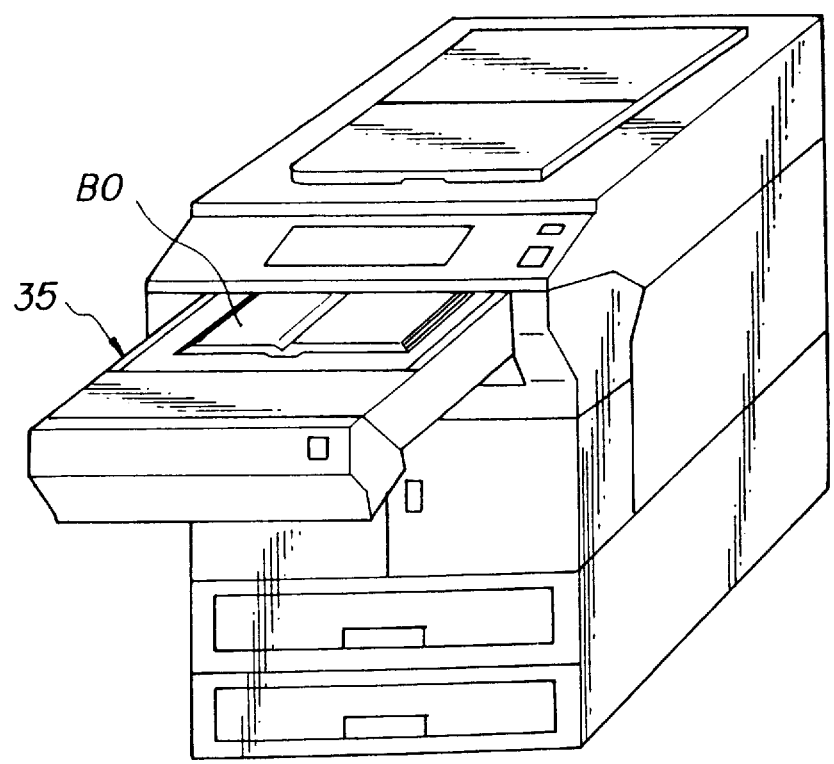
FIG. 29 is a perspective view showing a state where the document base in the apparatus has been drawn out.

FIG. 28 is a perspective view showing the present apparatus. In FIG. 28, the reference numeral 506 is a platen for pressing a document. FIG. 29 shows a state of the document base pulled out required as when a book page document is set to the present apparatus or when the book page document is taken out, and also shows spread book pages document BO set on the unit. Namely, in the present apparatus, as shown in FIG. 29, a book page document BO is set and taken out in a state of the document base unit 35 pulled out of the apparatus body.

Next, a description is made for a book page document exposure system for the TPS.

The present apparatus has 2 pieces of fluorescent lamps 201 and 202 as a source of light for exposing a book page document, and has 2 pieces of fluorescent lamps 203 and 204 as a source of light for exposing a sheet document, and an inverter circuit for 2 pieces of fluorescent lamps switches the fluorescent lamps 201, 202 for exposing a book page document to the fluorescent lamps 203, 204 for exposing a sheet document by relay with a control signal to be lit when a book page document is read and when a sheet document is read. For this reason, the present apparatus has a fluorescent lamp light-emitting circuit comprising totally 4 pieces of fluorescent lamps and 2 units of inverter circuits. 2 pieces of fluorescent lamps 201, 202 as a source of light for exposing a book page document each are located respectively above both edges of the platen glass 205 provided in a book page document read slit position in a vertical direction to the scanning direction of the scan unit 200.

These fluorescent lamps 201, 202 expose the book page document BO from the both side through the platen glass 205 to eliminate inconsistencies in density of read images on each of right and left pages and the shade generated on the binding section of a book page document. On the other hand, the 2 pieces of fluorescent lamps 203, 204 as a source of light for exposing a sheet document each are located below a sheet document read slit position respectively provided in the upper section of the scan unit 200 in the vertical direction to the scanning direction, and these fluorescent lamps 203, 204 expose a sheet document SO set on the contact glass 206 and aligned with the scale 207 thereon from the both side through the contact glass 206 on the upper surface of the present apparatus. The fluorescent lamps 201 to 204 each are synchronized to a read image sampling of the CCD and are driven with a frequency 40 kHz of the inventor circuits so that inconsistencies in density of a read image do not occur.

The book page document edge section image detecting circuit provided in the IPU 103 samples pixel data before being subjected to processing of image size changing in the main scanning direction in the IPU 103, and detects the edge section of a book page document from the pixel data described above. In the book page document edge section image detecting circuit, start and end of detecting the edge section thereof are instructed by a microcomputer in the IPU 103. The microcomputer in the IPU 103 controls detection of book page document edge sections in an auxiliary scanning direction of the book page document edge section image detecting circuit according to a scanning position of the scan unit 200, and also controls detection of book page document edge sections in the main scanning direction of the book page document edge section image detecting circuit by referring to a pixel counter in the main scanning direction. And the microcomputer in the IPU 103 computes a position of attracting a page as well as an image area in the main scanning direction according to the position of a book page document edge section detected by the book page document edge section image detecting circuit.

Next, a description is made for displacement of a book page document.

Figure 30:
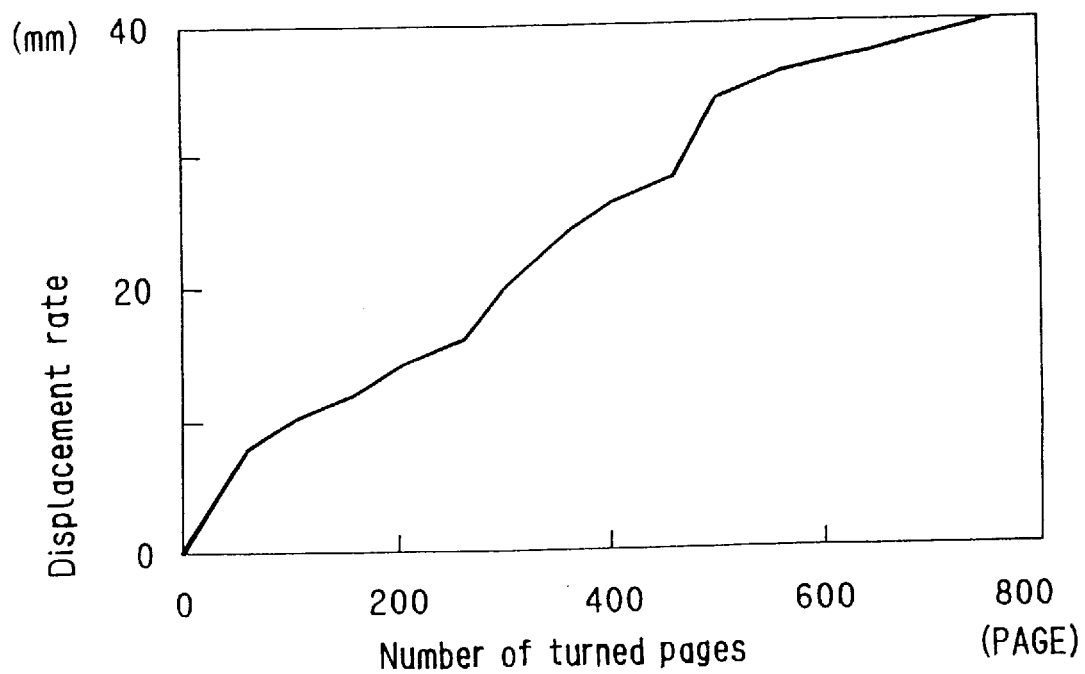
FIG. 30 is a view showing an example of a relation between a number of turned book pages and a displacement rate of a page position.

A portion of the left page in a book page document increases in association with the page turn operations, and generally the left edge section of the book page document moves upward as well as rightward from the cover position thereof as a reference. On the other hand, a portion of the right page in the book page document decreases in association with the page turn operations, and the right edge section of the book page document generally moves downward as well as rightward from the cover position thereof as a reference. FIG. 30 is an example showing displacement of a left edge section of the book page document caused by repeating the operation for turning pages as described above. In FIG. 30, an initial position of the left edge section in spread pages of a book page document placed on the document base is set to zero (0), and a movement rate of the book page document left edge section moving rightward increased in association with the page turning operations is indicated as a displacement rate therein. Also a displacement rate of the book page document left edge section moving rightward is set to a plus and is indicated as a unit of millimeter.

FIG. 30 shows a case where a thickness of book page document is 20 mm, and a book page document has 750 pages in total, and a size of a spread document is B4. As clearly understood from FIG. 30, generally a book page document left edge section tends to displace in a rightward direction in association with the page turning, and with this displacement, the central binding section is deformed, which causes a displacement rate of the book page document left edge section to irregularly increase. Also a book page document has a central binding section slid in rightward or leftward direction due to the page turn, so that a point where the displacement rate reversely decreases during the page turn process occurs. The displacement rate described above also varies depending on a size or a thickness or a quality of paper of the book page document. In a case where the covers of a book page document are secured on the document bases like in the present apparatus, abrupt displacement due to the unsettled backbone of the book page document can be suppressed, but a position of the top pages in the spread book pages varies according to the page turn. This variation causes a displacement in a read position as well as a page turn position.

For this reason, in the present apparatus, the displacement of a book page document in reciprocal directions is automatically corrected by disengaging of the document base 1 for each scan of the scan unit 200 and pressing the book page document up to the scan unit 200 with a spring capability so that the top surface of a book page document becomes a uniform plane. There are also some other sizes for a book page document in the present apparatus other than the regular sizes such as A series or B series, and there are many cases where a length-to-width ratio of page shrinkage equivalent to a portion of warping in the binding section of a book page document in a spread direction thereof does not become constant. Also a book page document is aligned and set to a reference point in the central front section in the apparatus, so that positions of a left edge, right edge, and upper edge of a page in a book page document are various each according to a size of spread book pages, namely variation thereof is caused by an image front edge position and a rear edge position thereof each in the auxiliary scanning direction, and a rear tip position thereof in the main scanning direction.

Next, a description is made for detection of a book page document edge section.

Figure 31:
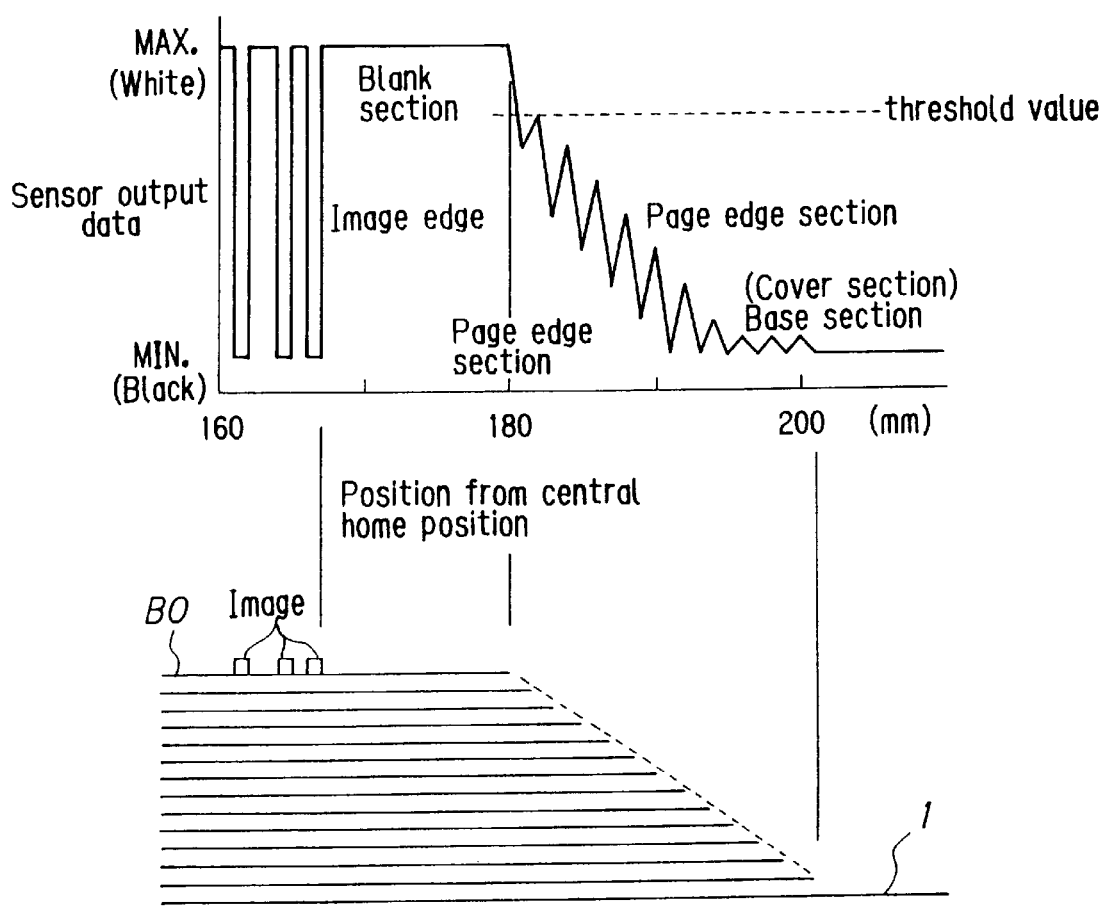
FIG. 31 is a view showing a signal waveform detected at a right edge section of a book page document.

FIG. 31 shows detection data of the right edge section in spread book pages detected by the read sensor. Edge sections of a book page document detected by the read sensor are displaced by approx. 180 mm in the auxiliary scanning direction from a central set position if a size of a spread document is B4. After an image is read, when the page is turned and scanning is executed, detection of an edge section is started from a position of the black external frame section of the document base which is located in an outer side from the maximum size of the spread book page document in the auxiliary scanning direction. The read sensor 101 at first reads the external frame section of the document base, and reads a level between an inner side of the right cover and edge sections of pages in some book page documents. Then the read sensor 101 reads a density in the background which is a blank section of the top page thereof, and generally reads an image after some blank of a ten and several millimeters. Data successing in the auxiliary scanning direction from the read sensor 101 is sampled, this sampling is compared to a threshold value, then a start point of the blank section is detected, and a position of the detected start point is regarded as a position of right edge section of a page in a book page document in the auxiliary scanning direction.

Figure 32:
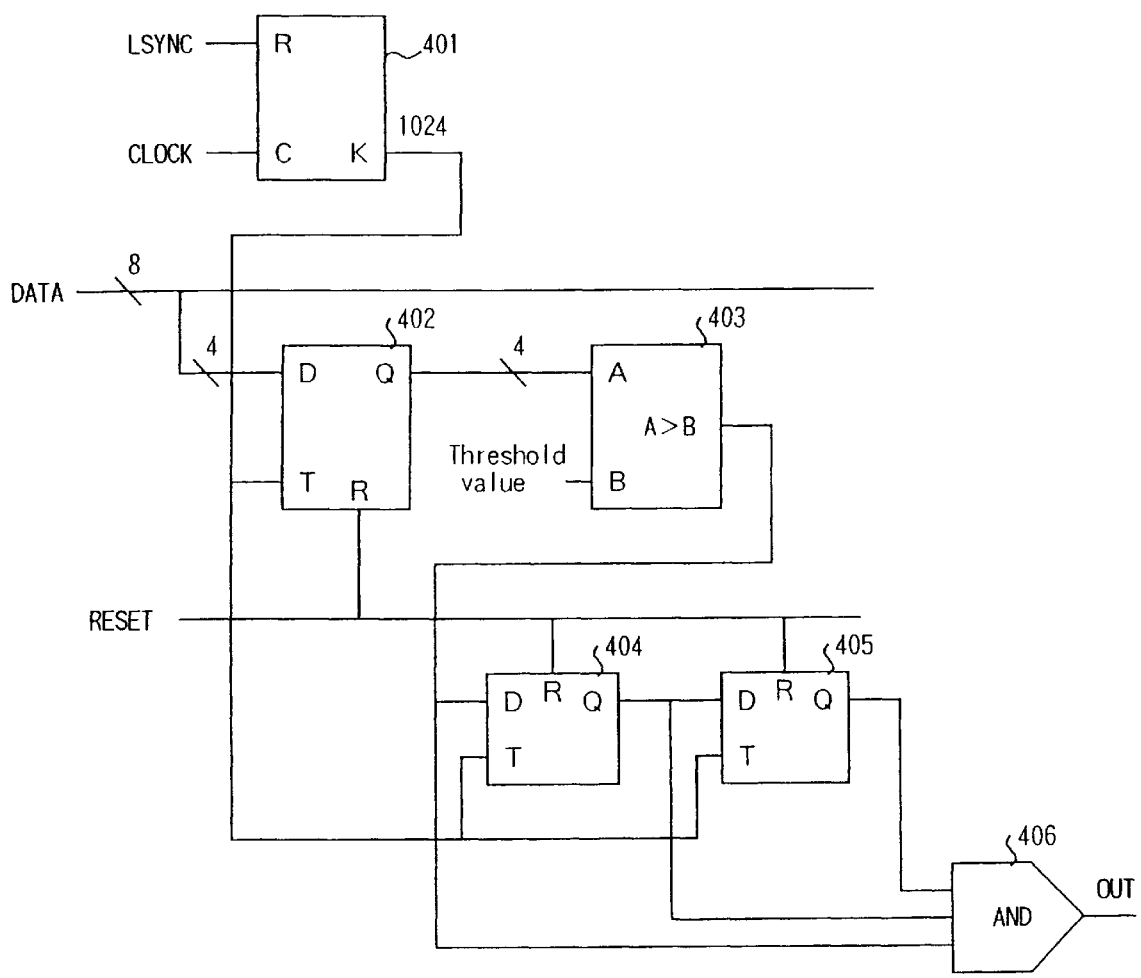
FIG. 32 is a block diagram showing a circuit for detection of an image of an edge section of a book page document in the auxiliary scanning direction in the apparatus.

FIG. 32 shows a book page document edge section image detecting circuit. This book page document edge section image detecting circuit executes detection of a right edge section of a book page document in the auxiliary scanning direction according to change of read data concerning particular pixel in the read sensor 101 in the auxiliary scanning direction. A particular pixel in the read sensor 101 in the main scanning direction corresponds to a minimum document size with a reference for placement of a book page document in the front side, so that the 1024-th pixel, 64 mm away from a reference of the read sensor 101 in the front side of the apparatus, is regarded as the particular pixel. The counter 401 is reset according to a sync. signal LSYNC synchronized to main scanning of the read sensor 101, counts clocks CLOCK synchronized to a pixel signal from the read sensor 101, and outputs an output signal which rises in synchronism to a pixel signal for the 1024-th pixel from the read sensor 101.

A data latch circuit 402 latches a pixel signal for the 1024-th pixel in an image signal DATA from the read sensor 101 for each scan in the main scanning direction at a timing of the first transition of an output signal from the counter 401. A digital comparator circuit 403 compares data for upper 4 bits in the 8-bit data latched by the data latch circuit 402 to a threshold value. This threshold value is set by a microcomputer in the IPU 103. Data from the digital comparator circuit 403 is delayed in the D flip-flop circuits 404, 405 by one scan time, AND of data from the digital comparator circuit and data from the D flip-flop circuits 404, 405 are computed in an AND circuit 406, and if a data value for the particular pixel in the read sensor 101 larger than the threshold value continues for 3 pixels or more, an edge section detected signal is generated and is sent to the microcomputer in the IPU 103.

In this operation for reading data for detection of an edge section of a book page document, the microcomputer in the IPU 103 makes the scan unit 200 start scanning in the leftward direction from the black document base 1 in the right edge section in the scanning direction or from its external frame, and cancels a reset signal RESET indicating start of detection to the data latch circuit 402 as well as to the D flip-flop circuits 404, 405. And, a portion of stripe pattern successing in the main scanning direction caused by an edge of a cover of a book or a paper edge is detected by the read sensor 101, and image data on a right page is detected at random from an edge section of a top page of a book page document.

In most books, a color of paper is white, and generally in a frame section having a width of several tens millimeters from an edge section of a book page document, there is no letters or any image. For this reason, the digital comparator circuit 403 determines an area as a peripheral blank section at a point of time when a pixel signal for the 1024-th pixel from the read sensor 101 indicates data for homogeneous color whiter than a threshold value. Precision in this determination can be improved by using data for a plurality of pixels in the read sensor 101 in the main scanning direction. Also, the description above assumes that a number of pixels used for determination is three successive pixels from the D flip-flop circuits 404, 405 and the AND circuit 406, but change of the number of pixels used for determination of change of a threshold value in the digital comparator circuit 403 according to the system or applied document would also be effective.

As a result, in a case where an edge section of a book page document as shown in FIG. 31 is read, it is determined that an edge section of the book page document is 180 mm away from the home position.

In a case of a book page document set according to a central binding section as a reference, a position of a tip of an image may change according to the size, and also a page position changes in a case of a spread page and a page length may change according to the binding section. A result of detection of an edge section of a book page document in the auxiliary scanning direction can be used by the microcomputer in the IPU 103 for computing a position of page attraction for turning pages and a position for picking a page. It should be noted that, a left edge section of a page of a spread book page document is detected from a left side section of a document base by book page document edge section image detecting circuit similarly when a book page document is scanned and read. A result of detection of an edge section of a book page document in the auxiliary scanning direction is used for decision of an effective image area in a book page document in the auxiliary scanning direction, and for instance, when copying a book page document, the result is used for registration for deciding an image position on the transfer paper. Furthermore a result of detection of an edge section of a book page document in the auxiliary scanning direction is used by the microcomputer in the IPU 103 to prevent an unnecessary black image by automatically deleting an image outside a prespecified area, and also when applied to a file system, the result is used for saving a memory quantity by reducing quantity of data.

Next, a description is made for detection of an edge section of a book page document in the main scanning direction.

Figure 33:
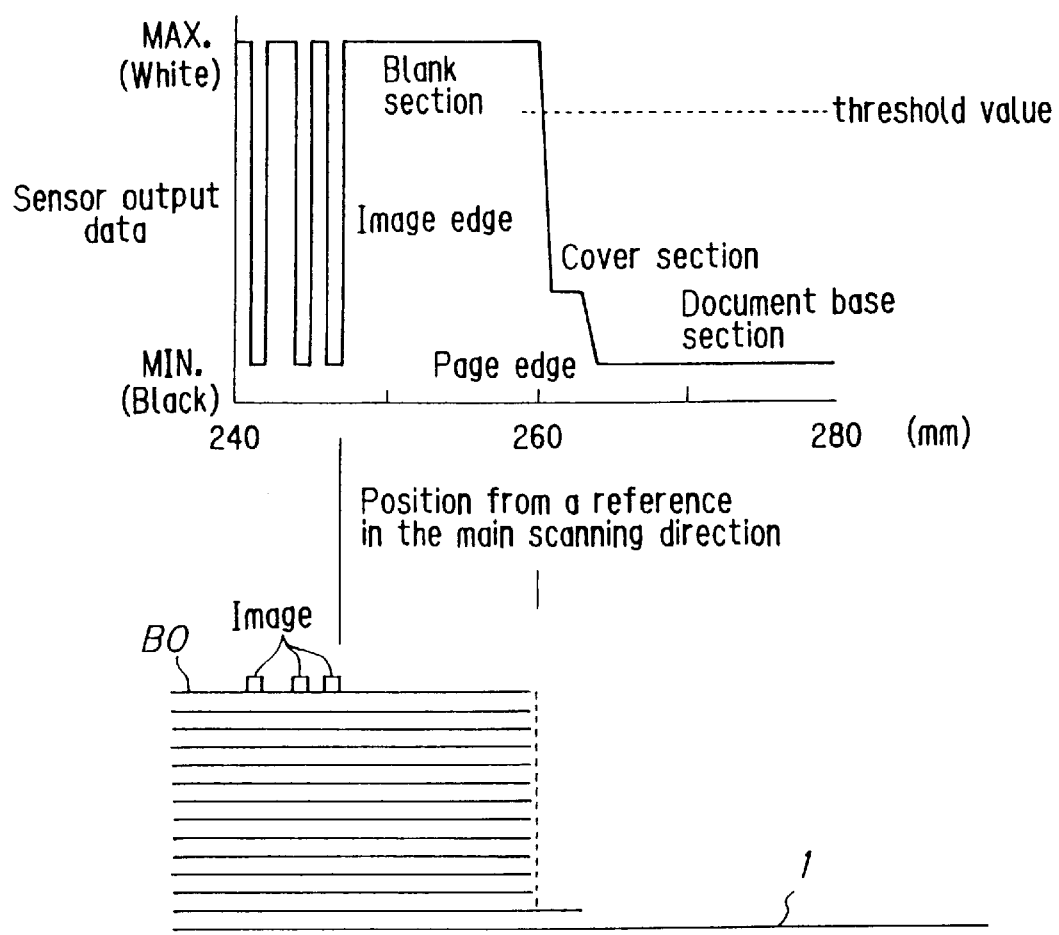
FIG. 33 is a view showing a detected signal waveform of an edge section of a book page document in the main scanning direction.

FIG. 33 shows data for detection of an upper edge section of a spread book page document by a read sensor. In a case where a size of a spread document is B4, an edge section of a book page document detected by a read sensor is around 270 mm away from a frontward set reference position in the mains canning direction. The read sensor starts reading in the frontward direction from a position of an external frame section of a document base at a position for attracting and picking a pager after the book page document is read and scanned when an operation for turning and scanning a page is stopped, at first reads a black external frame section of the document base, and then reads a black document base section, and reads inside of a right cover page in certain book page documents. Then the read sensor 101 reads a density of the background, which is a blank section of a top page, and generally read an image after reading the blank section having a width of ten or more millimeters. Data successing in the mains canning data from the read sensor 101 is compared to a threshold value to detect a peripheral blank section, and the position is regarded as a position of an edge section of the book page document in the main scanning direction.

Figure 34:
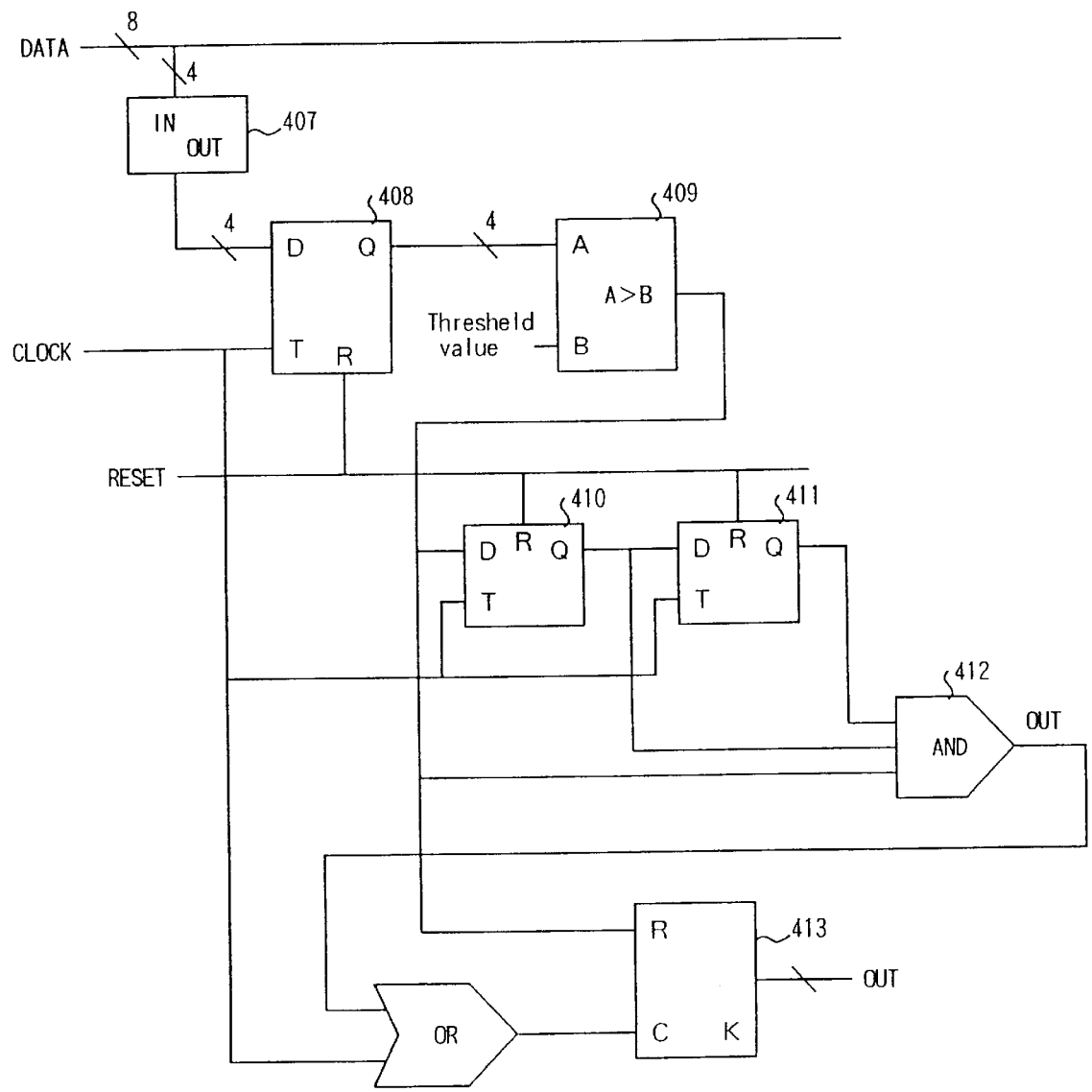
FIG. 34 is a block diagram showing a circuit for detection of an image of an edge section of a book page document in the main scanning direction in the apparatus.

FIG. 34 shows a circuit for detection of an image of an edge section of a book page document in the main scanning direction. Detection of an edge section of a book page document in the mains canning direction is executed according to change in read data for 1 line in the mains canning direction of the read sensor 101. A spread book page document is set in the front side at a center of the document base 1 with the binding section aligned to the left edge and then fixed. A reference for placement of a book page document is in the front side of the document base 1, and reading of 1 line in the main scanning direction by the read sensor 101 is started from the inner side of the document base 1, so that data successing in the mains scanning direction from the read sensor 101 is arranged in the reverse order by an FILO (first-in/last-out) circuit 407 for 1 line.

Data from the FILO circuit 407 is latched according to the clock CLOCK in the data latch circuit 408 and is sampled for each mains scan line, and the data for upper 4 bits is compared to a threshold value by the digital comparator circuit 409. This threshold value is set by the microcomputer in the IPU 103. Data from the digital comparator circuit 408 is delayed by the D flip-flop circuits 410, 411, AND of data from the digital comparator circuit 409 and data from the D flip-flop circuit 410, 411 are computed in the AND circuit 412, and in a case where data values from the read sensor 101 larger than the threshold value success for 3 pixels or more, an edge detection signal is generated. The counter 413 counts a number of pixels in the main scanning direction by counting the clocks CLOCK inputted via the OR circuit 414, but when a detection signal from the AND circuit 412 is inputted into the OR circuit 414, the counter 413 is masked with its operation stopped, and the value indicated by the counter 413 then is reported to the microcomputer in the IPU 103.

In reading for detection of an edge section of a book page document in the main scanning direction, the read sensor 101 executes a reading operation from the black document base 1 at the inner side or its external frame section in the frontward direction, and generation of a background of a page in a book page document is detected as described above. In detection of an edge section of the book page document in the main scanning direction, the microcomputer in the IPU 103 does not execute controls over scanning by the scan unit 200 so that an affordable processing time is generated, and the control is executed when scanning by the scan unit 200 is stopped for attracting a page, and the microcomputer in the IPU 103 cancels a rest signal RESET to the data latch circuit 408, D flip-flop circuits 410, 411, and the counter 413 when the image section of a book page document in main scanning direction is detected.

The microcomputer in the IPU 103 uses a book page document main scanning direction edge section detected signal for deciding an effective image area in a book page document including relatively many irregular sizes in the main scanning direction, and for instance, when copying a book page document, the microcomputer automatically deletes an image outside the area for preventing an unnecessary black image, and also when applied to a file system or the like, the microcomputer reduces image data according to a signal indicating detection of an edge section of a book page document in the main scanning direction to save a quantity of required memory.

Figure 35:
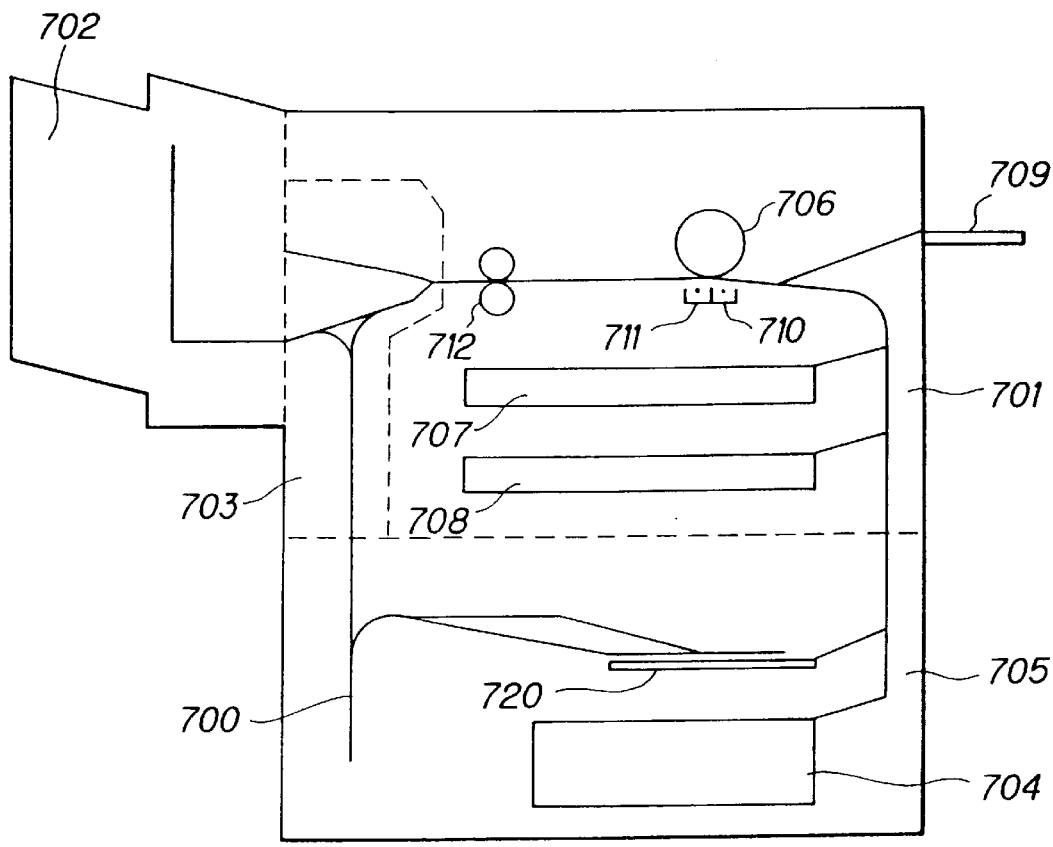
FIG. 35 is a cross-sectional view showing an image forming section in the apparatus.

FIG. 35 shows an image forming section which is an image forming means in the apparatus.

This image forming section comprises a basic system of a printer 701 comprising a laser printer, a sorter 702 as a peripheral device for the printer, a reverting unit 703, and a bank 705 having a duplex unit and a large quantity paper feed tray.

In the basic system of the printer 701, after an image carrier comprising a photoconductive body such as, for instance, a light sensing drum 706 is driven by a drive unit and homogeneously electrified by an electrifier, a document image is written on the image carrier by means of image exposure by an exposing means including the semiconductor laser 105 described above, an electrostatic latent image is formed thereon, and this electrostatic latent image is developed by a developing unit and is changed into a visual image. Also forms are transferred from any selected one of the paper feed trays 707, 708 and a large quantity paper feed tray 704 each as a paper feeding means to a resist roller, or also forms are fed manually from the manual table 709, and the fed forms are transferred by the resist roller, the visual image on the light-sensing drum 706 is transferred by a charger 710 for image transfer as a transferring means onto a supper surface of each form, and then after separated by a charger 711 for separation as a separating means from the light sensing drum 706, the visual image is fixed by the fixing unit 712, and then the form is sent to the reverting unit 703. Also the light-sensing drum 706 is cleaned by a cleaning device to remove residual toner after the form is separated.

In the reverting unit 703, a form from the fixing unit 712 is accommodated in the upper side tray with a surface having an image printed thereon kept upside in the ordinary operating mode. In the sorting mode, forms from the fixing unit 712 are discharged to the sorter 702 and distributed to each bin in the sorter 702. Also in the duplex copying mode, a form with an image formed on a top surface thereof from the fixing unit 712 is fed into a duplex reverting section 700 in the vertical posture in the bank 705. The duplex reverting section 700 switches back the form fed thereinto and send out the form onto the duplex tray 720 so that the surface with an image formed thereon kept upside and stacks the form there. This duplex tray 720 again feeds the stacked form to the resist roller. This form is transferred by the resist roller, and an image is transferred onto a rear side of the form as described above and fixed there, and then the form is discharged by the reverting unit 703 to the sorter 702 or a discharged paper tray as a duplex copy.

In the reverting mode, a form from the fixing unit 712 is once fed into the duplex reverting section 700. The duplex reverting section 700 switches back the form fed thereinto, and the form is transferred to the upper side and then discharged with the surface having an image formed thereon kept downside. In this process, book pages are read in the order of pages, and the read images are formed on formes, so that the discharged forms are kept according to the page order.

Figure 36:
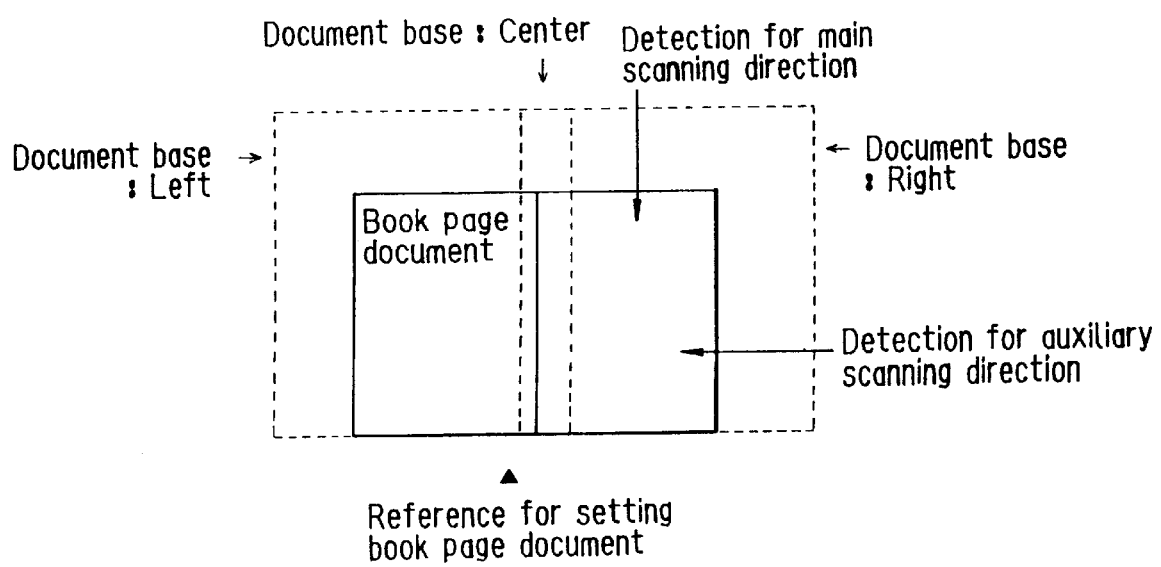
FIG. 36 is a view showing a reference for setting a book page document in the apparatus.

This apparatus comprises a scanner unit 30 having the upper side scan unit 200, and a document base unit 35 having a book page document base 1 loading a pressure to a spread book page document in the lower side, and the book page document 1 can be drawn out, and when setting a book page document, the book page document base 1 is drawing out to the front side of the apparatus. As shown in FIG. 36, a book page document is set aligning a left edge of the binding section and its front side thereof to the reference positions. After a top cover page of the book is fixed on a left document base, a rear cover is fixed on a right document base, so that displacement of a top page due to change in form of the binding section during continuous read of book page documents is prevented. A sequence for setting a book page document is as described below.

1) A document base unit 35 is drawn out and the document pressure plate is opened.

2) A left cover page of a book page document is held between the left document base and the document pressure plate aligning a left edge section of the binding section and the front side thereon to the respective reference positions.

3) A right cover page of a book page document is held between the right document base and the document pressure plate.

4) Pages from which reading is started are spread, a stopper claw 15 of the document pressure plate is hooked in a stopper claw 16, then the document base unit is set, and the book page document base is moved upward to press the upper spread pages into a flat plane.

In the present apparatus, as a spread book page document is set on the document base 1 being aligned to a reference positions in the control front side thereof as shown in FIG. 36, a left edge, a right edge, and an upper edge of a page change the positions according to a size of a spread book page document. Namely positions of a forward edge and a rear edge of an image in the auxiliary scanning direction and a position of a rear edge in the main scanning direction change according to a size of a spread book page document.

As shown in FIG. 36, after an image of a book page document is read, when the page is turned and scanning is executed, as described above, detection of an edge section of a book page document is started from a position of the black external frame section of the document base which is located in an outer side from the maximum size section of the spread book page document in the auxiliary direction, then the black document base is read, and then an edge section of the spread book page document is detected. In detection of an edge section of a book page document by a book page document edge section image detecting circuit, read data for particular pixels in the auxiliary scanning direction is continuously sampled, the data is compared to a certain threshold value, and a position where a pixel having the read data larger than the threshold value appears several times repeatedly is regarded as a position of an edge section of the book page document in the auxiliary direction. The IPU 103 computes a position for attracting and picking up a page upward for turning the page from the detected position of the edge section of the page, makes the scan unit 200 scan up to the position and stop motion of the scan unit 200, and at the position detection of an edge section of the book page document by the book page document edge section image detecting circuit is similarly executed as described above.

The spread book page document is aligned and set to a reference point in the central front section, and at a page attracting position or at a page upward movement position, namely at a position where an image reading position is above the spread book image document in the auxiliary scanning direction, read image data for 1 line in the main scanning direction is sampled. The read image data for this 1 line is started from a position of the black external frame of the document base in the inner side from the maximum book page document size on the document base 1, and then image data for the spread book page document on the black document base 1 appears. Detection of an edge section of a book page document in the main scanning direction is executed by comparing read image data successing in the main scanning direction to a certain threshold value, and a position where a pixel having a read value data larger than the threshold value appears several times repeatedly is regarded as a position of an edge section of a page of the book page document in the main scanning direction.

The IPU 103 computes positions of an edge section of a book page document both in the main scanning direction and in the auxiliary scanning direction from the read image data as indicated by the arrow mark in FIG. 36. For instance, if a size of a spread document is B4, right and left edge section of a book page document are displaced by approximately 182 mm in the auxiliary scanning direction from a central set position and by approximately 257 mm in the main scanning direction from an edge section in the front side. The scan unit 200 starts scanning a left home position for start of scanning for read, read image data from a position displaced by several millimeters frontward from an edge section of the book page document is stored in the memory 104, and the IPU 103 specifies an edge section of the book page document as a start position of an effective image area in the main scanning direction as well as in the auxiliary scanning direction when outputting image data.

Figure 37:
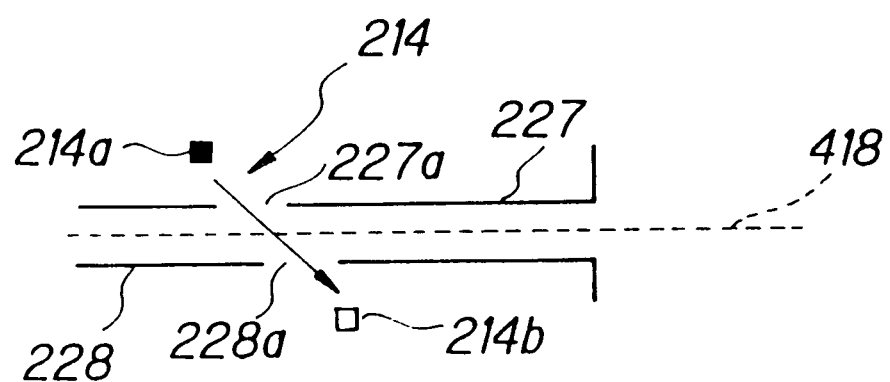
FIG. 37 is a cross-sectional view showing a portion of a turned page accommodating section in the apparatus.

In detection of an edge section of a page after the first page is turned, a position of an edge section of the top page is accurately and stably executed using a transmission type of page sensor 214 which detects a page to be turned in page turn/transfer. In this apparatus, a cover page of a book page document is secured to the document base 1, positional displacement during scan of a book page document is small. Also a book page document has a tendency that a positional change due to turning of a page is relatively small. In this apparatus, a transmission type of page sensor 214 as shown in FIG. 37 is used for detection of a turned page. The page sensor 214 has a light-emitting diode 214a as a light-emitting element provided on a page guide 227 in the upper side and a photo diode 214b as a light-receiving element under a page guide 228 in the lower side. Provided in the page guides 227, 228 constituting a page transfer path 418 are hole sections 227a, 228a, and the light-emitting diode 214a and photo diode 214b are provided in an inclined position against a direction perpendicular to a detecting position on the page transfer section so that paper dust generated when accommodating a page of a book to be copied does not reside at a position of the page sensor 214 and drops downward. The page sensor 214 detects a turned page of a book page document transferred via page guides 227, 228 after 1 page is separated, and the precision in detection is extremely high, namely the dispersion is within 1 mm. Also, the page sensor 214 has a function to detect jamming caused by a page not accommodated yet or not discharged yet when turning pages.

The scan unit 200 described above turns pages of a book page document by scanning in the leftward direction after a spread book page document BO is read. Locus of a page when accommodated is substantially constant, and is mechanically decided. When an edge section of a top right page of a book page document BO is attracted by a turning belt 208 and a scanning motion of the scan unit 200 is stopped once, the turning belt 208 moves upward and a turned page is guided to the page transfer path. Then the scan unit 200 moves further leftward, the turned page is accommodated in the page transfer path, and a tip of the page goes out of the scan unit 200. Locus of the turned page extends along the turning belt 208 having moved upward and is substantially constant, and is decided according to the mechanical layout. The page sensor 214 is located near an entrance of a turned page accommodating section comprising the page guides 227, 228, and detects a turned page of a book page document. A microcomputer in the IPU 103 computes a position of a right edge section of a turned page when the turned page is above the book page document from a position of the scan unit at a timing when start of detection of a turned page by the page sensor 214 is started, namely from a position of the scan unit 200 when accommodation of a turned page of the book page document in the turned page accommodating section is selected. For this reason, the microcomputer in the IPU 103 can accurately and without fail detect a position of an edge section of a page of a spread book page document in a direction in which the page is turned (in the rightward direction in this apparatus) by detecting the edge section of a page after separating one page by the page sensor 214, and also computes and corrects an read edge of an effective image area of a book page document and a position for page turning next time (It should be noted that positional displacement due to page turning is extremely small in a case of a book page document).

Control over a page for page attraction according to a result of computing above is executed as described below. In this apparatus, a width of page attraction for raising a page by contacting the turning belt to a right edge of a page is around 20 mm. In the IPU 103, if timing for detecting accommodation of a turned page of a book page document in the turned page accommodating section is earlier than a target timing, as the width of attraction is larger than 20 mm, timing for attracting and picking up an edge section of a page in the direction in which turning of a page of a spread book page document is started is made earlier. For instance, the IPU 103 guesses that the attraction width is 22 mm when timing for detecting accommodation of a turned page is earlier by 2 mm in terms of distance, and displaces a position for page attraction next time by 2 mm rightward in terms of an address of the scan unit 200.

On the other hand, if timing for detecting accommodation of a turned page of a book page document in the turned page accommodating section is delayed from the target timing, the IPU 103 changes a timing for attracting and picking up an edge section of a page in the direction in which turning of a page of a spread book page document is started in the direction in which the timing for picking up is delayed because the attraction width is smaller than the target of 20 mm. As a result, an attraction width of a page is kept at a constant value, which prevents mistakes in page turning such as those in which a page is not turned or a number of pages are turned simultaneously and also prevents a book page document from being damages, thus the page turning operation being executed repeatedly under stable conditions.

After a turned page is accommodated in the turned page accommodating section, when the scan unit 200 is moved further leftward, the turned page of a book page document is restricted at a central binding section, and the turned page is discharged along a U-shaped locus from the turned page transfer path with the turned page being pulled by the binding section. Also a locus along which a turned page is discharged is also kept substantially constant by the turned page transfer path as well as a holding roller 281*a*. The microcomputer in the IPU 103 computes an edge section of the turned page to be put on the document base at a top left side as the left edge section from an output signa from the page accommodation sensor 214 according to a timing for detection of end of discharge of a turned page of a book page document from the turned page accommodating section by the page sensor 214, namely according to a position where the scan unit 200 is at a position for detection of discharge of a turned page of a book page document from the turned page accommodating position. For this reason, the microcomputer in the IPU 103 accurately and without fail detects a position of an edge section of a page in the direction in which turning of spread book pages is started (in the leftward direction in this apparatus) to detect a tip of an effective image area for a book page document by detecting the edge section of a page after separating one page, and registers the data for reading next time.

As an middle position between the start position address A of an effective image area between an right edge section and a left edge section of a book page image computed as described above and the end position address B thereof is a binding position of a spread of pages, the microcomputer in the IPU 103 computes an address C of the central binding section as described below.

$$C=(A+B)/2$$

With this operation, a reference position for page allocation when copying a spread book page document image read once can be obtained. Also shade of distortion easily occurs in an image of a central binding section of a spread book page document, so that the microcomputer in the IPU 103 deletes an image at the position without fail. Furthermore, the microcomputer in the IPU 103 executes right page registration when a book page document is outputted page by page using the address C for the central binding section computed as described above.

As described above, a position of a top spread page displaces due to repeated operations for turning pages, and positional displacement due to turning of one page is extremely small. Also positional displacement of a top page when around ten pages are turned continuously is around 1 mm, so that displacement of an image position (copying resist) is small. For this reason, computing of a position for attracting a page of a book page document is executed once for a period in which page turn/scan is executed repeatedly, or for instance in which 10 pages are turned, and the positional data is updated, so that a work load and a time required for computing an page edge section of a book page document in this apparatus is reduced.

Next, a description is made for a reference of a book page document image.

Figure 38A:
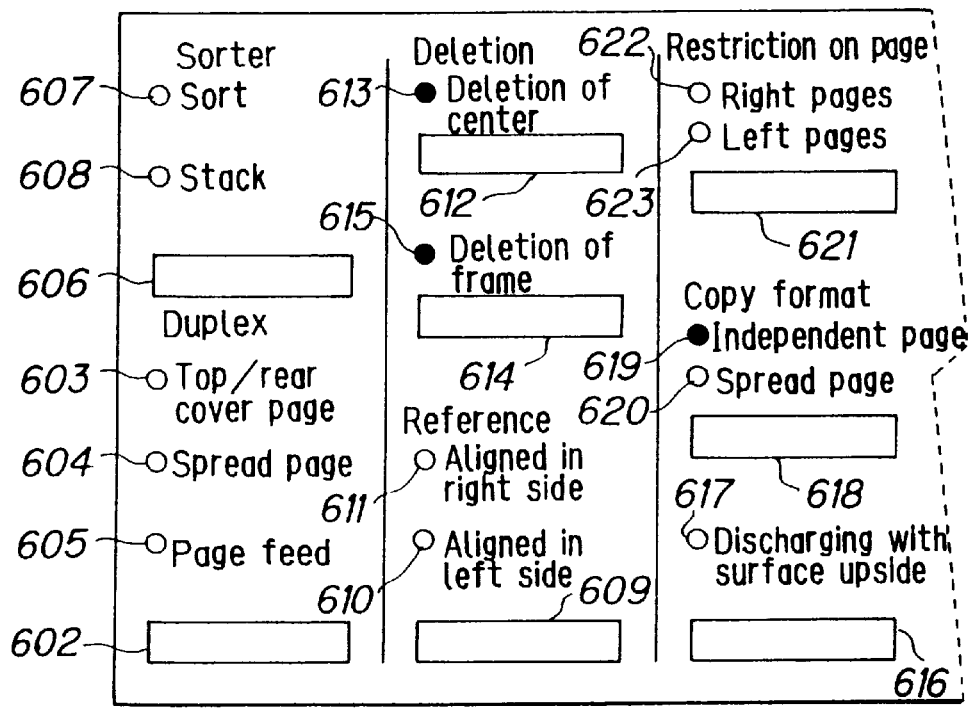
FIGS. 38A and 38B are flat views showing a portion of an operating section in the apparatus.
Figure 38B:
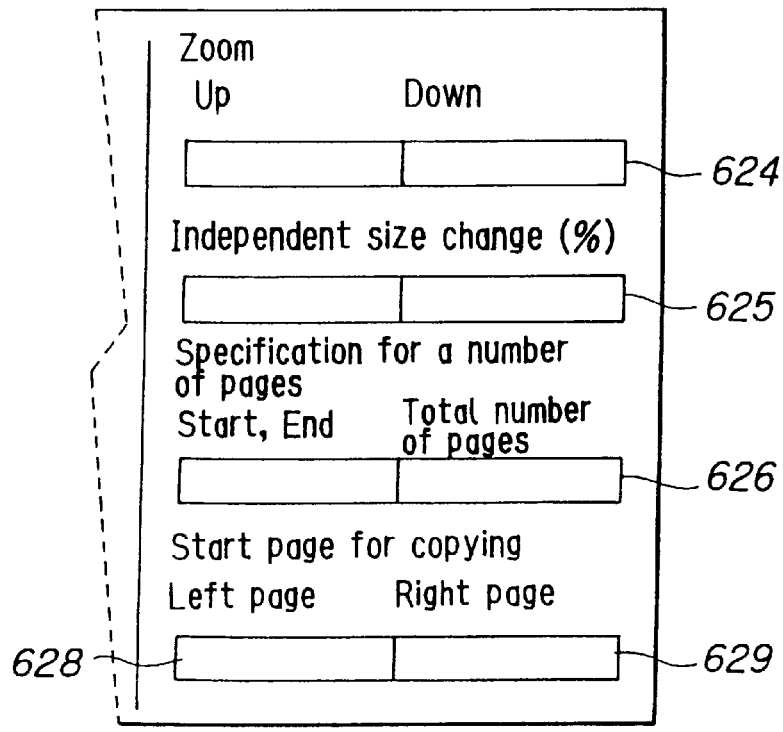

FIG. 38 shows a portion of an operating section 99 of the present apparatus. The operating section 99 comprises a image reference select key 609 for specifying an image reference mode used when a book page document is copied and light-emitting diodes 610, 611 indicating the state. Image reference positions include a center of a form (transfer paper), an left edge of a form (alignment to the left side), and a right edge of a form (alignment to the right side), and when the image reference select key 609 is pressed down, the image reference mode is sequentially switched from a mode with a center of transfer paper as a reference, a mode with a left edge of transfer paper as a reference, and then to a mode with a right edge of transfer paper as a reference position, and the light-emitting diode 610 is lit in the image reference mode in which a left edge is regarded as a reference position, and the light-emitting diode 611 is lit in a mode in which a right edge is regarded as a reference position. No display is provided in a mode in which a center of a form is regraded as an image reference position.

When a mode in which a center of a form is regarded as an image reference position at the default conditions such as power ON, mode clear, and a book page document read mode select is preferentially selected, lacking of a portion of an image due to an error in the size detection above or positional displacement in image forming itself is prevented, and also an image is not formed in the edge section, so that positional displacement of an image becomes not so remarkable. Also when a mode in which a left edge or a right edge of a form is regarded as a reference position is preferentially selected as a reference position in duplex mode, typically a blank section for binding is generated.

Figure 39A:
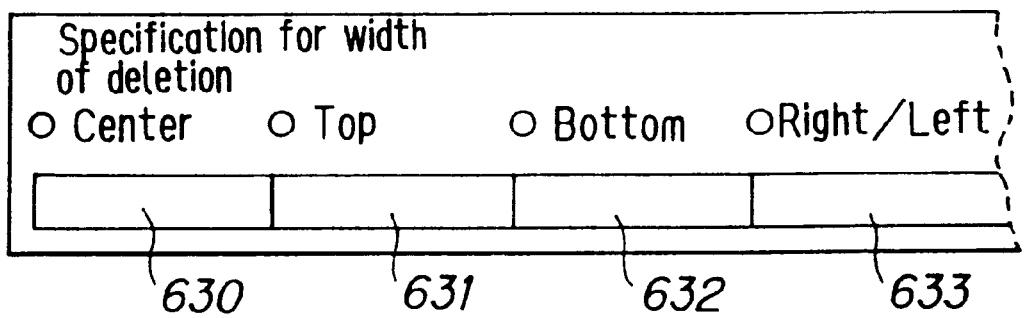
FIGS. 39A and 39B are flat views showing other portion of the operating section in the apparatus.
Figure 39B:
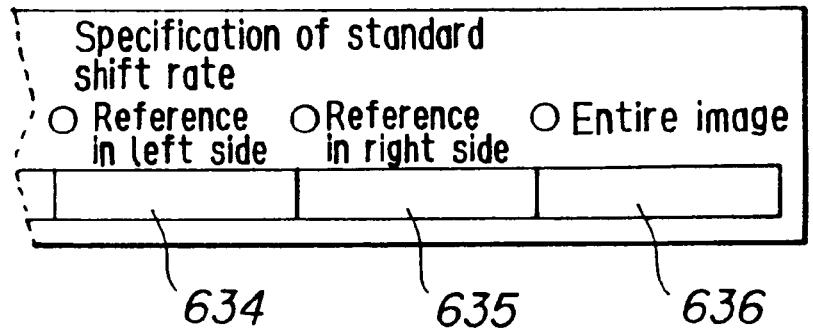

The operating section 99 has, as shown in FIG. 39, keys 634 to 636 for specifying according to which of left reference, right reference, and an entire image a shift rate of an image reference is set, and a image reference shift rate is set with tenkeys and the Enter key. Only when a left edge of a form or a right edge of a form is regraded as an image reference, the image reference shift rate is effective, and each image is formed being shifted from a form reference. The image reference shift rate can be specified in a range from 0 to 20 mm with a unit of 1 mm, and the default image reference shift rate is 0 mm.

Figure 41:
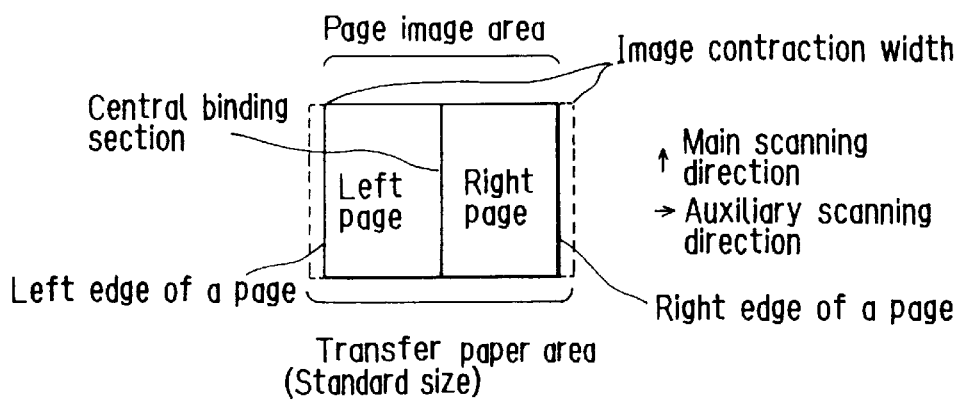
FIG. 41 is a view showing a page image area of a spread book page document in the apparatus.

FIG. 41 shows a range of a page image of a spread book page document to be read, and FIG. 42 and FIG. 43 show a position of a page image in each book document image reference mode.

FIG. 41 shows a case where an area around a center of a book page document of a book having a thickness of around 30 mm and size A4 is spread. A length of a page in a direction from a page edge section of a book page document to a central binding section is contracted to around 200 mm. Generally even if a page of a spread book page document has any rated size, the image contracts due to the binding section, and a size of the image is different from the rated size. This image contraction rate varies according to a thickness of a book and the binding method. Also there are many books consisting of forms having a size other than any rated size. Furthermore if an edge section is cut off after bound, a size of the book size image may become different from any rated size.

Figure 42A:
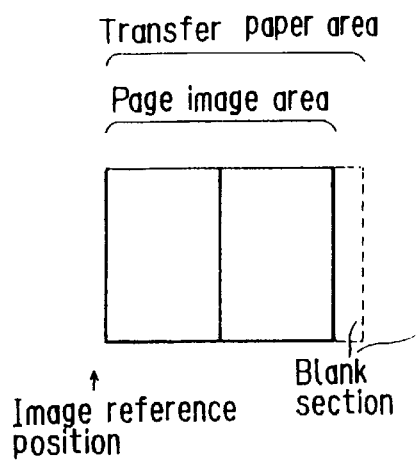
FIGS. 42A to 42C are views showing a form image in the spread book page document copying mode in the apparatus.
Figure 42B:
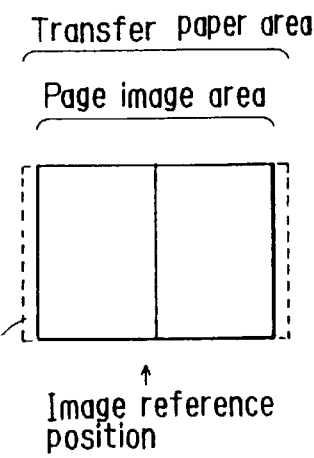
Figure 42C:
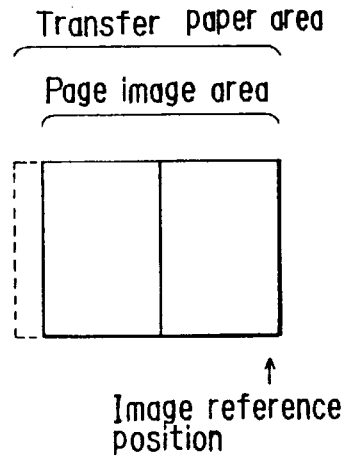

FIG. 42A to FIG. 42C show an image on a form in the spread book page document copying mode. Image reference positions in the spread book page document copying mode include a left edge of a form, a center of a form, and a right edge of a form.

In a case where an image reference position is a left edge of a form as shown in FIG. 42A, a position of an edge section of a page in the direction in which scan of a spread book page document is started is detected as described above, and the microcomputer in the IPU 103 executes a read address operation for the frame memory 104 according to a position of a left edge section of the page and data concerning a length of transfer paper fed by a laser printer, and with this operation a left edge section of the book page document is aligned to a position of a tip of the transfer paper in the transfer direction, an image of a spread of two pages is formed on a sheet of transfer paper, and an image of the spread of pages is formed in the left flash format like in a case of a copying machine based on the conventional technology in which copying is executed according to a scale reference.

In a case where an image reference position is a center of a form as shown in FIG. 42B, positions of edge sections of two pages in a spread of book pages both in the direction in which scanning is started and in the direction in which scanning ends, the microcomputer in the IPU 103 processes a read address in the frame memory 104 according to data concerning a length of the spread book page document computed from the detected position as well as to data concerning a length of transfer paper fed to the laser printer, and thus an image of a spread of book pages is formed at a center of the transfer paper. For this reason, uniform blank sections in proportion to contraction of a document are generated in the right and left sides of the transfer paper.

In a case where an image reference position is a right edge of a form as shown in FIG. 42C, a position of an edge section of a page of a spread book page document in the direction in which scanning ends is detected as described above, the microcomputer in the IPU 103 processes a read address in the frame memory 104 according to the detected position of an edge section of the page as well as to data concerning a length of transfer paper fed to the laser printer, a position of a right edge of a book page document is aligned to a rear position of the transfer paper in the transfer direction, and thus an image of a spread book page document is formed on a sheet of transfer paper. As a result, an image of a spread of two pages is formed in right flash format on the transfer paper with a blank section proportionate to contraction of a document generated in the left side of the transfer paper, and the blank section can be used as a space for binding.

Figure 43A:
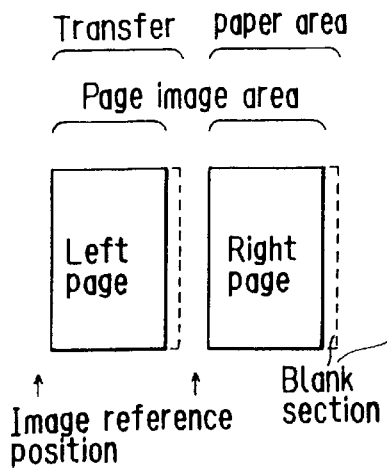
FIGS. 43A to 43C are views showing a form image in the independent page mode in the apparatus.
Figure 43B:
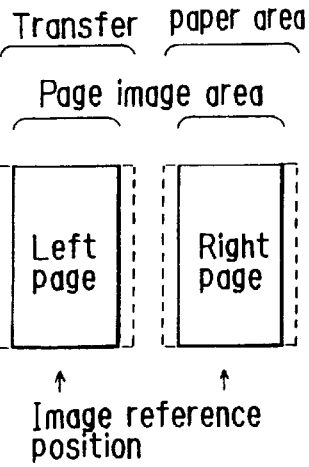
Figure 43C:
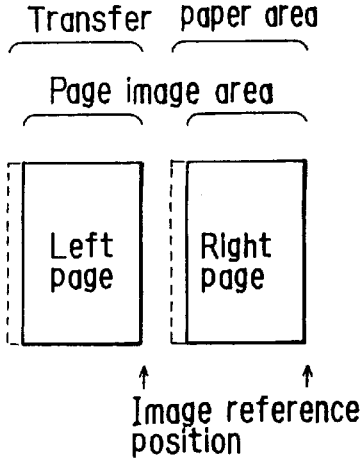

FIG. 43A to FIG. 43C show a form image in the independent page copying mode (independent page mode). Image reference positions in the independent page copying mode in which each page of a book page document is respectively copied onto transfer paper include a left edge of a form, a center of a form, an a right edge of a form.

In a case where an image reference position is a left edge of a form as shown in FIG. 43A, as described above, positions of edge sections of a left page and a right page in a spread book page document are detected with a position of the central binding section computed, the microcomputer in the IPU 103 process a read address in the frame memory 104 according to a position of an edge section of the left page as well as to a position of the central binding position, a position of an edge section of the left page of a spread book page document in the direction where scanning is started is aligned to a tip position of first transfer paper in the transfer direction, a position of a central binding section is aligned to a tip position of second transfer paper in the transfer direction, and thus two pages in the spread book page document are formed on a sheet of transfer paper independently. Also image of the two pages are formed in the left flash format on the two sheets of transfer paper respectively like in a case of the conventional copying machine in which copying is executed according to a scale reference.

In a case where an image reference position is a center of a form as shown in FIG. 43B, as described above, positions of edge sections of a left page and a right page in a spread book page document are detected with a position of the central binding position computed, the microcomputer in the IPU 103 processes a read address in the frame memory 104 according to positions of the page edge sections, a position of the central binding section as well as to data concerning a length of transfer paper fed to the laser printer, a position of an edge section of a left page of a spread book page document in the direction where scanning is started and a position of the central binding position are aligned to both edge sections of first transfer paper, a position of the central binding section and a position of an edge section of a right page are aligned to both edge sections of second transfer paper, and two pages of a spread book page document are formed at a center of each transfer paper respectively. For this reason, uniform blank sections are generated in the right and left sections of each transfer paper.

In a case where an image reference position is a right edge of a form as shown in FIG. 43C, as described above, positions of edge sections of a left page and a right page of a spread book page document are detected with a position of the central binding position computed, the microcomputer in the IPU 103 processes a read address in the frame memory 104 according to a position of an edge section of the right page, a position of the central binding section as well as to data concerning a length of transfer paper fed to the laser printer, a position of the central binding section of the spread book page document in th direction where scanning is started is aligned to a rear edge of first transfer paper, a position of an edge of the right page is aligned to a rear edge of second transfer paper in the transfer direction, and images of the two pages are formed in the right flash format on the two sheet of transfer paper. As a result, a blank section proportionate to contraction of the document is generated in the left side of transfer paper, and the blank section is used as a space for binding when the transfer paper is bound in the left side after copying or bound into a book.

Next, a description is made for an area of an image of a book page document.

At first, description is made for a range of book page document image read in the auxiliary direction and a method of arranging it are described with reference to time charts shown in FIG. 44 and FIG. 45. In FIG. 44 and FIG. 45, a read range and an image forming range in the auxiliary direction are indicated with a number of scan lines in each range, and the ranges indicate a position of the image.

As described above, this apparatus reads two pages of a spread book page document with one scan, the image data is stored in the frame memory 104, and then the image data is read from the frame memory 104 to form an image with a printer. In this apparatus, a range for storage of read image data in the auxiliary scanning direction in the frame memory 104 (decided by SFGATE) is for around 455 mm and 7174 lines against 420 mm which is an allowable maximum size of book page document because of a capacity of the frame memory 104. Generally, as a position of a page of a spread book page document changes as described above, a range for storage of read image data in the frame memory 104 in the auxiliary scanning direction starts from a left edge section of a left document base for a book page document having the maximum size.

In the book page document spread copying mode shown in FIG. 44, an effective image area of a spread of book covers having a size of A4 (decided by VFGATE) has a positional relation to an area for storage of read image data in the frame memory 104 according to a result of detection of an edge section of a spread book page document. The microcomputer in the IPU 103 computes VFGATE as 6400 lines according to contraction of a binding section of the book page document and depending on a result of detection of an edge section of the spread book page document in contrast to 6614 lines of a A3 size document. PFGATE 1, 2, 3 are examples of PFGATE indicating an effective image area on transfer paper in a case where the image data within the computed effective area is read from the flame memory 104 and printed by a printer onto transfer paper having a size of A3. The microcomputer in the IPU 103 decides an area of each PFGATE according to a size of transfer paper fed to a printer, and for instance selects 6614 lines for a document having a size of A3. The printer turns ON a resist clutch for a paper feeder using a first transition if the PFGATE as a trigger, feeds transfer paper from the paper feeder with a resist roller, and forms an image so that a tip of the image in the first transition of the PFGATE will be aligned to a tip of the transfer paper. The microcomputer in the IPU 103 regards each image data outside the VFGATE as blank and sends FH for blank data.

The PFGATE 1 is the one in a case of a mode where the image reference position is a left edge of a form, and the microcomputer in the IPU 103 sends image data form the frame memory 104 to a printer so that a left edge of a page of a book page document is aligned to a form edge of transfer paper and a blank section is generated at a rear edge of the transfer paper. As for an arrangement of an image in this case, the microcomputer in the IPU 103 treats image data behind a page range (VFGATE) of 6400 lines from a value indicated by a counter for counting a number of image lines as blank data.

PFGATE 2 is a case of a mode where an image reference is a center of a form, and in this case the microcomputer in the IPU 103 sends image data to a printer so that a center of a page is aligned to a center of transfer paper and uniform blank sections are generated at front and rear edges of the transfer paper. As for an arrangement of an image in this case, the microcomputer in the IPU 103 provides an area for 107 lines, a half of 214 lines which is a difference between a page area (VFGATE) of 6400 lines from a value indicated by a counter counting a number of image lines and an image area on transfer paper (PFGATE 2) of 6614 lines as a blank section before the area (VFGATE), also provides a blank section from an end point of an area (VFGATE) of 6400 lines so that the PFGATE 2 ends by 6614 lines.

PFGATE 3 is the one in a case of a mode where an image reference is an right edge of a form, and in this case the microcomputer in the IPU 103 sends image data to a printer so that a right edge of a page is aligned to a read edge of transfer paper and a blank section is generated at a front edge of the transfer paper. As for an arrangement of an image, the microcomputer in the IPU 103 provides an area of 514 lines which is a difference between a page range (VFGATE) of 6400 lines from a value indicated by a counter counting a number of image lines and an image area on transfer paper (PFGATE 2) of 6614 lines as a blank section before the VFGATE.

FIG. 45 shows an image range in the independent page copying mode. As in FIG. 44, an effective image area (VFGATE) of a spread page having a cover page size of A4 is positionally related to a range for storage of a read image from the frame memory 104 as shown in the figure depending on a result of detection of the edge section. The microcomputer in the IPU 103 computes the VFGATE as 6400 lines depending on a result of detection of an edge section of a spread book page document and according to contraction of a binding section of the book page document, and computes an area of a page in one side as 3200, a half thereof, and a position of central binding position as a middle of a range of the VFGATE.

Also in a case of a mode where an image reference is a left edge of a form, the microcomputer in the IPU 103 allocates an image of a left page in a spread book page image within an image range of 3307 line {PFGATE 1 (L)} on transfer paper having a size of A4, and sends image data form the frame memory 104 to a printer so that a left edge section of a left page is aligned to a front edge of the transfer paper and a blank section is generated at a read edge of the transfer paper. As an arrangement of an image in this case, the microcomputer in the IPU 103 treats image data after 3200 lines, a half of a page range (VFGATE), from a value indicated by a counter counting a number of image lines as blank data. Also the microcomputer in the IPU 103 allocates an image of a right page of a spread book page document within an image area of 3307 line {PFGATE 1 (R)} on transfer paper having a size of A4, and sends image data form the frame memory 104 to a printer so that a position of the binding section is aligned to a front edge of second transfer paper and similarly a blank section is generated at a rear edge of the transfer paper.

In a case of a mode where an image reference is a center of a form, the microcomputer in the IPU 103 allocates an image of each page in a spread book page document within an image range of 3307 lines {PFGATE 2 (L), PFGATE 2 (R)} of 3307 lines on transfer paper having a size of A4 respectively, and sends image data form the frame memory 104 to a printer so that a center of the page is aligned to a center of transfer paper and uniform blank sections are generated at front and rear edges of the transfer paper. As for an arrangement of an image in this case, the microcomputer in the IPU 103 provides an area of 53 lines, a half of 107 lines which is equivalent to a difference between 3200 lines, a half of a page range (VFGATE) and 3307 lines for an image range (PFGATE 2) on transfer paper from a value indicated by a counter counting a number of image lines as a blank section before an image of the page, and sends image data form the frame memory 104 to a printer so that a blank section is provided from an end point of the 3200 lines and the PFGATE 2 ends by 3307 lines.

In a case of a mode where an image reference is a right edge of a form, the microcomputer in the IPU 103 allocates a left page of a spread book page document within an image range {PFGATE 3 (L)} of 3307 lines on transfer paper having a size of A4, and sends image data form the frame memory 104 to a printer so that a page binding section is aligned to a rear edge of the transfer paper and a blank section is generated at a front edge of the transfer paper. As for an arrangement of an image in this case, the microcomputer in the IPU 103 provides an area of 107 lines which is equivalent to a difference between 3200 lines for a page range (VFGATE) and 3307 lines for an image range {PFGATE 3 (L)} on transfer paper as a blank section before the VFGATE, and reads image data for a left page in the VFGATE after that. Also the microcomputer in the IPU 103 allocates an image of a right page of a spread book page document within an image range {PFGATE 3 (R)} of 3307 lines on transfer paper having a size of A4, and sends image data form the frame memory 104 to a printer so that a position of an edge section of a right page is aligned to a rear edge of second transfer paper and similarly a blank section is generated at a front edge section of the transfer paper.

As described above, the microcomputer in the IPU 103 controls a write position on transfer paper by controlling a read address in the frame memory 104 in which image data is stored once. Also in all types of copying mode, a printer counts a timer using a first transition of each PFGATE as a trigger, turns ON resist clutch for paper feeding, and aligns a front edge of an image in the first transition of the PFGATE signal to a front edge of the transfer paper to form an image.

FIG. 46 and FIG. 47 show timing for a copying operation in the book page copying mode in the present apparatus.

FIG. 46 and FIG. 47 show a case where detection of an edge section of a book page document is being executed according to a position of page accommodation during the continuous copying mode. In FIG. 46 and FIG. 47, page 2 and page 3, and page 4 and page 5 constitute a spread of pages of a book page document. Signs RP and LP in a read signal memory R from the frame memory 104 indicate cases where the read image rate is for a right page (RP) and a left page (LP) respectively. Furthermore, a size of a page in each copying mode is size A4, and two pages in a spread book page document are read with one scan by the scan unit 200, the read image data is stored as read data for a sheet having a size of A3 in the frame memory 104, the image data is read from the frame memory 104 according to each output mode and used for forming and recorded on transfer paper with a laser printer 501.

FIG. 46 shows a case of a 1 vs 1 copying mode in which an image of a spread book page document is outputted onto transfer paper having a size of A3 and a copy of the book page document image is prepared, while FIG. 47 shows also a case of a 1 vs 1 copying mode in where images of right and left pages of a spread book page image are outputted as a independent page respectively and a copy of the book page document is prepared.

At a timing of operation for copying a book page document first time, when a print key instructing start of copying on the operation (panel) section 99 is pressed down, the microcomputer in the IPU 103 rotates a scanner motor 106 for running the scan unit 200 in the reverse direction, and moves the scan unit 200 positioned at the central position to the direction in which reading is started. When the scan unit 200 moves a read start position which is a home position in the left side, the microcomputer in the IPU 103 has the scanner motor 106 driven in the regular direction, lights both of the fluorescent lamps 210, 202, and also has read scan of the book page document started.

The microcomputer in the IPU 103 processes image data form the VPU 102 as read image data form a position of an edge section of a left position of the spread book page document, and generates an effective image area signal SFGATE in the auxiliary direction for reading. Also the microcomputer in the IPU 103 processes a data write signal memory W in the frame memory 104 according to the effective image area signal SFGATE to control a range for data write. The microcomputer in the IPU 103 recognizes a control position of a binding section of the spread book page document from a control address provided by the scanner motor 106, and uses the position as a reference position for a second image in the independent page copying mode or in a case where a read image is formed at a center of transfer paper in the spread page output mode.

When the scan unit 200 reaches an edge section of a right page of a spread book page document, the microcomputer in the IPU 103 starts an operation for detecting an edge section of a right page of the book page document, and computes a position for attracting a page when turning pages. When read/scan by the scan unit 200 ends, the scan unit 200 starts reciprocal movement for turning and scanning pages, at first a position for accommodating turned pages is detected, an effective image area is decided according to the page accommodating position, and then the laser printer starts formation of an image. Also in the second copying cycle and on, after scanning ends within the effective image area computed according to the page accommodating position detected in the previous cycle, formation of an image by the laser printer is started. The microcomputer in the IPU 103 operates the data read signal memory R in the frame memory 104 according to the effective image area signal PFGATE in the auxiliary scanning direction in the side of the laser printer and outputs image data in synchronism to the laser printer. Also when turning a page, an edge section of a page of a spread book page document is detected repeatedly by a page sensor. By repeating the steps described above, pages of a book page document are automatically turned, and thus a spread book page document is copied.

FIG. 47 shows a case of 1 vs 1 copying mode in which an image of each independent page in a book page document is outputted respectively. In this case, an operation in the read mode is executed according to the same timing as that shown in FIG. 46, and when turning a page, the data read signal memory R in the frame memory 104 is operated according two PFGATEs in response to transfer paper continuously transferred in the printer, and image data for each page of a book page document is outputted. When operation of an address counter in the frame memory 104 is masked by PFGATE and stopped, second image data for a right page linked to an image for a left page of a book page document is read according to a second PFGATE signal at a time interval of transfer paper fed in the laser printer.

The present apparatus insures a stable operation for turning a page regardless of positional displacement of an attracting roller. In relation to this feature, to attract only a front edge of a page, displace it upward, and guide to the page accommodating section, the attracting position is very important. As described above, when a page of a book page document is turned and scanned, an edge section of the book page document is detected by a page sensor and a position for operation of attracting and separating an edge section of a page of a book page document changing due to repetition of page turning is decided. Namely, a position for upward movement of the attracting roller when an edge section of a page in the side where scanning ends is detected and a page is turned and scanned is decided from data for a position for accommodation of turned page, and thus control is provided so that always a section having the same width is attracted and separated.

Next, a description is made for an operating section.

Figure 40:
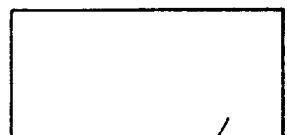
FIG. 40 is a flat view showing other portion of the operating section in the apparatus.

FIG. 40 indicates a portion of the operating section 99. The operating section 99 has a read mode select key 601 for selectively setting the sheet document read mode in which a sheet document on the contract glass 206 is read and copied and the book page document read mode in which a book page document on the document base 1 is read and copied, and each time the read mode select key 601 is pressed down, the sheet document read mode and the book page document read mode are alternately specified.

Also as shown in FIG. 38, provided in the operating section 99 are a duplex copying mode select key 602 for specifying the duplex copying mode for copying a book page document and light-emitting diodes 603, 604, and 605 each for displaying the specified mode. The duplex copying mode is classified to (1) the original duplex copying mode, (2) spread page duplex copying mode, and (3) automatic duplex copying mode, and each time the duplex copying mode 602 is pressed down, the copying mode is switched in the order of the original duplex copying mode, spread page duplex copying mode, and automatic duplex copying mode, and the light-emitting diodes 603, 604, and 605 are alternately lit to indicate the specified copying mode.

Under the default conditions including power turned ON, mode clear, and the book page document read mode selected, the main control board 107 clears all the duplex copying mode, and selects one-side copying mode. The main control board 107 enables the original duplex copying mode, spread page duplex copying mode, and automatic duplex copying mode in the independent page copying mode in which each page of a book page document is independently copied, and in the spread page copying mode in which an image of two pages of a book page document is copied onto transfer paper, it enables only the original duplex copying mode, and executes spread page duplex copying for forming images of two pages in a book page document on a top and rear surfaces of a form. Also the main control board 107 enables only one type of duplex copying mode in the sheet document read mode, and when the original duplex copying mode is selected, the duplex copying, in which each document is replaced with a new one and each image on atop and rear surfaces of a document are successively copied each time the print key is pressed down, is repeatedly executed.

The operating section 99 comprises a operating section shown in FIG. 38, a operating section not shown herein and a display panel. In the operating section, a print key, tenkeys and operation keys other than those shown in FIG. 38 are provided, and the display panel has a display section for providing various types of display.

FIG. 38, FIG. 39, and FIG. 40 show a key section of the operating section 99 respectively, and the key sections are mainly used for selecting a copying mode for a book page document as well as for providing displays. As shown in FIG. 38, a key 606 for selectively setting a sort mode and a tack mode of the sorter 702 and light-emitting diodes 607, 608 for displaying the selected mode are provided in the operating section 99, and each time the key 606 is pressed down, the sort mode and stack mode are set alternately.

In addition, the operating section 99 has a key 612 for selecting the center delete mode in which an image corresponding to a specified width around the binding section with a central section of a spread book page document as a reference is deleted, a light-emitting diode 613 for providing displays on the selected state, a key 614 for selecting each delete mode in which an image of an external frame corresponding to a specified width based of a reference for a book page document is deleted and a light-emitting diodes 615 for displaying the selected state, a key 616 for selecting the top surface discharge mode in which transfer paper is discharged with a surface having an image thereon upside, and a light-emitting diode 617 for displaying the selected state.

The operating section 99 has a copy format select key 618 for selectively specifying the independent page copying mode and spread page copying mode and light-emitting diodes 619, 620 for displaying the selected mode, and each time the copy format select key 618 is pressed down, the independent page copying mode and spread page copying mode are alternately selected. Also the operating section 99 has a page limit key 621 for selectively specifying the right page only mode in which only a right page of a book page document is copied, and a left page only mode in which only a left page of a spread book page document is copied, and light-emitting diodes 622, 623 for displaying the specified state, and each time the page limit key 612 is pressed down, the right page only mode and left page only mode are alternately specified.

Also the operating section 99 has a key 624 for increasing or decreasing a zooming factor, a key 625 for independently setting a rate in image size change , a page number set key 626 for setting a number of pages to be copied, and copy start page set keys 628, 629 for selecting a left page and a right page no respectively as a page from which copying of a book page document is to be started. Furthermore, the operating section 99 has keys 630 to 633 for setting a central deletion width, an upper deletion width, a lower deletion width, and right and left deletion widths in a book page document as shown in FIG. 39, and a deletion width in a book page document is set with ten-keys and the Enter key.

Then, a description is made for display of guidance.

Displays of operational guides and warnings in the present apparatus are provided by a display means comprising a liquid-crystal panel located in the operating section 99 and in which 20-digit and 2-line character display can be provided, and the guidance display is shown in FIGS. 48A to 48D.

FIG. 48A shows a typical display during copying of a book page document in the liquid-crystal panel guidance display section, and the contents indicate that a book page document is being read, an image is copied with the same size, page 15, which is a right page in the spread book page document, to page 48 are to be read, and now page 24 is being copied. The guidance display section provides displays for the read select mode at a left top position, a magnification of copying at a right top position, a number of pages to be copied at a right bottom position, and a page number of page being copied at a left bottom position.

FIG. 48B shows a typical display in the liquid-crystal panel guidance display section indicating that now start of copying of a book page document is being waited, and contents of the display indicates that an image is copied with the same size, totally 40 pages are to be copied in the spread page copying mode. As copying has not been started yet, a page number of a page being copied is not provided at a right bottom position.

As described above, in the present apparatus, page numbers are inputted for specifying a page from which copying of a book page document is to be started, a page in which copying is to be finished, and a total number of pages to be copied is inputted, contents of setting is displayed in the operating section 99, and an operator checks the page numbers or a number of pages and modified the parameters from the operating section 99, if necessary. Also, in a case where a start page for copying in the book page document is opened and set, the operator checks displays in the operating section 99 after the parameters are set, and then opens the book page document. The specified number of pages is displayed before start of reading of a book page document and when copying of the book page document ends in the operating section 99. When reading and copying a book page document, a number of pages to be copied and a page number of a page being copied current are displayed in the operating section 99.

In the present apparatus, operations for reading a book page document, forming an image of the read page on a form, and turning the page of the book page document are automatically executed continuously after the operations are started. A specified number of pages to be copied, and a page number of a page being read or copied are displayed in the operating section 99, thus operating state and historical data being reported from the operating section 99 to the operator. When the Stop key is pressed down, the present apparatus interrupts or stops the copying operation on the way of a page being copied currently.

FIG. 48C shows a typical display provided in the guidance display section during copying of a sheet document, and contents of the display indicates that an image is to be copied with the same size. FIG. 48D shows a state where the guidance display section is providing a display indicating an abnormal state when read image data in copying a book page document with an expanded size overflows a storage area in the memory 104.

Then, description is made for a mode control flow.

Figure 49:
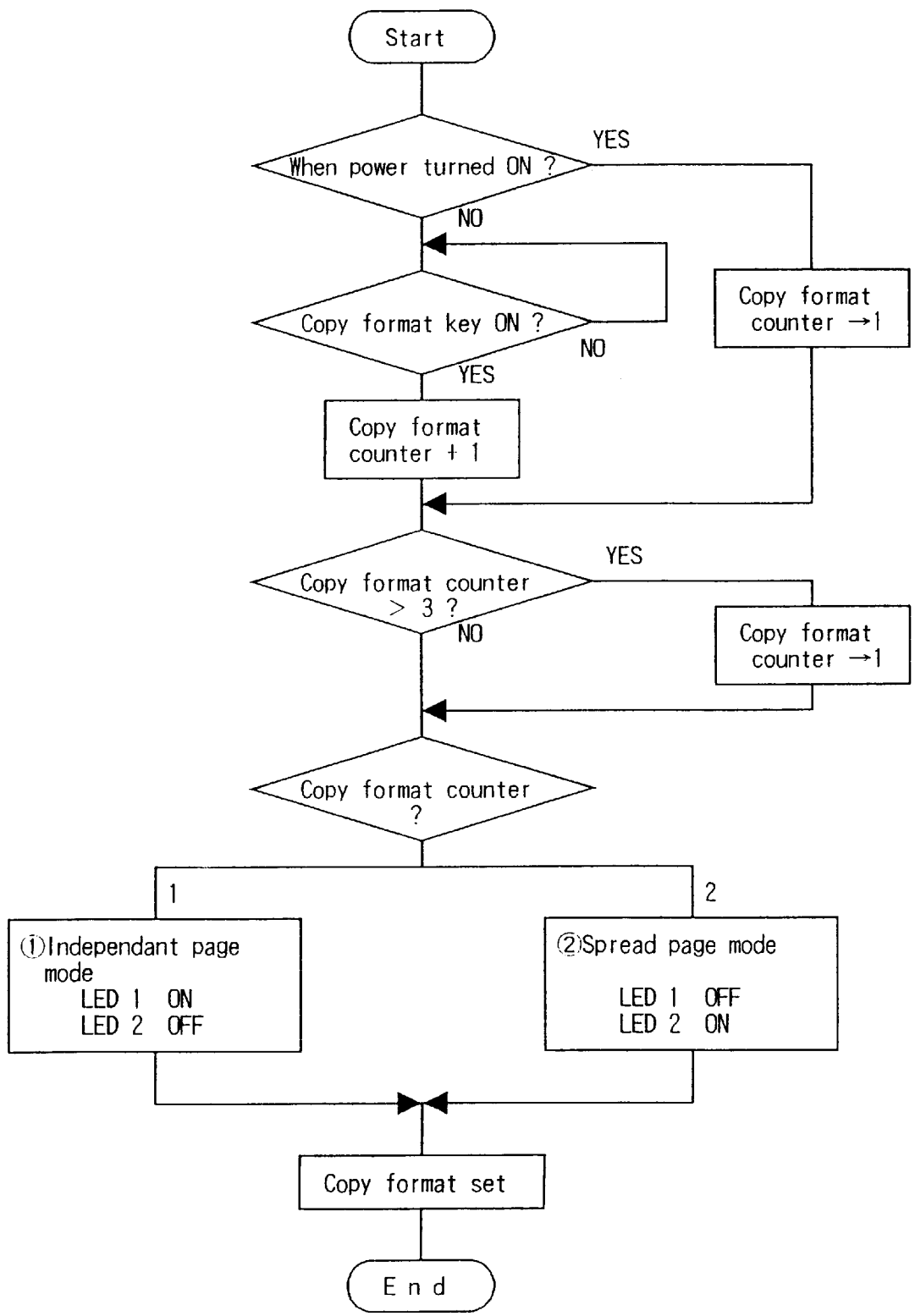
FIG. 49 is a flow chart showing a control flow in the copy format select mode in the apparatus.
Figure 50A:
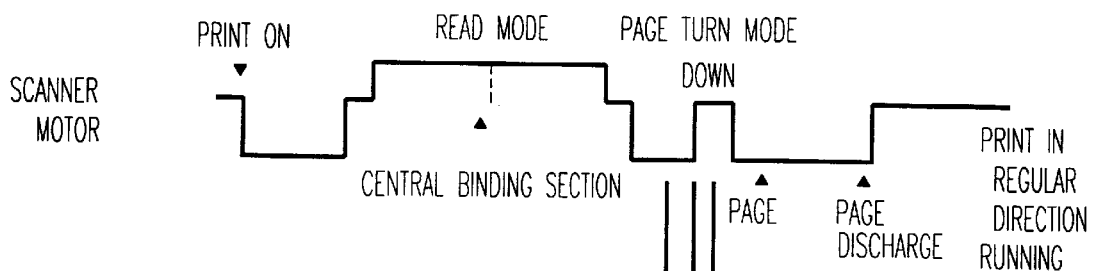
FIG. 50 is a timing chart showing a copying operation timing in the book page document mode in the apparatus.
Figure 50B:
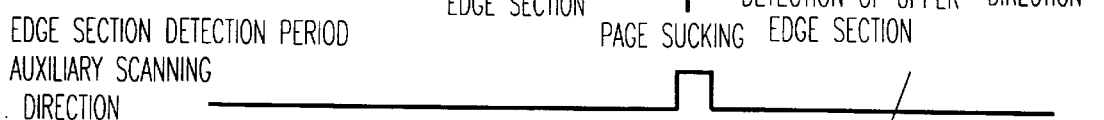
Figure 50C:
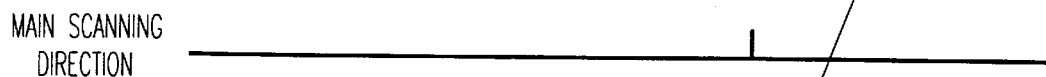
Figure 50D:
Figure 50E:
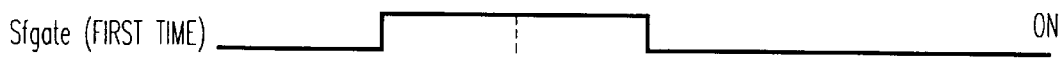
Figure 50F:
Figure 50G:
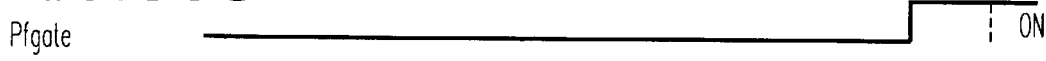
Figure 50H:
Figure 50I:
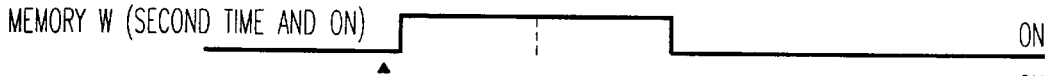
Figure 50J:

FIG. 49 is a control flow in the copy format select mode. This control is provided by a main controller (main control section) providing mode control for image formation, and according to the instruction from the main controller, the IPU controller (a controller in the IPU 103) provides controls over data processing and page turning. Also the sequence controller (sequence control section) provides controls over timing for load to the image forming section.

The copy format mode is enabled in the book page document mode, and is classified to (1) the independent page copying mode, and (2) the spread page copying mode. The modes are switched when the copy format select key 618 in the operating section 99 is pressed down, and contents of the selection is displayed by the light-emitting diodes 619, 620. In this apparatus, a priority order is assigned to each copy format mode, and the mode having the highest priority order is the independent page copying mode most frequently selected in which one page of a book page document is formed on one page of transfer paper. Also the default copying format mode selected when power is turned ON or when the book page document read mode is selected is the independent page copying mode (1).

The main controller increments a copying format counter as shown in FIG. 49, after power is turned ON, each time the copying format counter is set to 1 and the copying format select key 618 is pressed down, and when a value indicated by the copying format counter exceeds 3, the main controller sets 1 in the copying format counter. Then the main controller selects the independent page copying mode and lights up only the light-emitting diode 619 when the copying format counter indicates 1, and selects the spread page copying mode and lights up only the light-emitting diodes 620 when the copying format counter indicates 2.

When the independent page copying mode is specified, the main controller has each page image read out from the frame memory 104 as indicated by the read page image of a spread book page document shown in FIG. 43 and formed on transfer paper. Positional alignment of the image is executed by computing a position of the image from a position where an edge of the page is detected, and the image is allocated within the transfer paper. On the other hand, when the spread page copying mode is selected, the main controller has image data for two pages of a spread book page document read out from the frame memory 104 continuously and formed on a sheet of transfer paper.

Generally books, documents and the like are formed by binding printed materials with data printed on both top and rear surfaces of each page, and also office documents in those bound with a stapler or filed include the duplex printed materials. The present apparatus which reads the book page documents as described above, forms images of read page on transfer paper and turns pages thereof has the independent page copying mode in which an image of each page in a book page document is formed on one sheet of a form and a spread page copying mode in which an image of a spread of book pages is formed on one sheet of form, so that it is possible to obtain copies having a different format respectively. Especially in the independent page copying mode, the page configuration is the same as that in the book page document. Also in the spread page copying mode, a number of copies is reduced to a half, and an image extending over two pages such as graphics is obtained as a continuous image.

In the present apparatus, an image of two pages in a book page document is read by one scan, the read image data is written in the frame memory 104, the read image data is divided to image areas each for each page, and then the image data is read from the frame memory 104 and an image is formed on a sheet of a form, or the read image data is read for on the frame memory 104 as a continuous image of a spread book page document, and the image is formed on a sheet of form, and thus image read is similarly controlled with a one-way scan irrespective of a format of an image to be formed.

Next, a description is made for a copying mode and functions.

Description is made hereinafter for a copying mode, an entry key and the functions of the present apparatus with reference to FIG. 38 to FIG. 40.

1. Common copy mode Keys used commonly in each copying mode in the operating section 99)

(1) Sort/stack key 606

(2) Key for selecting paper (3) Key for adjusting copy density (4) Key for automatically specifying density (5) Ten-key (6) Mode clear/preheat key (7) Decimal key (8) Clear/stop key (9) Check a number of sheets to be copied/ enter key

(10) Interrupt key

(11) Start key (Print key)

2. Semi-common copy mode keys (1) Independent size change key

A key 625 for specifying a independent size change area by 1% pitch in a range from 71% to 141% in the main scanning direction as well as in the auxiliary scanning direction.

(2) Zoom key

A key 624 for specifying a zoom area by 1% pitch in a range from 71% to 141%.

(3) Reduced / enlarged / original size key

A key for specifying a copying magnification at a fixed image size change to any of 71, 82, 87, 93, 115, 122, and 141%.

(4) Character/photograph/character photograph key

A key for subjecting image data to shading processing by using multi-bit frame memory and by switching each of character/photograph/character photograph modes.

Each function as described above is the same function as that in a conventional type of copying machine.

3. New type copy modes (Copy modes based on a new technology according to the present apparatus)

(1) Duplex mode

Single side copy mode (Default)

(a) Top/rear page mode

Images on top and rear faces of a book page document are formed on both sides of a sheet of paper as they are.

A high-speed duplex copy mode is used only for a 1 to 1 duplex mode in which an order of pages for image data is interchanged by using frame memory 104, an image in a right page is formed on the surface of a first transfer paper to be transferred through a duplex transfer path, the page of a book page document is turned over, an image in the right page is formed on the surface of a second transfer paper to be transferred through the duplex transfer path, the first transfer paper is fed again, and an image on a left page is formed on the rear page of the first transfer paper, then the first transfer paper is discharged. In a case where a number of copying sheets is 2 or more, a transfer paper is stacked once in a duplex tray, and transfer through a high-speed duplex path is not executed.

(b) Spread page mode

Images in spread book pages are copied on top/rear surfaces of a transfer paper.

(c) Page-aligned mode

An image in a start page for copying of spread book pages is copied from the top surface of the transfer paper. For this reason, in a case where a right page is specified as a start page for copying, a duplex copying of the top/rear page (a) is executed, in a case where a left page is specified as a start page for copying, a duplex copying of the spread book pages (b) is executed.

When a sheet document read mode is selected, only the duplex copying of a top/rear page (a) is effective, and normal duplex copying for a single side document is executed.

(2) deletion mode (a) Center deletion mode (Default: available)

A document position is detected, and an image in a specified width of binding section is deleted by aligning and setting the position to a reference point in the central section of the spread book pages.

(b) Frame deletion mode (Default: available)

A document size is detected, and an image in a specified width for external frame section (upper, lower, both sides) of the book page document is deleted by setting the document to a reference.

To independently cancel deletion of each width of the upper, lower, and both sides, a specified value for deletion width is set to zero (0).

An image of which size is larger than the book page document is automatically deleted under normal conditions.

(3) Reference mode

Central mode (Default)

Copying is executed in a central section of a transfer paper in the auxiliary scanning direction by setting the paper to a reference.

An image shift in the auxiliary scanning direction is provided in a transfer paper by detecting the page length of the book page document.

(a) Right-aligned mode

Copying is executed in a position which is in a specified shift rate from the right edge in the transfer paper by setting the paper to a reference.

Generally, a space for binding is prepared in the left side of a transfer paper considering a portion shrunk in the binding section.

(b) Left-aligned mode

Copying is executed in a position which is in a specified shift rate from the left edge in the transfer paper by setting the paper to a reference.

When a sheet mode is selected, (a) right-aligned is always specified.

It is also effective when a spread pages mode is specified, an image is provide in a transfer paper according to a length of both pages of the spread book pages.

(4) Restriction on page mode

Both pages mode (Default)

Both of right and left pages are copied. It is effective when an independent page mode is specified.

(a) Right page mode

Only a right page of spread book pages is copied.

This mode is used when a single side document such as a file is copied.

(b) Left page mode

Only a left page of spread book pages is copied.

(5) Copy format mode (a) Independent page mode (Default)

Spread book pages are copied page by page.

(b) Spread page mode

Both pages of spread book pages are copied as they are.

Duplex copy of spread pages in which first spread pages are copied on the surface of a transfer paper and second spread pages are copied on the rear surface of the transfer paper is effective when only (b) spread pages and duplex copy and (a) top/rear page mode) are specified.

(6) Discharging paper select mode

Discharging with surface downside mode (Default)

To read a book page document in increasing order of pages, normally when a single side copy is selected, a transfer paper is discharged with the surface downside and the image surface downside.

(a) Discharging with surface upside mode

This mode is specified when a number of documents to be copied is a few or when an image is to be checked, and a transfer paper is discharged without being reversed. This mode can also be specified when a sheet mode is selected.

In a duplex copy mode, discharging is not specified, but a transfer paper is discharged without being reversed.

(7) Specification for a number of pages input mode (a) Start page/End page for copying mode A number of pages from a start page to end page for copying is computed, and the pages therebetween are copied.

(b) A number of pages to be copied mode

Only a specified number of pages in any of a right page or a left page each specified of a book page document is repeatedly copied. In this case, inputting page numbers to be copied to a start page/end page input mode is not required.

This mode is used in a case where page numbers are not written on a book page document, or in a case where page numbers are not in the regular order.

A method of specifying a number of pages comprises following steps: 1. any mode of any page/a number of pages to be copied is selected with each mode key, 2. any numeral value of pages to be copied is inputted with a ten-key, and 3. those steps are fixed with an enter key.

Generally, a single page of spread book pages is counted as one page, and in a case where only a right page or a left page is to be copied, the page to be copied is regarded as a single document, and the page to be copied is counted as one page.

(8) A start page for copying input mode (a) Left page mode

This mode is an independent mode, and copy is started from the left page of a document.

(b) Right page mode

This mode is an independent mode, and copy is started from the right page of a document.

This mode is also specified when each of duplex copy modes is selected. When a duplex copy mode is specified, a first page and a last page are automatically discharged as blank sheets by specifying a start page and a number of pages to be copied.

When spread book pages are outputted, specifying a first page and a last page each as a single page to be copied (deletion of a half page) is impossible.

(9) Read select input mode (Default)

Book page document read mode

This mode is a read in a lower side, and is used for reading a book page document and for automatically turning pages.

(a) Sheet document read mode

This mode is a read in an upper side, and is used for reading a sheet document.

This mode is specified when a sheet document and covers (hard covers) of a book page document are copied.

4. Specification of rate mode

A method of specifying a rate comprises following steps: 1. any of rate specification modes is selected with each mode key, 2. any numeral value of a rate to be specified is inputted with a ten-key, and 3. these steps are fixed with an enter key.

(1) Specification for width of deletion mode (a) Center mode (Default : 10 mm)

A width to be deleted is specified by unit of 1 millimeter from 0 mm to 40 mm according to a reference of a document. In an independent page mode, a width for deletion in a binding section of each page becomes a half thereof.

(b) Top mode (Default : 10 mm)

A width to be deleted is specified by unit of 1 millimeter from 0 mm to 30 mm according to a reference of a document.

(c) Bottom mode (Default : 10 mm)

A width to be deleted is specified by unit of 1 millimeter from 0 mm to 30 mm according to a reference of a document.

(d) Right/left mode (Default : 10 mm)

A width to be deleted is specified by unit of 1 millimeter from 0 mm to 30 mm according to a reference of a document.

Both right/left edges are deleted by the same rate, and in an independent page mode, (a) center width of deletion is preferred.

(2) Specification of standard shift rate mode (a) Reference i n left side mode (Default : 10 mm)

A position ( a shift rate) from the left side of a transfer paper is specified by unit of 1 millimeter from 0 mm to 20 mm.

(b) Reference in right side mode (Default : 10 mm)

A position a shift rate) from the right side of a transfer paper is specified by unit of 1 millimeter from 0 mm to 20 mm.

(3) Entire image mode

An image which is larger than a document size is not deleted, and the image is copied on an entire transfer paper.

This mode is used in a case where a size of a book page document is not known, and is effective when (b) a deletion of frame mode is canceled.

It is assumed herein that image data outside a read scanning area in the auxiliary direction is white data.

Next, a description is made for operations of the TPS system.

A. TPS operation mode (1) Read mode (a) Book page document read mode

The mirror 222 is switched off, the fluorescent lamps 201, 202 each provided in the lower side are turned ON, spread book pages is read once by being scanned in a rightward direction with the scan unit 200 after correction for shading of the image at the left home position, and the read image data is stored in the frame memory 104.

(b) Sheet document read mode

The sub-first mirror 222 is inserted into the light path, the fluorescent lamps 203, 204 each provided in the upper side are turned ON, and a sheet document is read by being scanned in a rightward direction with the scan unit 200 after correction for shading of the image at the left home position, the read image data is stored in the frame memory 104.

(2) Return mode (a) Page turn

In the book page document read mode, high pressure bias is loaded to the turning belt 28, the scan unit 200 scans a book document in a leftward direction, and is stopped at a point of time when the turning belt 208 has reached the right edge section of the spread book pages, the turning belt 208 is raised, then the scan unit 200 scans the document in the leftward direction after 0.5 sec thereof.

A right edge section and an upper edge section of the spread book pages are detected according to the read image by the read sensor (CCD), and an effective area for an image in a position for initially sucking a page and in the main scanning direction is computed. Also positions of the right edge section and the left edge section of the spread book pages are detected by the page sensor provided in the page transfer path when a page is turned, and an image effective are in the auxiliary scanning direction is computed.

(b) Scan unit return

In the sheet document read mode, the scan unit 200 scans the document in the leftward direction.

(3) Homing mode

When power is regularly turned on, the document base is lowered, and is saved from the scan unit 200. The scan unit 200 scans and is set to the central home position.

(4) Pre-scan mode

The scan unit 200 runs to the left home position to prepare for shading correction and for starting read.

(5) After-scan mode

After return operation is complete, the scan unit 200 runs to be set in the central home position, the document base is lowered to be saved from the scan unit 200, which makes it possible to take out the book page document.

FIG. 50 shows a timing for copying operation in the book page document mode (book pate document read mode) (in the present apparatus and shows a case where an edge section of a book page document is being detected according to the image in the initial mode after the print key in the operating section 99 is pressed down. In FIG. 50, page 2 and page 3, and page 4 and page 5 form a spread book page respectively. Signs RP and LP for the read signal memory R in the frame memory 104 indicates that the respective read image data is for a right page (RP) and a left page (LP) . Furthermore spread two pages of a book page document are continuously read with one scan by the scan unit 200, the read image data is stored as read data for a size A3 in the frame memory 104, the image data is read out from the frame memory 104 according to each output mode, and the image is formed by a laser printer and is recorded onto transfer paper. FIG. 50 shows the 1 vs 1 copying mode in which an image of a book page document having a size of A3 is outputted onto transfer paper having a size of A3, and a copy of the book page document is prepared.

At a timing of an operation in the book page document shown in FIG. 50, when the print key for instructing start of copying in the operating section 99 is turned ON, the microcomputer in the IPU 103 makes the scanner motor 106 for running the scan unit 200 rotate in the reverse direction and makes the scan unit 200 located at a central position of the apparatus move in the direction where reading is started. When the scan unit 200 moves to a reading start position which is a left side home position, the microcomputer in the IPU 103 drives the scanner motor 106 so that the scan unit 200 moves in the rightward direction, lights up the both fluorescent lamps 201, 202 and starts reading and scanning the book page document.

The microcomputer in the IPU 103 regards an area from an edge section of a left page of the spread book page document as an image area and generates a signal SFGATE indicating an effective image area in the auxiliary reading direction. The microcomputer in the IPU 103 operates the data write signal memory W in the frame memory 104 according to the effective image area signal SFGATE, and controls an area for data write. The microcomputer in the IPU 103 recognizes a central position of a binding section of a spread book page document from a control address of the scanner motor 106, and uses the data as a reference position for a second image in the independent page copying mode or for forming a read image in the spread page copying mode at a center of transfer paper.

When the scan unit 200 reaches an edge section of a right page of a spread book page document, detection of an edge section of a right page of the book page document is started, and the microcomputer in the IPU 103 computes a position for attracting a page when turning a page. When reading/scanning by the scan unit 200 ends, reciprocal movement for reading and scanning is started, and after an effective image area is decided according to a position for page accommodation in the first operation, image formation by the laser printer is started. Namely the microcomputer in the IPU 103 computes a position of a right edge position of the page according to scanning position of the scan unit 200 when detection of accommodation of the turn page by a page sensor is started as well as from a form of accommodated page, and also computes a position of a left edge section of the page of the book page document according to a scanning position of the scan unit 200 when discharge of a turned page is detected by the page sensor as well as to a form of accommodated page.

Also in the second copying cycle and on, immediately after reading/scanning is finished within the effective image area computed according to a position of accommodated page detected in the previous cycle, image formation by the laser printer is started. The data read signal memory R in the frame memory 104 is operated according to the signal PFGATE indicating an effective image area in the auxiliary scanning direction in the side of the laser printer, the image data is outputted from the frame memory 104 in synchronism to the laser printer. When turning each page, an edge section of a spread book page document is repeatedly detected by the page sensor. By repeating the steps described above, spread book pages are copied automatically by turning pages of the book page document.

The present apparatus executes an operation for turning pages stably against displacement of an attracting roller. The attracting position is important for attracting only a front edge section of a page and displacing it upward to guide the page into a page accommodating section. As described above, when pages of a book page document are turned and scanned, an edge section of each page of a book page document is detected, a position for attracting and separating a page is decided to an edge section of the page of a book page document changing in association with the operation for turning pages, and control is provided so that attraction and separation of a page will be executed according to a specified page width.

Next, a description is made for movement of a book document base and a range of an image memory.

FIG. 51 shows motion of the book document base 1. During read of a book page document BO, the right and left document bases 1 are independently pressurized so that a spread page of the book page document BO is kept horizontal in the same plane as described above. The left side document base 1 moves only in the vertical direction in association with turning according to a thickness of a left page section of a spread book page document. The right side document base 1 moves in the vertical direction in association with turning according to a thickness of a right page section of the spread book document, the right and left document bases are jointed to each other at a back cover section of the book page document and displace so that the back cover section of the book page document rotates around a right edge section of the left side document base 1 in association with turning of pages.

FIG. 52 shows a spread book page document and a range of image memory (a range for storage of image data in the frame memory 104).

Left pages of a book page document are piled up each time a page is turned, and a top page in the left side displaces rightward in the inclined direction. On the other hand, a right page of a spread book page document displaces rightward in association with turning of pages, but because of rotation of the back cover section it returns to the original position. Also a left page of a spread book page document displaces rightward being pulled by a curbed section in the binding section.

Figure 53:
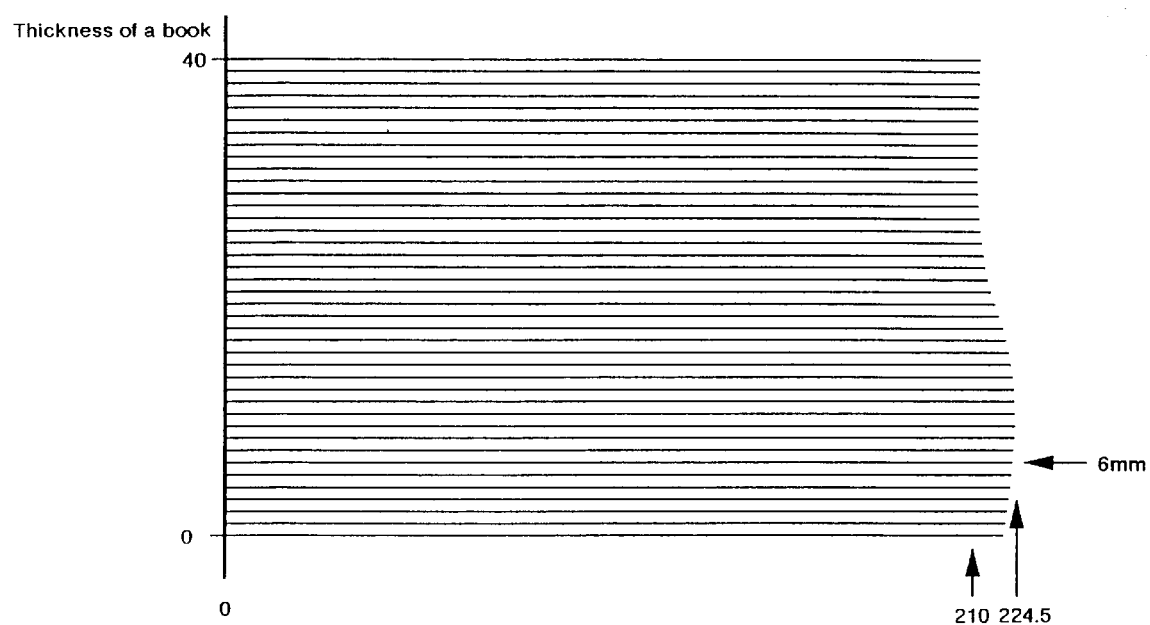
FIG. 53 is a view showing a result of simulation of movement of a top page in the right side of a book page document.
Figure 54:
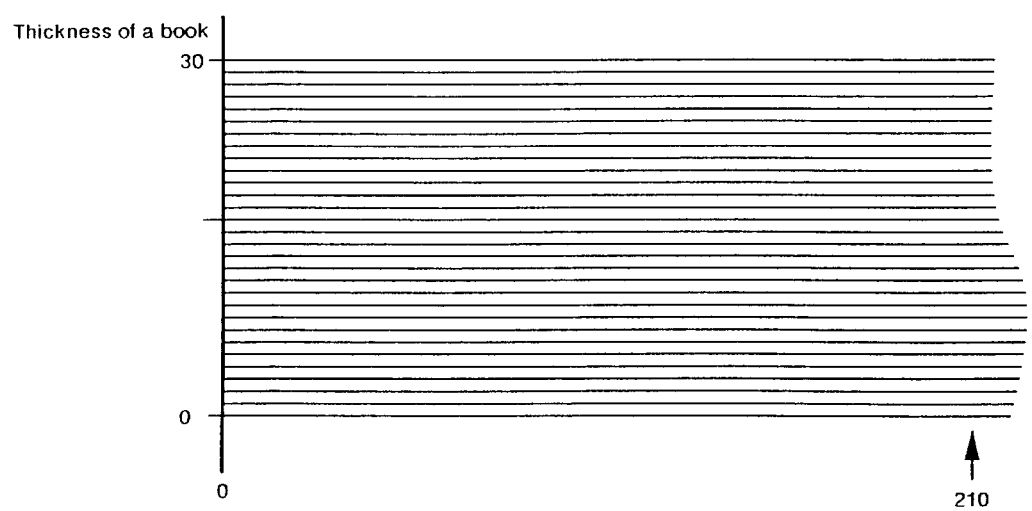
FIG. 54 is a view showing a result of simulation of movement of a top page in the right side of other book page document.
Figure 55:
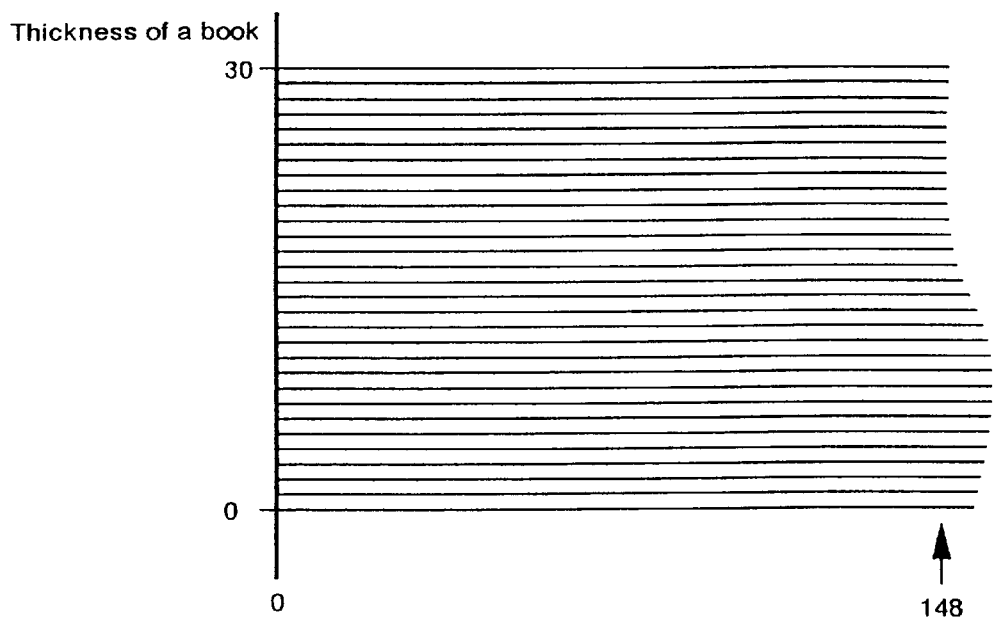
FIG. 55 is a view showing a result of simulation of movement of a top page in the right side of other book page document.

As a result of simulation, it has turned out that the maximum displacement of a right page of a spread book page document is 14.5 mm against a book thickness of 40 mm in a case of document having a size of A4. FIG. 53 to FIG. 59 show a result of simulation on movement of a right top page of a book page document, and FIG. 53 shows movement of a right top page of a book page document against a book thickness of 40 mm in a case of a document having a size of A4. FIG. 54 shows movement of a right top page of a book page document against a book thickness of 30 mm in a case of a document having a size of A4, and FIG. 55 shows movement of a right top page of a book page document against a book thickness of 30 mm in a case of a document having a size of A5.

Figure 56:
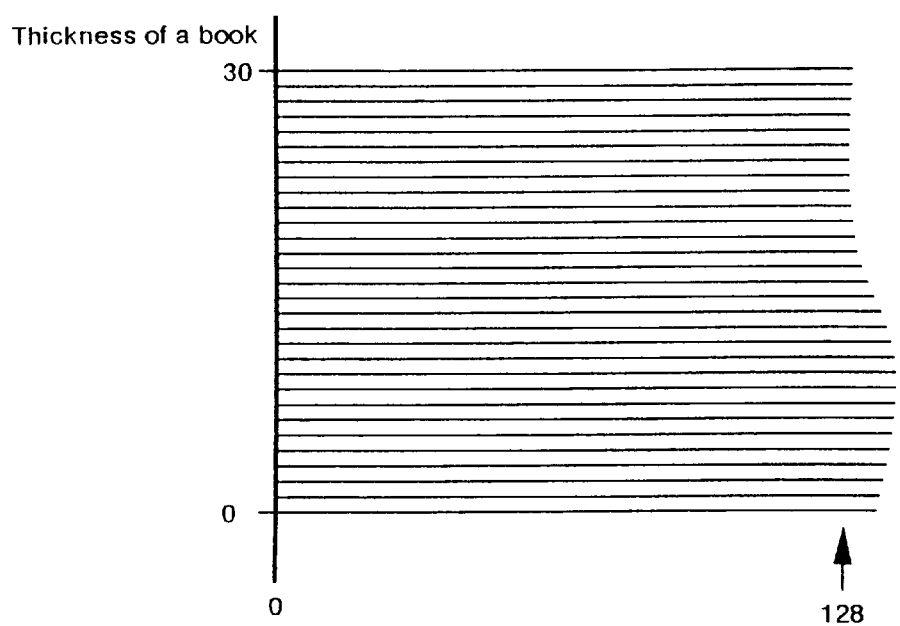
FIG. 56 is a view showing a result of simulation of movement of a top page in the right side of other book page document.
Figure 57:
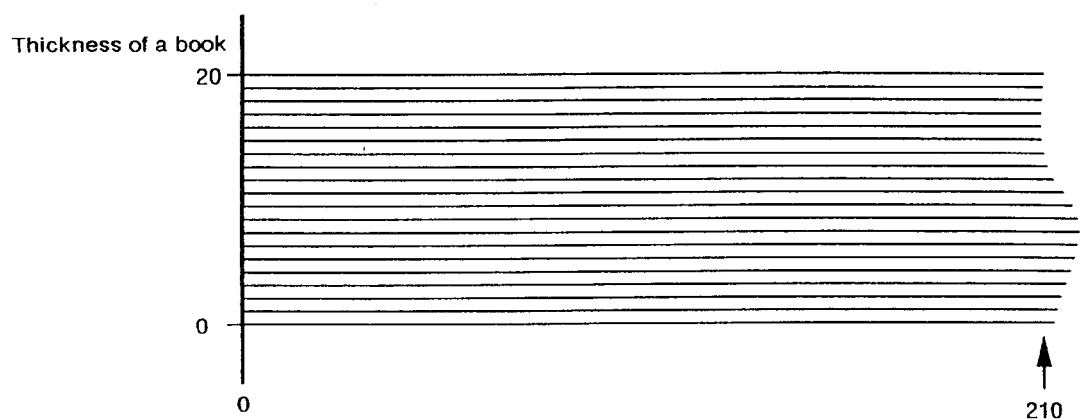
FIG. 57 is a view showing a result of simulation of movement of a top page in the right side of other book page document.
Figure 58:
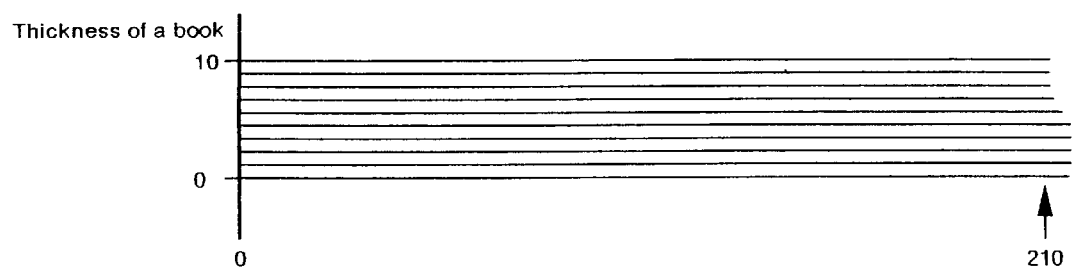
FIG. 58 is a view showing a result of simulation of movement of a top page in the right side of other book page document.
Figure 59:
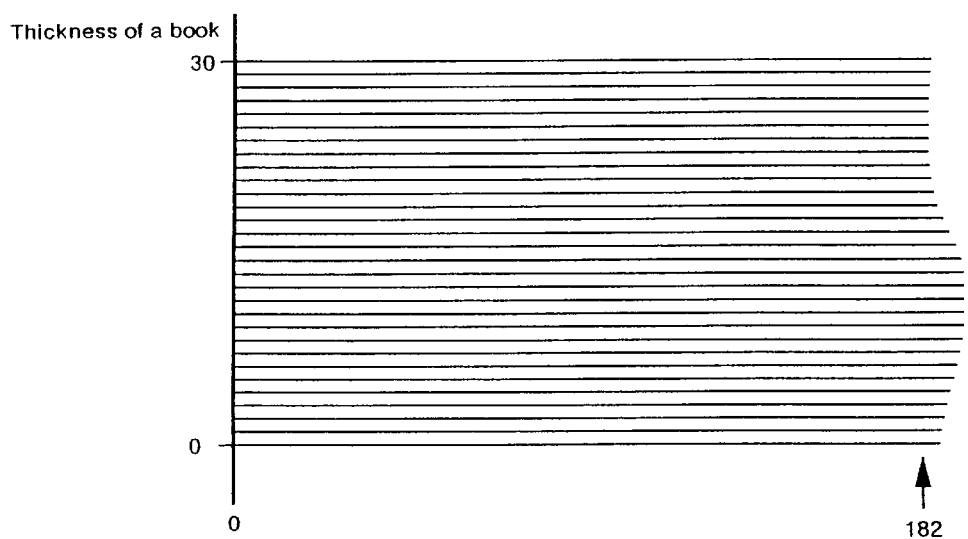
FIG. 59 is a view showing a result of simulation of movement of a top page in the right side of other book page document.

FIG. 56 shows movement of a right top page against a book thickness of 30 mm in a case of a document having a size of B6, and FIG. 57 shows movement of a right top page against a book thickness of 20 mm in a case of a document having a size of A4. FIG. 58 shows movement of a right top page against a book thickness of 10 mm in a case of a document having a size of A4, and FIG. 59 shows movement of a right top page of a book page document against a book thickness of 30 mm in a case of a document having a size of B5.

As described above, the left side document base 1 on which a left cover page of a book page document is fixed is fixed in the reading/scanning direction and moves only in the vertical direction, and for this reason, it never displaces leftward beyond a first left page of a book page document, namely a left cover page. Also when reading a book page document, the book page document is pressed upward to the scan unit 200, and the scan unit 200 is run in contact to the book page document, so that a bundle of book page documents is energized to the downstream in the scanning direction.

The present apparatus has the frame memory 104 as an image memory to store image data as described above, and uses this image memory 104 for the following purposes.

Firstly, the image memory 104 insures stability in movement of a book page document displaced in association with contact and reading by the scanning unit 200 and also protects the document as a speed buffer in document read and image formation. Secondly the image memory 104 repeats copying a document by repeatedly using the image data read in the first scan, so that the document is protected and productivity in copying is improved. Thirdly the image memory 104 uses a page position detected in the first operation for deciding a position of a page to be copied and for separation of an independent page.

As shown in FIG. 52, a range for storage of book page document image data in the image memory 104 is allocated around a binding section of a book page document, and when a document is copied with the same size or reduced size, at maximum image data for a book page document having a size of A3 can be stored in the area. In the image memory 104. storage of image data form a point just ahead the area to the VPU 102 is started by the IPU 103, and a surplus section of the image memory 104 is located in the rightward direction.

Next, a description is made for compensation for displacement of a page.

At first, description is made for a size of the image memory 104. The Image memory 104 has a memory capacity of 16M bytes (128M bit: Accurately 134,217,728 bits), and stores therein 4-bit/dot image data having been subjected to image processing from the VPU 102 as multivalued data. For this reason, an image data storage area in the image memory 104 is for a size A3 and odd. Herein 16M bytes correspond to 33,554,432 dots (134,217,728 bits/4), and size A3 corresponds to 30,953,520 dots (4680 dot×6614 lines), so that a surplus in the image memory 104 is 2,600,912 dots.

A surplus of this image memory 104 is for 555 lines, and as a memory area for 1 line in the image memory 104 is used for storage of blank data for deletion of an image, so that an effective surplus of the image memory 104 corresponds to 35.1 mm. The area for this size A3+35.1 mm is an image data storage area in the image memory 104, and a surplus of the image memory 104 is used to accommodate displacement of a page due to a thickness of a book page document in a case of a spread book page document having at maximum a size of A3. In the present apparatus, as described above, the image memory 104 is capable to store therein one page of a spread book page document having at maximum a size of A3 in a case where the book page document has a thickness of at maximum 40 mm with its surplus section. This surplus section is used to compensate displacement of a page of a book page document.

Next, a description is made for displacement of a page of a book page document.

The maximum allowable book thickness is 40 mm, and each time a page is turned, a binding section of a book page document displaces rightward, and also a right edge section of a right page as a final page to be read and scanned displaces. Also a left cover page is fixed in the reading/scanning direction, and the binding section rotates, so that displacement of a position of a right edge section of a right page in a spread book page document is less than a thickness of the book. As a result of numerical simulation on a position of a right edge section of a spread book page document, it has turned out that a maximum absolute value of displacement of a right edge section of a right page in a spread book page document in a case of a book page document having a size of A4 and a thickness of 40 mm is 14.5 mm. A maximum value of displacement of a right edge of a right page in a spread book page document does not depend on a size of a book page document, and the smaller a thickness of a book, the smaller the displacement is. Namely the image memory 104 has a surplus memory capacity for 35.1 mm, and when an image is copied (read) with the same size, an allowance of $$35.1 - 14.5 = 20.6 \text{ mm}$$

is generated, and an image data storage range when an image is copied with the same size is satisfied, and displacement rate of a page can be compensated. Also a further allowance is generated in the image memory 104 when an image is copied (read) with a reduced size.

On the other hand, when an small size document is copied (read) with an enlarged size, the surplus section for 35.1 mm in the image memory 104 decreases according to a factor in image size change, and in a case of the maximum magnification factor of 141%, the document image area is:

$$35.1/1.41 = 24.9 \text{ mm},$$

and a displacement rate of a page position does not depend on a size of a book page document, so that an allowance for the image memory 104 in copying with the maximum magnification factor is:

$$24.9 - 14.5 = 10.5 \text{ mm}$$

and for this reason, even in copying with the maximum magnification factor, an image data storage range in the image memory 104 is satisfied, and displacement rate of a page position can be compensated.

In the present apparatus, in addition to compensation for displacement of a page position in a book page document as described above, the allowance in a memory capacity is also used for adjustment of dispersion of precisions between machines and also for adjustment of resist. In this apparatus, as shown in FIG. 52, dispersion in precision between machines and a memory space for resist adjustment are distributed in the directions where scanning starts and ends respectively in the image memory 104, and a position where storage of image data is started is a point by 5 mm frontward from an edge section of a left page in a book page document having a maximum size and by 215 mm upstream in the scanning direction from a reference position for a book page document. As described above, a position for storage of image data of a spread book page document in the image memory 104 is decided by the IPU 103, and a suppress memory space is used for compensation of displacement of a page position in the upstream direction for page turning in association with repetition of page turning.

In the present apparatus, a position of a top page of a book page document is accurately detected by using the page sensor 214 and checking insertion and discharge of a turned page in the turned page accommodating section in the page turn and scan mode as described above, and an image of a book page document is accurately allocated, and also images of a peripheral section of a page as well as of the binding section are deleted. Detection of a page edge section is executed in association with page turning, and a page size of the book page document is determined. In this apparatus, after a book page document is read first, a position of a left edge section of a left page in the side where reading of the book page document is started detected in the previous operation is regarded as a position for starting storage of image data for the spread book page document in the image memory 104. With this feature, an image storage range in the image memory 104 is aligned to a page edge section in the side where scanning is started, and an allowance of memory scape for an image data storage range in the image memory 104 increases to th side where the scanning ends and in which the page displaces.

In the 1 vs 1 copying mode in which, for instance, an image of a book page document having a size of A3 is outputted to transfer having a size of A3 as shown in FIG. 50, the IPU 103 starts storage of the image data from a fixed position in the image memory 104 in the first read/scan with the scan unit 200 as indicated by the effective image area signal SFGATE as well as by the data write signal memory W in the image memory 104. In the second and subsequent read/scan by the scan unit 200, the IPU 103 starts accommodation of turned pages of the image data to the flame memory 104 from a position of a page edge section computed from a position where a turned page was discharged in the previous operation for turning the page.

Also as described above, an analog signal from the image read plate 101 is processed by the VPU 102 and stored real times by the IPU 103 in the image memory 104, and is outputted from the image memory 104 in synchronism to image formation by the printer. The main controller in the IPU 103 starts transmission of image data at an address specified by an address bus in the image memory 104 comprising a DRAM. The scanner controller in the IPU 103 provides controls over the memory controller for detection of an abnormal state, and if a book page document moves during read of the book page document and the set position becomes incorrect and a range of storage of page image data in the image memory 104 comes to the front side from a position of a right edge of a page at a read edge side in the reading/scanning direction detected later, the scanner controller determines that the state is abnormal. In this step, the image data is not correctly stored in the image memory 104 and a portion of the image data is lacked, the main control board 107 makes the operating section 99 generate warning before output of the image according to the determination.

Then description is made for compensation in image size change.

In this apparatus, image data consisting of multi-values having been subjected to image processing including image size change is stored in the image memory 104, and the data is write data without cutting of page image, a binding section and a frame section deleted therefrom. A capacity of the image memory 104 is for size A3 and odd for outputted image, so that a range in which image data of a document can be stored with a changed image size is different from that when the image is copied with the same size. When an image is copied with the same size or with a reduced size, an image data storage range in the image memory 104 is for size A3, but when an image is copied with an enlarged size (in the auxiliary scanning direction), a range of storage of document image data in the image memory 104 becomes smaller in association with the magnifying factor. For instance, a document image data storage in the image memory 104 when an image is copied with an enlarged size (in the auxiliary size), the range is for size B5 in case of a magnifying factor of 115%, and for size A4 in a case of a maximum magnifying factor of 141%.

As a book page document is set on the document base 1 with reference to a front position from the binding section, an origin of a book page document image and for image size change is a left edge section of a back cover page. To realize copying with a changed image size with a limited capacity of the image memory 104, an image data storage range in the image memory 104 is changed as described below when an image is copied with a changed size.

The IPU 103 changes a position for starting storage of image data in the image memory 104, when an image is copied with an enlarged size, according to the magnifying factor, and in association with change of the position, also an image data storage range in the image memory 104 changes. The position P for starting storage of image data in the image memory 104 when a magnifying factor is M in copying with an enlarged size can be computed from a position for starting storage of image data in the image memory 104 when an image is copied with the same size or with a reduced size through the following expression:

Pmm=210 (1−1/M)

The position P for starting storage of image data in the image memory 104 when a magnifying factor is the maximum one, namely 141% (M=1.41) is 61 mm away rightward from a position for starting storage of image data in the image memory 194 when an image is copied with the same size. For this reason, if a position for starting storage of image data in the image memory 104 when an image is copied with the same size or with a reduced size is specified at a point frontward by 5 mm from an edge section of a left page in a book page document having the maximum size and by 215 mm away from a reference position for setting a book page document upstream in the scanning direction, a position for starting storage of image data in the image memory 104 when an image is copied with a magnifying factor of 141% is a position 154 mm away from a reference position for setting a book page document upstream in the scanning direction.

FIG. 60 shows timing of a copying operation of the present apparatus in the book page document copying mode. This is a timing of copying operation in the independent page copying operation in which an image of a book page document having a size of A5 is enlarged by 141% and copied on a form having a size of A4. FIG. 47 shows a timing of copying operation in the book page document copying mode in which an image of a book page document having a size of A4 is copied onto a form also having a size of A4 without changing a size of the image. In this apparatus, image size change in the auxiliary scanning direction is executed by the IPU 103 by changing a running speed of the scanner motor 106 according to data for magnifying factor from the main control board 107 and changing a scanning speed of the scan unit 200, and the main control board 107 transfers data for the magnifying factor to the IPU 103 according to, for instance, an input signal from the operating section 99. A time for scanning a document becomes longer in proportion to a magnifying factor when an image is copied with an enlarged size.

As understood from the SFGATE and memory signal W shown in FIG. 60 and FIG. 47, the IPU 103 stores image data form the VPU 102 in the image memory 104 even during read/scan, and outputs the image data form the image memory 104. An operation of the scan unit 200 for reading a document is executed within a constant range regardless of a magnifying factor or a document size, and when an image is copied with an enlarged size, the IPU 103 detects an end of a memory address of the image memory 104 and ends the copying operating indicating completion of storage of image data with the memory signal W. Also when an image is copied with a reduced size, the IPU 103 detects a point of a read edge of the read/scan operation prior to a final address of the image memory 104, and at this point of time terminates storage of image data in the image memory 104.

Then description is made for restrictions over image size and enlargement of an image.

Generally a form size equal to the book page document image size having been subjected to size change is selected, and if the book page document image size is any of rated ones, the image is appropriately allocated on the form with an area generated because of contraction of the binding section of the book page document due to warping as a blank section. Also if the book page document size having been subjected to the form size is smaller than a size of a form, a blank area is generated within a form and them the image is allocated.

Figure 61:
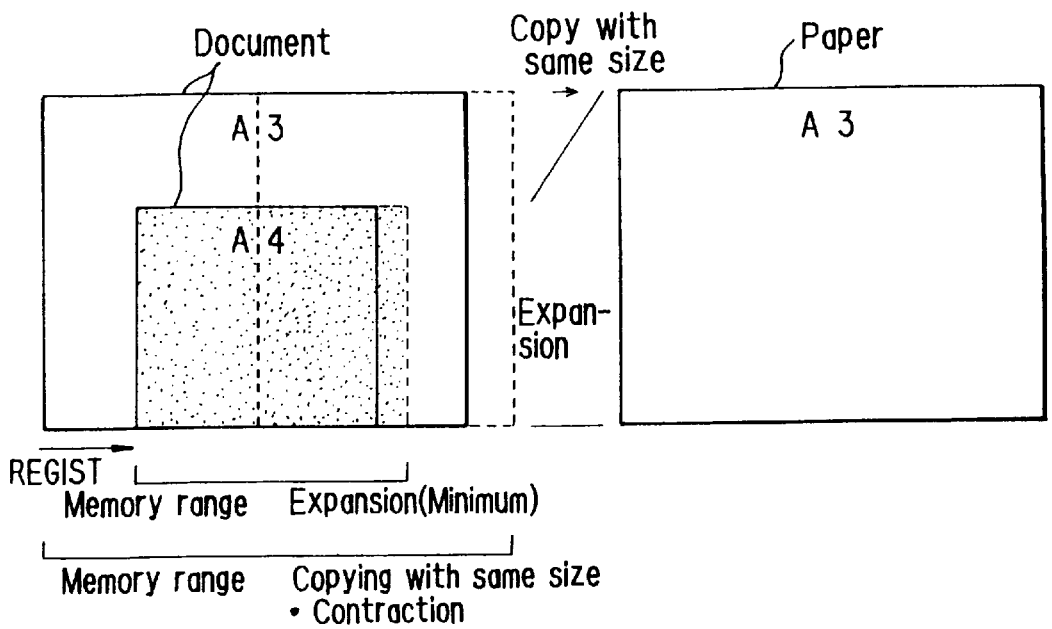
FIG. 61 is a view showing an image area in the spread page mode in the apparatus.
Figure 62:
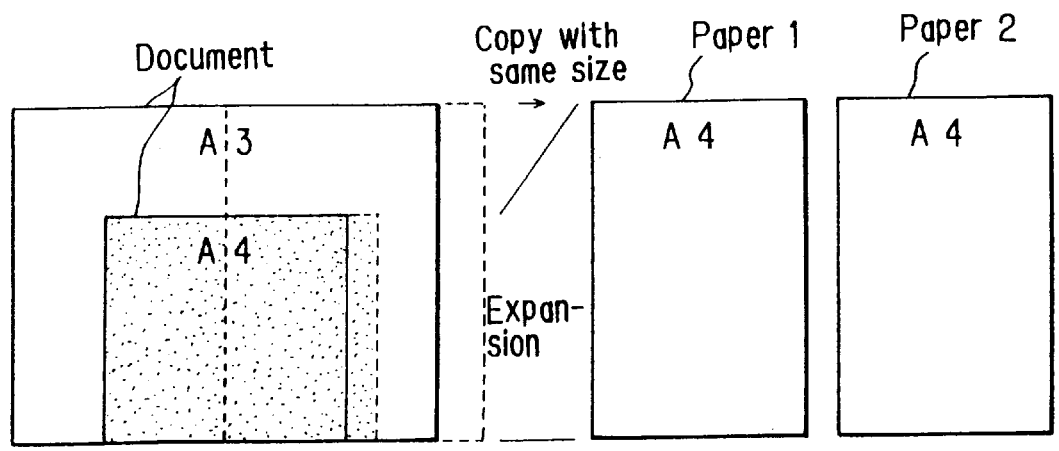
FIG. 62 is a view showing an image area in the independent page mode in the apparatus.

FIG. 61 shows an image range in the spread page copying mode, and FIG. 62 shows an image range in the independent page copying mode. These figures show an image size of a document copied with a same size, and an image size of an image data which can be stored in the image memory when enlarged by 141% for copying. As shown in FIG. 61 and FIG. 62, a form may be selected according to a size of a document image as well as to a magnifying factor, but for instance, in a first case where an image of a book page document having a size of A4 is copied with the same size onto a form having a size of B5 in the spread page copying mode, or in a second case where an image of a document having a size of B4 is copied with a magnifying factor of 115% onto a form having a size of B4 in the spread page copying mode, a size of an image is larger than a size of a form, and an image overflow the form. As an image is set with reference to a position at a enter in the front side of a spread book page document, edge sections of a page and an upper section of the page are lacked.

Figure 63:
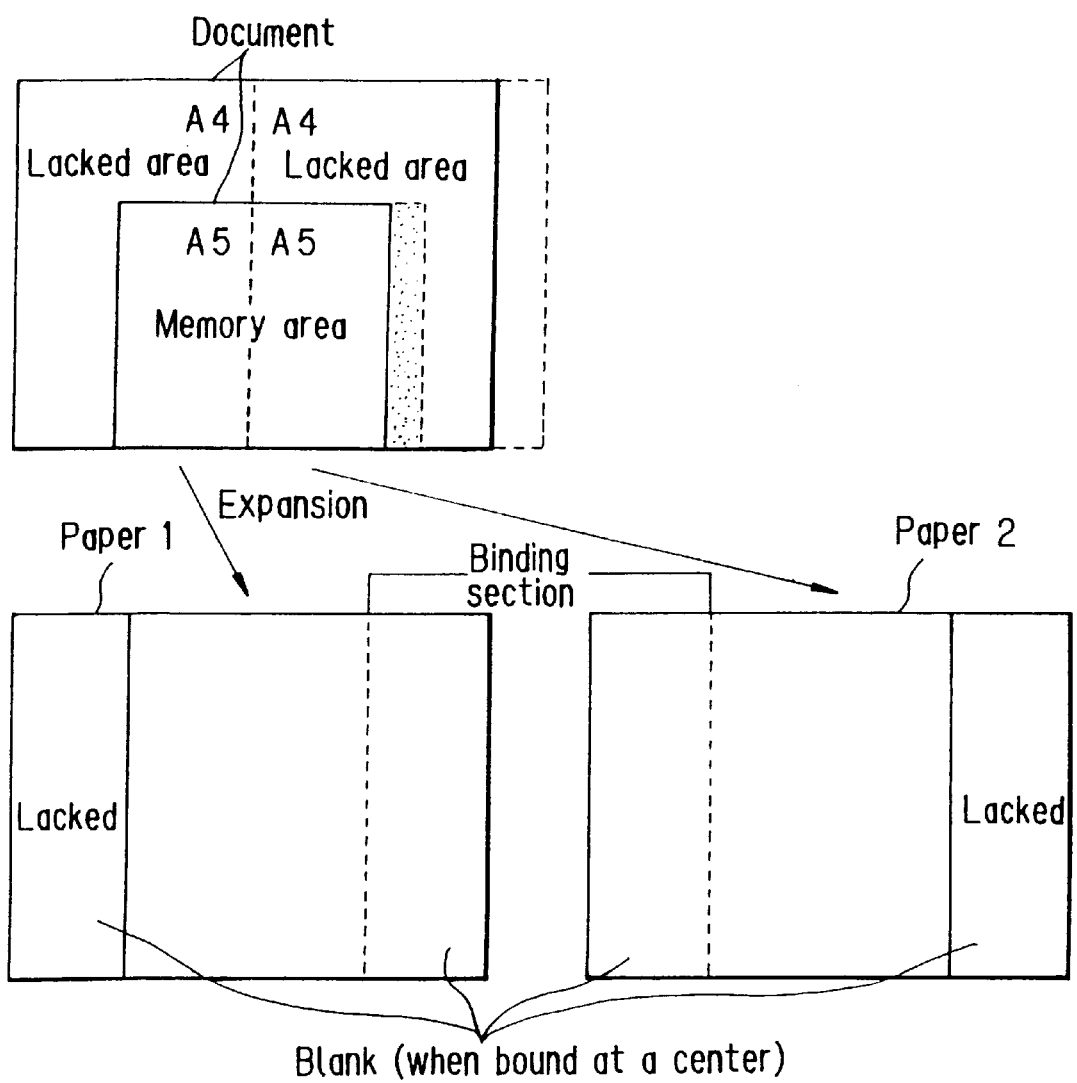
FIG. 63 is view showing examples of a document size, an image size, and a form size in the independent page/enlarged copying mode in the apparatus.

Next, a description is made for a case where a document size is larger than an image data storage range in the image memory 104 when an image is copied with an enlarged size. FIG. 63 shows examples of document size, image size, and form size in a case where an image is copied with an enlarged size in the independent page copying mode. In this apparatus, an image data storage range in the image memory 104 when an image is copied with an magnifying factor of 141% is an area for a size of A4 as shown in FIG. 63, and an area outside the range is out of the image data storage range in the image memory 104, and the image data can not be outputted from the image memory 104.

For instance, in a case where an image of a page having a size of A4 is copied with a magnifying factor of 141% onto a form having a size of A4 in the independent page copying mode, the image data storage range in the image memory 104 is as shown in FIG. 63, but an area lacked from the image is out of the form, and an image within a range of the form is formed. In this apparatus, the IPU 103 determines whether a range of document image is within an image data storage range in the image memory 104 or not.

Concretely the IPU 103 previously computes an image data storage range in the image memory 104 from a magnifying factor specified from the main control board 107 as described later. Then the IPU 103 compares a page size of a book page document to an image data storage range in the image memory 104 when an image is copied with a changed image size, and if the latter is larger than the former, or if even a portion of the latter overflows the former, output of an image is stopped, and warning display is provided in the guidance display section as shown in FIG. 48D.

Figure 64:
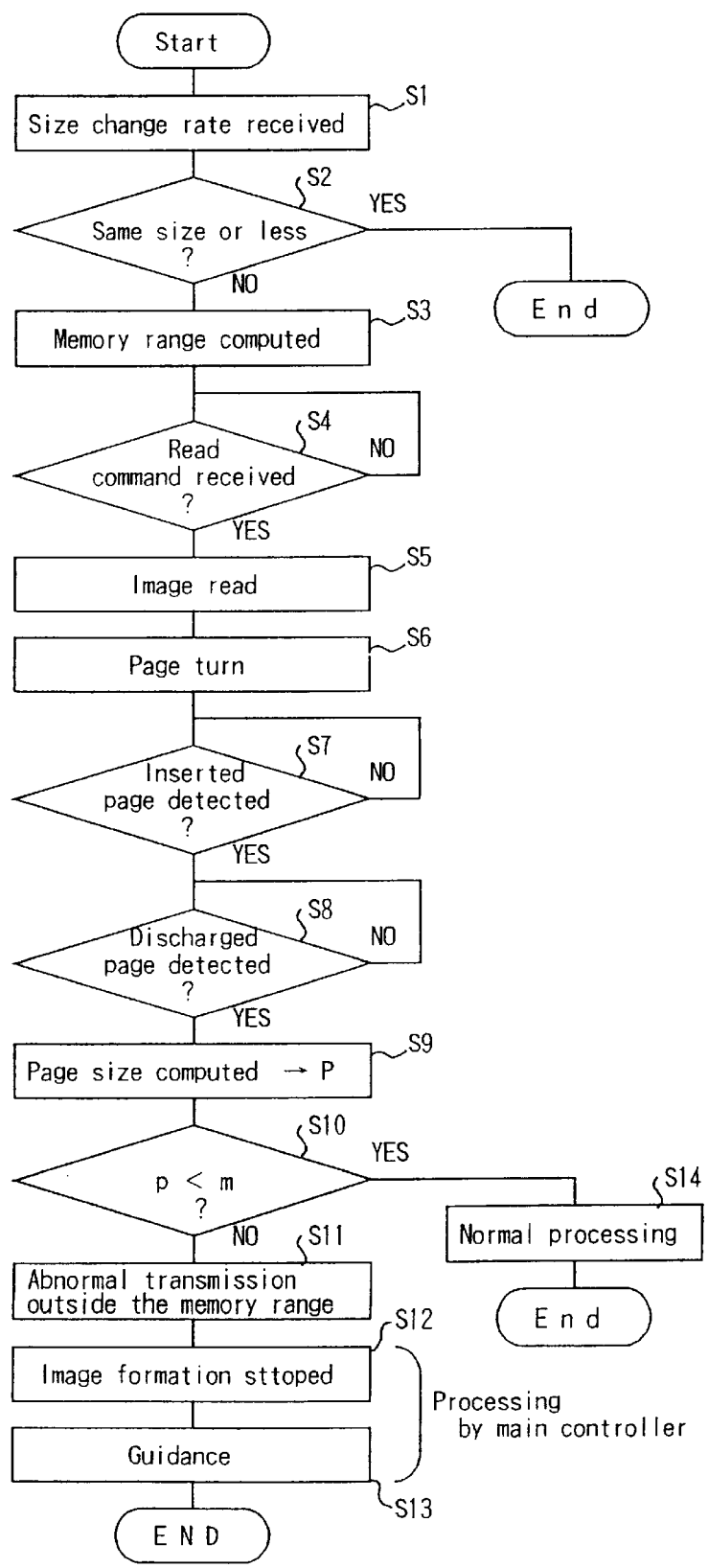
FIG. 64 is a flow chart showing a portion of a control flow in the apparatus.

These controls are provided in the first operation for reading, turning and scanning a page by a scanner controller in the IPU 103. The scanner controller receives data for a magnifying factor from the main controller in step S1 as shown in FIG. 64, and determines in step S2 whether the image is to be copied with the same size or a reduced size according to the data. If the image is to be copied with the same size or a reduced size, the scanner controller computes an image data storage range m in the image memory 104 in step S3 from the detected size of the book page document above (detected values for an edge sections in the auxiliary scanning direction, a binding section) or data for the magnifying factor, and also determines in step S4 whether a read command has been received or not from the main controller, and if it is determined that the read command has been received from the main controller, the scanner controller makes in step S5 the scan unit 200 read the book page document.

Then the scanner controller makes in step S6 the scan unit 200 turn a page of the book page document, and determines in step S7 according to an input signal from the page sensor 214 whether a turned page of the book page document has been accommodated in the turned page accommodating section or not. If it is determined that the turned page of the book page document has been accommodated in the page accommodating section, the scanner controller determines in step S8 according to an input signal from the page sensor whether the turned page of the book page document has been discharged from the page accommodating section or not, and if it is determined that the turned page of the book page document has been discharged from the turned page accommodating section, the scanner controller determines in the step S9 positions of a front edge section and a rear edge section of the book page document in the auxiliary document as described above according to an input signal from the page sensor 214, and computes a page size p of the book page document.

Then the scanner controller compares in step S10 a page size p of the book page document to an image data storage range m in the image memory 104, and if p is smaller than m (p<m), the scanner controller executes normal processing in step S14. If p is not smaller than m, the scanner controller sends a signal indicating an abnormal state to the main controller in step S11. When the main controller receives the signal indicating the abnormal state from the scanner controller, the main controller stops preparation for image formation in step S12, and makes in step S13 the guidance display section provide a warning display as shown in FIG. 48D. With this feature, the image data for the book page document is prevented from being outputted without being stored in the image memory 104 and laking a portion thereof.

In case where, after preparation for image formation is stopped and the warning display is provided in the guidance display section, a CLEAR signal is not inputted from the operating section 99 and a START signal is inputted again from the print key, the main controller determines that a portion of a page image is to be outputted, and restarts image formation and an operation for reading the image. It should be noted that, in the case shown in FIG. 63, if the book page document image is enlarged in the auxiliary scanning direction and a form for feed in the vertical direction is selected, also the lacked area is included in the form range.

Also, as shown in FIG. 63, in a case where an image of a page having a size of A4 is copied at a center of a form having a size of A3 at a center thereof with a magnifying factor of 141% in the independent page copying mode, the image is formed at a center of the form with image data form the image memory 104. In this case, a portion in a lacked area and within a form can not be formed. In a case where an image range exceeds the image data storage range in the image memory 104, the IPU 103 allocates the maximum image data storage range in the image memory 104 in the auxiliary scanning direction (a range corresponding to an image width of 210 mm) at a center, a right reference position, or a left reference position of the form with reference to the form reference, and outputs all image data for a portion outside the image data storage range in the image memory within the form as blank data and generates a blank section.

In this embodiment, the apparatus according to the present invention comprises the scan unit 200 as a reading means for reading an image of a spread book page document from an edge section of one page therein placed with the central binding section aligned to a reference position, an image size changing means for changing a size of an image to be read by this reading means 200, the image memory 104 as a storage means for storing therein read image having been subjected to image size change, and the IPU 103 as a means for differentiating a range for storage of image data having been subjected to image size changing when reading a book page document with a changed size in the storage means 104 from a range for storage of image data when reading a book page document with a same size in the storage means 104, so that, correct image data for a book page document can be outputted even when the image is read with a changed image size. Namely, in a case where an image of a spread book page document placed with the central binding section being aligned to the reference position is read from an edge section of one page of the spread book page document and the read image data is stored in the storage means, it becomes possible to prevent a fault in which an image data storage range in the storage means when copying an image with a changed size is limited according to a capacity of the storage means and a rear edge section of the read image is lacked.

Also the apparatus according to the present embodiment comprises the scan unit 200 as a reading means for reading an image of a spread book page document placed with the central binding section being aligned to the reference position from an edge section of one page of the spread book page document, an image size changing means for changing a size of an image to be read by the reading means 200, the image memory 104 as a storage means for storing therein image data having been subjected to image size changing, and the IPU as a means for deciding a position for starting storage of the image data having been subjected to image size change according to a magnifying factor, so that it is possible to output correct image data of a book page document irrespective of the magnifying factor.

In the apparatus according to the present invention comprising the scan unit 200 as a means for reading an image of a spread book page image, an image size changing means for changing a size of an image read by the reading means 200, and the image memory 104 as a storage means for storing therein read image data having been subjected to image size changing, said apparatus has the IPU 103 as a warning means for generating a warning in a case where a range for storage of image data having been subjected to image size change overflows the prespecified range, or in a case where a range for reading out image data form the storage means 104 overflows the prespecified range, so that a warning for alerting an operator not to output incorrect image can be provided.

Also in the apparatus comprising the scan unit 200 as a reading means for reading an image of a spread book page document and the storage means 104 for storing therein read image data, said apparatus has the IPU 103 as a means for changing image data to be outputted to blank data in a case where an address for reading image data form the storage means 104 is out of the prespecified means, so that the apparatus can prevent an incorrect image from being outputted, in a case an address for reading image data form the storage means 104 is out of the prespecified means.

Furthermore, the apparatus according to the present invention comprises the scan unit 200 as a reading means for reading an image of a spread book page document, an image size changing means for changing a size of read image read by the reading means 200, the storage means 104 for storing therein read image data having been subjected to image size changing, the IPU 103 as an output means for outputting image data read from this storage means 104, the scan unit 200 as a page turning means for turning pages of spread book page document, the IPU 103 as a computing means for computing an image data storage range in the storage means 104 when an image is copied with a changed size, the page sensor 214 and IPU 103 as a page size detecting means for detecting a page size of a book page document, and the IPU 103 as a comparing means for comparing a page size detected by the page size detecting means to the image data storage range computed by the computing means when an image is copied with a changed size, so that it becomes possible to prevent a fault in which a portion of read data is not stored in the storage means and lacked, and the image data with the portion lacked is outputted.

It should be noted that the above description of the book page forming apparatus described above assumes an electrostatic copying machine, the present invention can similarly be applied to a book page document image forming apparatus used in an image forming apparatus such as a facsimile machines based on the electrostatic recording system other than the book page document image forming apparatus as described above. Though the above description of the book page document forming apparatus assumes a book page document which is written in a horizontal format and is turned leftward (with a left top cover page). However, there are book page documents which are written in the vertical direction ad turned rightward. In cases of these types of document, the book page document described above has only to be arranged in the symmetrically reverse position, and then the left and right pages in the above description become contrary. Also the book page document image forming apparatus described above can be applied to book page documents in which a right page thereof is different from a left page thereof or in which right and left edge sections are different.

It should be noted that, only in a case where an image is enlarged in the auxiliary scanning direction in the independent page copying mode and is copied onto a form fed in the longitudinal direction, a range of the copied image overflows the memory range, and for this reason in the embodiment described above, a portion outside the memory is generated as a blank section, but the configuration is allowable where only forms fed in the sideward direction can be selected in the independent page copying mode and also only forms fed in the longitudinal direction can be selected in the spread page copying mode. The purposes are firstly that it is possible to prevent mistakes in copying caused by incorrect section of a form because orientation length and width are substantially fixed in the independent page copying mode and the spread page copying mode respectively, and secondly that it is possible to prevent a copy of an image with a portion thereof lacked with a combination of the above-described modes. However, it is possible to use forms not having any rated size in the conventional directions (namely in the longitudinal direction in the independent page copying mode and in the sideward direction in the spread page copying mode) by manually feeding the forms and by entering lengths in the longitudinal direction as well as in the sideward direction.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A book page document image reading apparatus comprising:

a reading means for reading an image of a spread of book pages from an edge section of one of the pages;

a storage means for storing the read image data by said reading means;

a page turning means for turning pages of a spread of book pages from an edge section of the other page;

a page edge section detecting means for detecting a position for an edge section of a page in a spread of book pages when a page is turned by said page turning means, and a processing means for deciding a start point for storing image data of a spread of book pages in said storage means according to a detecting signal from said page edge section detecting means after detecting a position of a page edge section in a spread of book pages by said page edge section detecting means.

2. A book page document image reading apparatus according to claim 1, wherein said reading means comprises an image reading plate having a charge-coupled device for reading a document image, a video processing unit for executing from processing of an analog image signal from said image reading plate to an A/D converting, and a carriage for relaying between a signal line of loaded system in a scan unit such as fluorescent lamps for lighting a document and an inverter power for the lamps, a heater, a thermistor, a fan, and a solenoid, and a wiring in the power line.

3. A book page document image reading apparatus according to claim 1, wherein said reading means has a function for switching a read light path for a book page document provided in a lower side of the apparatus to a read light path for a sheet document provided in an upper side thereof, and vice versa according to a position control for a mirror position to a light path.

4. A book page document image reading apparatus according to claim 1, wherein said storage means is frame memory.

5. A book page document image reading apparatus according to claim 4, wherein said frame memory is consisted of 4 bits each dot according to a speed responding capability, and stores image data after each type of image processing is completed.

6. A book page document image reading apparatus according to claim 4, wherein a range for storing read image data in the auxiliary scanning direction in said frame memory is within approximately 455 mm and 7174 lines from the capacity of said frame memory to a range within 420 mm in A3, the maximum allowable size for a book page document.

7. A book page document image reading apparatus according to claim 1, wherein said reading means comprises 2 pieces of fluorescent lamps as a light source for exposing a book page document, 2 pieces of fluorescent lamps as a light source for exposing a sheet document, and an inverter circuit for 2 pieces of fluorescent lamps, and said inverter circuit for 2 pieces of fluorescent lamps lights up each lamps by switching the lamps to the fluorescent lamps for exposing a book page document when a book page document is to be read, and to the fluorescent lamps for exposing a sheet document when a sheet document is to be read respectively.

8. A book page document image reading apparatus according to claim 7, wherein said fluorescent lamps are synchronized to sampling for a read image of a charge-coupled device by said inverter circuit and are driven by 40 kHz so that a nonuniform density in a read image does not occur.

9. A book page document image reading apparatus according to claim 1, wherein said page turning means comprises a turning belt for turning pages of a book page document, a driving roller for turning and a turning roller for stretching and supporting said turning belt, and an electrifying roller for generating a sucking force on said turning belt.

10. A book page document image reading apparatus according to claim 9, wherein said turning belt comprises a resin film having two layers structure in which a surface layer comprises a high resistance film, and a rear surface layer comprises a low resistance film.

11. A book page document image reading apparatus according to claim 9, wherein said electrifying roller comprises a roller made of metal and a roller covered with conductive rubber on the surface of a metal roller, and high voltage of ±2 to 4 kV is loaded to said electrifying roller from an alternating current power via a switch for switching at a prespecified timing.

12. The book page document image reading apparatus of claim 1, wherein:

the storage means is for storing the image data in a storage range, said storage range being sufficiently large to store at least an equivalent to the image of a spread of book pages, said storage range having a surplus memory portion that corresponds with the edge section of said spread of book pages from which said page turning means turns pages of said spread of book document.

13. A book page document image reading apparatus according to claim 12, wherein said storage means is frame memory.

14. A book page document image reading apparatus according to claim 13, wherein said frame memory is consisted of 4 bits each dot according to a speed responding capability, and stores image data after each type of image processing is completed.

15. A book page document image reading apparatus according to claim 13, wherein a range for storing read image data in the auxiliary scanning direction in said frame memory is within approximately 455 mm and 7174 lines from the capacity of said frame memory to a range within 420 mm in A3, the maximum allowable size for a book page document.

16. A book page document image reading apparatus according to claim 12, wherein said reading means comprises an image reading plate having a charge-coupled device for reading a document image, a video processing unit for executing from processing of an analog image signal from said image reading plate to an A/D converting, and a carriage for relaying between a signal line of loaded system in a scan unit such as fluorescent lamps for lighting a document and an inverter power for the lamps, a heater, a thermistor, a fan, and a solenoid, and a wiring in the power line.

17. A book page document image reading apparatus according to claim 12, wherein said reading means has a function for switching a read light path for a book page document provided in a lower side of the apparatus to a read light path for a sheet document provided in an upper side thereof, and vice versa according to a position control for a mirror position to a light path.

18. A book page document image reading apparatus according to claim 12, wherein said reading means comprises 2 pieces of fluorescent lamps as a light source for exposing a book page document, 2 pieces of fluorescent lamps as a light source for exposing a sheet document, and an inverter circuit for 2 pieces of fluorescent lamps, and said inverter circuit for 2 pieces of fluorescent lamps lights up each lamps by switching the lamps to the fluorescent lamps for exposing a book page document when a book page document is to be read, and to the fluorescent lamps for exposing a sheet document when a sheet document is to be read respectively.

19. A book page document image reading apparatus according to claim 18, wherein said fluorescent lamps are synchronized to sampling for a read image of a charge-coupled device by said inverter circuit and are driven by 40 kHz so that a nonuniform density in a read image does not occur.

20. A book page document image reading apparatus according to claim 12, wherein said page turning means comprises a turning belt for turning pages of a book page document, a driving roller for turning and a turning roller for stretching and supporting said turning belt, and an electrifying roller for generating a sucking force on said turning belt.

21. A book page document image reading apparatus according to claim 20, wherein said turning belt comprises a resin film having two layers structure in which a surface layer comprises a high resistance film, and a rear surface layer comprises a low resistance film.

22. A book page document image reading apparatus according to claim 20, wherein said electrifying roller comprises a roller made of metal and a roller covered with conductive rubber on the surface of a metal roller, and high voltage of ±2 to 4 kV is loaded to said electrifying roller from an alternating cur rent power via a switch for switching at a prespecified timing.

23. The book page document image reading apparatus of claim 1, wherein:

a storage capacity of the storage means corresponds in size to at least one of two or more pages of a maximum allowable page size of a book document, and two pages of the maximum allowable size plus another portion that corresponds to at least one of a maximum thickness of the book document and less than the maximum thickness of the book document.

24. A book page document image reading apparatus according to claim 23, wherein said reading means comprises an image reading plate having a charge-coupled device for reading a document image, a video processing unit for executing from processing of an analog image signal from said image reading plate to an A/D converting, and a carriage for relaying between a signal line of loaded system in a scan unit such as fluorescent lamps for lighting a document and an inverter power for the lamps, a heater, a thermistor, a fan, and a solenoid, and a wiring in the power line.

25. A book page document image reading apparatus according to claim 23, wherein said storage means is frame memory.

26. A book page document image reading apparatus according to claim 25, wherein said frame memory is consisted of 4 bits each dot according to a speed responding capability, and stores image data after each type of image processing is completed.

27. A book page document image reading apparatus according to claim 25, wherein a range for storing read image data in the auxiliary scanning direction in said frame memory is within approximately 455 mm and 7174 lines from the capacity of said frame memory to a range within 420 mm in A3, the maximum allowable size for a book page document.

28. A book page document image reading apparatus according to claim 23, wherein said reading means comprises 2 pieces of fluorescent lamps as a light source for exposing a book page document, 2 pieces of fluorescent lamps as a light source for exposing a sheet document, and an inverter circuit for 2 pieces of fluorescent lamps, and said inverter circuit for 2 pieces of fluorescent lamps lights up each lamps by switching the lamps to the fluorescent lamps for exposing a book page document when a book page document is to be read, and to the fluorescent lamps for exposing a sheet document when a sheet document is to be read respectively.

29. A book page document image reading apparatus according to claim 28, wherein said fluorescent lamps are synchronized to sampling for a read image of a charge-coupled device by said inverter circuit and are driven by 40 kHz so that a nonuniform density in a read image does not occur.

30. A book page document image reading apparatus according to claim 23, wherein said page turning means comprises a turning belt for turning pages of a book page document, a driving roller for turning and a turning roller for stretching and supporting said turning belt, and an electrifying roller for generating a sucking force on said turning belt.

31. A book page document image reading apparatus according to claim 30, wherein said turning belt comprises a resin film having two layers structure in which a surface layer comprises a high resistance film, and a rear surface layer comprises a low resistance film.

32. A book page document image reading apparatus according to claim 30, wherein said electrifying roller comprises a roller made of metal and a roller covered with conductive rubber on the surface of a metal roller, and high voltage of ±2 to 4 kV is loaded to said electrifying roller from an alternating current power via a switch for switching at a prespecified timing.

33. A book page document image reading apparatus according to claim 23, wherein said reading means has a function for switching a read light path for a book page document provided in a lower side of the apparatus to a read light path for a sheet document provided in an upper side thereof, and vice versa according to a position control for a mirror position to a light path.

34. A book page document image reading apparatus according to claim 33, wherein, as for said point for starting storage of page image data after the image has initially been read, a position of an left edge section in the left page of the side of starting to read the book page document detected in the previous time is set to a position for starting storage of image data in a spread of book pages in said storage means.

35. A book page document image reading apparatus according to claim 33, wherein in a scan for a first time, storage of image data into said storage means is executed from the fixed position.

36. A book page document image reading apparatus according to claim 33, wherein said processing means determines that abnormal conditions are generated therein in a case where a set position of a book page document is displaced caused by moving thereof during reading the book page document, and a range for storage of page image data in said storage means is displaced frontward from an right edge section of a page in the side of rear edge in scanning detected later.

\* \* \* \* \*